(12) United States Patent
Fujisaki

(10) Patent No.: US 7,904,109 B1
(45) Date of Patent: Mar. 8, 2011

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

(21) Appl. No.: 12/901,509

(22) Filed: Oct. 9, 2010

Related U.S. Application Data

(63) Continuation of application No. 12/110,294, filed on Apr. 26, 2008, now Pat. No. 7,853,297, which is a continuation of application No. 10/904,291, filed on Nov. 3, 2004, now Pat. No. 7,466,992, which is a continuation of application No. 10/202,374, filed on Jul. 24, 2002, now abandoned.

(60) Provisional application No. 60/329,964, filed on Oct. 18, 2001.

(51) Int. Cl.
*H04M 1/00* (2006.01)
*H04W 4/00* (2009.01)
*H04B 1/38* (2006.01)

(52) U.S. Cl. .................... 455/550.1; 455/566; 455/565.1

(58) Field of Classification Search ............... 455/550.1, 455/566, 67, 565, 552.1, 5
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,353,376 A | 10/1994 | Oh et al. | |
| 5,388,147 A | 2/1995 | Grimes | |
| 5,405,152 A | 4/1995 | Katanics et al. | |
| 5,414,461 A | 5/1995 | Kishi et al. | |
| 5,446,904 A | 8/1995 | Belt et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,559,554 A | 9/1996 | Sakoda et al. | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,772,586 A | 6/1998 | Heinonen et al. | |
| 5,778,304 A | 7/1998 | Grube et al. | |
| 5,802,460 A | 9/1998 | Parvulescu et al. | |
| 5,805,672 A | 9/1998 | Barkat et al. | |
| 5,812,930 A | 9/1998 | Zavrel | |
| 5,844,824 A | 12/1998 | Newman et al. | |
| 5,902,349 A | 5/1999 | Endo et al. | |
| 5,916,024 A | 6/1999 | Von Kohorn | |
| 5,959,661 A | 9/1999 | Isono | |
| 6,009,336 A | 12/1999 | Harris et al. | |
| 6,011,973 A | 1/2000 | Valentine et al. | |
| 6,043,752 A | 3/2000 | Hisada et al. | |
| 6,081,265 A | 6/2000 | Nakayama et al. | |
| 6,115,597 A | 9/2000 | Kroll et al. | |
| 6,128,594 A | 10/2000 | Gulli et al. | |
| 6,144,848 A | 11/2000 | Walsh | |
| 6,148,212 A | 11/2000 | Park et al. | |
| 6,198,942 B1 | 3/2001 | Hayashi et al. | |
| 6,202,060 B1 | 3/2001 | Tran | |

(Continued)

*Primary Examiner* — Tilahun Gesesse

(57) ABSTRACT

The wireless communication device, which implements voice communication, which further implements a first function and a second function, wherein when the first function is implemented, the video image generator generates a plurality of two-dimensional text images and the plurality of two-dimensional text images are displayed on the display, and when the second function is implemented, the video image generator generates a plurality of three-dimensional graphic images and the plurality of three-dimensional graphic images are displayed on the display, and when a phone call from a specific caller is received, the wireless communication device refrains from answering the phone call.

3 Claims, 80 Drawing Sheets

U.S. PATENT DOCUMENTS

| | | | |
|---|---|---|---|
| 6,216,013 B1 | 4/2001 | Moore et al. | |
| 6,216,158 B1 | 4/2001 | Luo et al. | |
| 6,225,944 B1 | 5/2001 | Hayes | |
| 6,236,832 B1 | 5/2001 | Ito | |
| 6,243,039 B1 | 6/2001 | Elliot | |
| 6,249,720 B1 | 6/2001 | Kubota et al. | |
| 6,253,075 B1 | 6/2001 | Beghtol et al. | |
| 6,265,988 B1 | 7/2001 | LeMense et al. | |
| 6,285,317 B1 * | 9/2001 | Ong | 342/357.57 |
| 6,292,666 B1 | 9/2001 | Siddiqui et al. | |
| 6,292,747 B1 | 9/2001 | Amro et al. | |
| 6,311,077 B1 | 10/2001 | Bien | |
| 6,332,122 B1 | 12/2001 | Ortega et al. | |
| 6,333,684 B1 | 12/2001 | Kang | |
| 6,366,651 B1 | 4/2002 | Griffith et al. | |
| 6,366,782 B1 | 4/2002 | Fumarolo et al. | |
| 6,374,221 B1 | 4/2002 | Haimi-Cohen | |
| 6,385,466 B1 | 5/2002 | Hirai et al. | |
| 6,405,033 B1 | 6/2002 | Kennedy, III et al. | |
| 6,411,198 B1 | 6/2002 | Hirai et al. | |
| 6,411,822 B1 | 6/2002 | Kraft | |
| 6,415,138 B2 | 7/2002 | Sirola et al. | |
| 6,421,470 B1 | 7/2002 | Nozaki et al. | |
| 6,421,602 B1 | 7/2002 | Bullock et al. | |
| 6,430,498 B1 | 8/2002 | Maruyana et al. | |
| 6,442,404 B1 | 8/2002 | Sakajiri | |
| 6,445,802 B1 | 9/2002 | Dan | |
| 6,477,387 B1 | 11/2002 | Jackson et al. | |
| 6,486,867 B1 | 11/2002 | Kopp et al. | |
| 6,487,422 B1 | 11/2002 | Lee | |
| 6,512,919 B2 | 1/2003 | Ogasawara | |
| 6,519,566 B1 | 2/2003 | Boyer | |
| 6,526,293 B1 | 2/2003 | Matsuo | |
| 6,529,742 B1 | 3/2003 | Yang | |
| 6,538,558 B1 | 3/2003 | Sakazume et al. | |
| 6,542,750 B2 | 4/2003 | Hendrey et al. | |
| 6,542,814 B2 | 4/2003 | Polidi et al. | |
| 6,553,310 B1 | 4/2003 | Lopke | |
| 6,567,745 B2 | 5/2003 | Fuchs et al. | |
| 6,567,984 B1 | 5/2003 | Allport | |
| 6,600,975 B2 | 7/2003 | Moriguchi et al. | |
| 6,606,504 B1 | 8/2003 | Mooney et al. | |
| 6,611,753 B1 | 8/2003 | Millington | |
| 6,615,186 B1 | 9/2003 | Kolls | |
| 6,618,704 B2 | 9/2003 | Kanegsky et al. | |
| 6,622,018 B1 | 9/2003 | Erekson | |
| 6,631,271 B1 | 10/2003 | Logan | |
| 6,647,251 B1 | 11/2003 | Siegle et al. | |
| 6,650,877 B1 | 11/2003 | Tarbouriech et al. | |
| 6,650,894 B1 | 11/2003 | Berstis et al. | |
| 6,658,272 B1 | 12/2003 | Lenchik et al. | |
| 6,658,461 B1 | 12/2003 | Mazo | |
| 6,662,023 B1 | 12/2003 | Helle | |
| 6,690,932 B1 | 2/2004 | Barnier et al. | |
| 6,701,148 B1 | 3/2004 | Wilson | |
| 6,707,942 B1 | 3/2004 | Cortopassi et al. | |
| 6,711,399 B1 | 3/2004 | Renault | |
| 6,725,022 B1 | 4/2004 | Clayton et al. | |
| 6,728,531 B1 | 4/2004 | Lee et al. | |
| 6,738,643 B1 | 5/2004 | Harris | |
| 6,738,711 B2 | 5/2004 | Ohmura et al. | |
| 6,763,226 B1 | 7/2004 | McZeal, Jr. | |
| 6,772,174 B1 | 8/2004 | Pettersson | |
| 6,779,030 B1 | 8/2004 | Dugan et al. | |
| 6,788,928 B2 | 9/2004 | Kohinata et al. | |
| 6,795,715 B1 | 9/2004 | Kubo et al. | |
| 6,812,954 B1 | 11/2004 | Priestman et al. | |
| 6,819,939 B1 | 11/2004 | Masamura | |
| 6,820,055 B2 | 11/2004 | Saindon et al. | |
| 6,836,654 B2 | 12/2004 | Decotignie | |
| 6,865,372 B2 | 3/2005 | Mauney et al. | |
| 6,883,000 B1 | 4/2005 | Gropper | |
| 6,891,525 B2 | 5/2005 | Ogoro | |
| 6,895,084 B1 | 5/2005 | Saylor et al. | |
| 6,895,256 B2 | 5/2005 | Harma | |
| 6,895,259 B1 | 5/2005 | Blank nee Keller et al. | |
| 6,898,321 B1 | 5/2005 | Knee et al. | |
| 6,898,765 B2 | 5/2005 | Matthews, III et al. | |
| 6,901,383 B1 | 5/2005 | Ricketts et al. | |
| 6,912,544 B1 | 6/2005 | Weiner | |
| 6,922,630 B2 | 7/2005 | Maruyana et al. | |
| 6,937,868 B2 | 8/2005 | Himmel et al. | |
| 6,947,728 B2 | 9/2005 | Tagawa et al. | |
| 6,954,645 B2 | 10/2005 | Tsai et al. | |
| 6,958,675 B2 | 10/2005 | Maeda et al. | |
| 6,961,559 B1 | 11/2005 | Chow et al. | |
| 6,968,184 B2 | 11/2005 | Criss et al. | |
| 6,968,206 B1 | 11/2005 | Whitsey-Anderson | |
| 6,992,699 B1 | 1/2006 | Vance et al. | |
| 6,999,802 B2 | 2/2006 | Kim | |
| 7,003,598 B2 | 2/2006 | Kavanagh | |
| 7,007,239 B1 | 2/2006 | Hawkins et al. | |
| 7,012,999 B2 | 3/2006 | Ruckart | |
| 7,028,077 B2 | 4/2006 | Toshimitsu et al. | |
| 7,035,666 B2 | 4/2006 | Silberfenig | |
| 7,058,356 B2 | 6/2006 | Slotznick | |
| 7,076,052 B2 | 7/2006 | Yoshimura | |
| 7,081,832 B2 | 7/2006 | Nelson et al. | |
| 7,085,739 B1 | 8/2006 | Winter et al. | |
| 7,089,298 B2 | 8/2006 | Nyman et al. | |
| 7,117,152 B1 | 10/2006 | Mukherji et al. | |
| 7,117,504 B2 | 10/2006 | Smith et al. | |
| 7,126,951 B2 | 10/2006 | Belcea et al. | |
| 7,127,238 B2 | 10/2006 | Vandermeijden et al. | |
| 7,127,271 B1 | 10/2006 | Fujisaki | |
| 7,130,630 B1 | 10/2006 | Haas et al. | |
| 7,142,810 B2 | 11/2006 | Oesterling | |
| 7,190,880 B2 | 3/2007 | Cookson et al. | |
| 7,218,916 B2 | 5/2007 | Nonami | |
| 7,224,851 B2 * | 5/2007 | Kinjo | 382/276 |
| 7,233,795 B1 | 6/2007 | Ryden | |
| 7,239,742 B2 | 7/2007 | Ohtani et al. | |
| 7,251,255 B1 | 7/2007 | Young | |
| 7,260,416 B2 | 8/2007 | Shippee | |
| 7,266,186 B1 | 9/2007 | Henderson | |
| 7,274,952 B2 | 9/2007 | Nayashi | |
| 7,313,386 B2 * | 12/2007 | Kondo et al. | 455/414.1 |
| 7,466,992 B1 * | 12/2008 | Fujisaki | 455/556.1 |
| 7,489,768 B1 | 2/2009 | Strietzel | |
| 7,492,892 B2 * | 2/2009 | Lee et al. | 379/433.12 |
| 7,532,879 B1 * | 5/2009 | Fujisaki | 455/414.1 |
| 7,551,899 B1 | 6/2009 | Nicolas et al. | |
| 7,778,664 B1 * | 8/2010 | Fujisaki | 455/556.1 |
| 2001/0000249 A1 | 4/2001 | Oba et al. | |
| 2001/0011293 A1 | 8/2001 | Murakami et al. | |
| 2001/0029425 A1 | 10/2001 | Myr | |
| 2001/0035829 A1 | 11/2001 | Yu et al. | |
| 2001/0037191 A1 | 11/2001 | Furuta et al. | |
| 2001/0041590 A1 | 11/2001 | Silberfenig et al. | |
| 2002/0002705 A1 | 1/2002 | Byrnes et al. | |
| 2002/0004701 A1 | 1/2002 | Nakano | |
| 2002/0016724 A1 | 2/2002 | Yang et al. | |
| 2002/0026348 A1 | 2/2002 | Fowler et al. | |
| 2002/0028690 A1 | 3/2002 | McKenna et al. | |
| 2002/0031120 A1 | 3/2002 | Rakib | |
| 2002/0032043 A1 * | 3/2002 | Ishikawa | 455/566 |
| 2002/0034292 A1 | 3/2002 | Tuoriniemi et al. | |
| 2002/0036642 A1 | 3/2002 | Kwon et al. | |
| 2002/0038219 A1 | 3/2002 | Yanay et al. | |
| 2002/0047787 A1 | 4/2002 | Mikkola et al. | |
| 2002/0055350 A1 | 5/2002 | Gupte et al. | |
| 2002/0058497 A1 | 5/2002 | Jeong | |
| 2002/0058531 A1 | 5/2002 | Terasaki et al. | |
| 2002/0065037 A1 | 5/2002 | Messina et al. | |
| 2002/0065604 A1 | 5/2002 | Sekiyama | |
| 2002/0066115 A1 | 5/2002 | Wendelrup | |
| 2002/0068585 A1 | 6/2002 | Chan et al. | |
| 2002/0068599 A1 | 6/2002 | Rodriguez et al. | |
| 2002/0082059 A1 | 6/2002 | Nariai et al. | |
| 2002/0094806 A1 | 7/2002 | Kamimura | |
| 2002/0098857 A1 | 7/2002 | Ishii | |
| 2002/0102960 A1 | 8/2002 | Lechner | |
| 2002/0103872 A1 | 8/2002 | Watanabe | |
| 2002/0110246 A1 | 8/2002 | Gosior et al. | |
| 2002/0115469 A1 | 8/2002 | Rekimoto et al. | |
| 2002/0120589 A1 | 8/2002 | Aoki | |
| 2002/0120718 A1 | 8/2002 | Lee | |

| | | |
|---|---|---|
| 2002/0123336 A1 | 9/2002 | Kamada |
| 2002/0127997 A1 | 9/2002 | Karlstedt et al. |
| 2002/0133342 A1 | 9/2002 | McKenna |
| 2002/0137470 A1 | 9/2002 | Baron et al. |
| 2002/0137526 A1 | 9/2002 | Shinohara |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0154632 A1 | 10/2002 | Wang et al. |
| 2002/0165850 A1 | 11/2002 | Roberts et al. |
| 2002/0168959 A1 | 11/2002 | Noguchi et al. |
| 2002/0173344 A1 | 11/2002 | Cupps et al. |
| 2002/0177407 A1 | 11/2002 | Mitsumoto |
| 2002/0178009 A1 | 11/2002 | Firman |
| 2002/0178225 A1 | 11/2002 | Madenberg et al. |
| 2002/0183045 A1 | 12/2002 | Emmerson et al. |
| 2002/0191951 A1 | 12/2002 | Sodeyama et al. |
| 2002/0196378 A1 | 12/2002 | Slobodin et al. |
| 2002/0198813 A1 | 12/2002 | Patterson, Jr. et al. |
| 2002/0198936 A1 | 12/2002 | McIntyre et al. |
| 2003/0003967 A1 | 1/2003 | Ito |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0017857 A1 | 1/2003 | Kitson et al. |
| 2003/0018744 A1 | 1/2003 | Johanson et al. |
| 2003/0032389 A1 | 2/2003 | Kim et al. |
| 2003/0032406 A1 | 2/2003 | Minear et al. |
| 2003/0033214 A1 | 2/2003 | Mikkelsen et al. |
| 2003/0038800 A1 | 2/2003 | Kawahara |
| 2003/0045301 A1 | 3/2003 | Wollrab |
| 2003/0045311 A1 | 3/2003 | Larikka et al. |
| 2003/0045329 A1 | 3/2003 | Kinoshita |
| 2003/0045996 A1 | 3/2003 | Yamazaki et al. |
| 2003/0050776 A1 | 3/2003 | Blair |
| 2003/0052964 A1 | 3/2003 | Priestman et al. |
| 2003/0055994 A1 | 3/2003 | Herrmann et al. |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0073432 A1 | 4/2003 | Meade, II |
| 2003/0083055 A1 | 5/2003 | Riordan et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0100326 A1 | 5/2003 | Grube et al. |
| 2003/0107580 A1 | 6/2003 | Egawa et al. |
| 2003/0109251 A1 | 6/2003 | Fujito et al. |
| 2003/0114191 A1 | 6/2003 | Nishimura |
| 2003/0117316 A1 | 6/2003 | Tischer |
| 2003/0119485 A1 | 6/2003 | Ogasawara |
| 2003/0119562 A1 | 6/2003 | Kokubo |
| 2003/0122779 A1 | 7/2003 | Martin et al. |
| 2003/0132928 A1 | 7/2003 | Kori |
| 2003/0135563 A1 | 7/2003 | Bodin et al. |
| 2003/0148772 A1 | 8/2003 | Ben-Ari |
| 2003/0153364 A1 | 8/2003 | Osann, Jr. |
| 2003/0155413 A1 | 8/2003 | Kovesdi et al. |
| 2003/0157929 A1 | 8/2003 | Janssen et al. |
| 2003/0166399 A1 | 9/2003 | Tokkonen et al. |
| 2003/0171113 A1 | 9/2003 | Choi |
| 2003/0174685 A1 | 9/2003 | Hasebe |
| 2003/0181201 A1 | 9/2003 | Bomze et al. |
| 2003/0204562 A1 | 10/2003 | Hwang |
| 2003/0220835 A1 | 11/2003 | Barnes, Jr. |
| 2003/0222762 A1 | 12/2003 | Beigl et al. |
| 2003/0224760 A1 | 12/2003 | Day |
| 2003/0227570 A1 | 12/2003 | Kim et al. |
| 2003/0229900 A1 | 12/2003 | Reisman |
| 2003/0236866 A1 | 12/2003 | Light |
| 2004/0003307 A1 | 1/2004 | Tsuji |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0082321 A1 | 4/2004 | Kontianinen |
| 2004/0103303 A1 | 5/2004 | Yamauchi et al. |
| 2004/0107072 A1* | 6/2004 | Dietrich et al. ............... 702/153 |
| 2004/0114732 A1 | 6/2004 | Choe et al. |
| 2004/0117108 A1 | 6/2004 | Nemeth |
| 2004/0137893 A1 | 7/2004 | Muthuswamy et al. |
| 2004/0137983 A1 | 7/2004 | Kerr et al. |
| 2004/0142678 A1 | 7/2004 | Krasner |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0203490 A1 | 10/2004 | Kaplan |
| 2004/0203520 A1 | 10/2004 | Schirtzinger et al. |
| 2004/0203577 A1 | 10/2004 | Forman et al. |
| 2004/0203904 A1 | 10/2004 | Gwon et al. |
| 2004/0203909 A1 | 10/2004 | Koster |
| 2004/0204035 A1 | 10/2004 | Raghuram et al. |
| 2004/0204126 A1 | 10/2004 | Reyes et al. |
| 2004/0204821 A1 | 10/2004 | Tu |
| 2004/0204848 A1 | 10/2004 | Matsuo et al. |
| 2004/0209649 A1 | 10/2004 | Lord |
| 2004/0216037 A1 | 10/2004 | Hishida et al. |
| 2004/0219951 A1 | 11/2004 | Holder |
| 2004/0222988 A1 | 11/2004 | Donnelly |
| 2004/0235520 A1 | 11/2004 | Cadiz et al. |
| 2004/0242269 A1 | 12/2004 | Fadell |
| 2004/0248586 A1 | 12/2004 | Patel et al. |
| 2004/0252197 A1 | 12/2004 | Fraley et al. |
| 2004/0257208 A1 | 12/2004 | Huang et al. |
| 2005/0004749 A1 | 1/2005 | Park |
| 2005/0020301 A1 | 1/2005 | Lee |
| 2005/0026629 A1 | 2/2005 | Contractor |
| 2005/0036509 A1 | 2/2005 | Acharya et al. |
| 2005/0048987 A1 | 3/2005 | Glass |
| 2005/0070257 A1 | 3/2005 | Saarinen et al. |
| 2005/0090768 A1 | 4/2005 | Brattesani et al. |
| 2005/0097038 A1 | 5/2005 | Yu et al. |
| 2005/0107119 A1 | 5/2005 | Lee et al. |
| 2005/0113080 A1 | 5/2005 | Nishimura |
| 2005/0120225 A1 | 6/2005 | Kirsch et al. |
| 2005/0136949 A1 | 6/2005 | Barnes, Jr. |
| 2005/0153681 A1 | 7/2005 | Hanson |
| 2005/0153745 A1 | 7/2005 | Smethers |
| 2005/0164684 A1 | 7/2005 | Chen et al. |
| 2005/0165871 A1 | 7/2005 | Barrs, II et al. |
| 2005/0166242 A1 | 7/2005 | Matsumoto et al. |
| 2005/0186954 A1 | 8/2005 | Kenney |
| 2005/0191969 A1 | 9/2005 | Mousseau |
| 2005/0233766 A1* | 10/2005 | Futami ....................... 455/556.1 |
| 2005/0235312 A1 | 10/2005 | Karaoguz et al. |
| 2005/0261945 A1 | 11/2005 | Mougin et al. |
| 2006/0015819 A1 | 1/2006 | Hawkins et al. |
| 2006/0031407 A1 | 2/2006 | Dispensa et al. |
| 2006/0041923 A1 | 2/2006 | McQuaide, Jr. |
| 2006/0052100 A1 | 3/2006 | Almgren |
| 2006/0073820 A1 | 4/2006 | Craswell et al. |
| 2006/0133590 A1 | 6/2006 | Jiang |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0206913 A1 | 9/2006 | Jerding et al. |
| 2006/0234758 A1 | 10/2006 | Parupudi et al. |
| 2006/0284732 A1 | 12/2006 | Brock-Fisher |
| 2007/0061845 A1 | 3/2007 | Barnes, Jr. |
| 2007/0109262 A1 | 5/2007 | Oshima et al. |
| 2007/0142047 A1 | 6/2007 | Heeschen |
| 2007/0190944 A1 | 8/2007 | Doan et al. |
| 2007/0204014 A1 | 8/2007 | Greer et al. |
| 2007/0260456 A1 | 11/2007 | Proux et al. |
| 2007/0262848 A1 | 11/2007 | Berstis et al. |
| 2008/0014917 A1 | 1/2008 | Rhoads et al. |
| 2008/0016526 A1 | 1/2008 | Asmussen |
| 2008/0016534 A1 | 1/2008 | Ortiz et al. |
| 2008/0039155 A1* | 2/2008 | Kim ........................ 455/575.1 |
| 2008/0058005 A1 | 3/2008 | Zicker et al. |

| | | | | | | |
|---|---|---|---|---|---|---|
| 2008/0242283 | A1 | 10/2008 | Ruckart | 2010/0099457 A1 | 4/2010 | Kim |
| | | | | 2010/0174421 A1* | 7/2010 | Tsai et al. ................. 700/302 |
| 2008/0250459 | A1 | 10/2008 | Roman | 2010/0182311 A1* | 7/2010 | Kim ............................ 345/419 |
| 2009/0197641 | A1 | 8/2009 | Rofougaran et al. | * cited by examiner | | |

Device A • 312 • 313 • 314 • Device B

RAM 206 — 261 — V.R.W.A.

Sound Processor 205 — 282 — V.R.S.

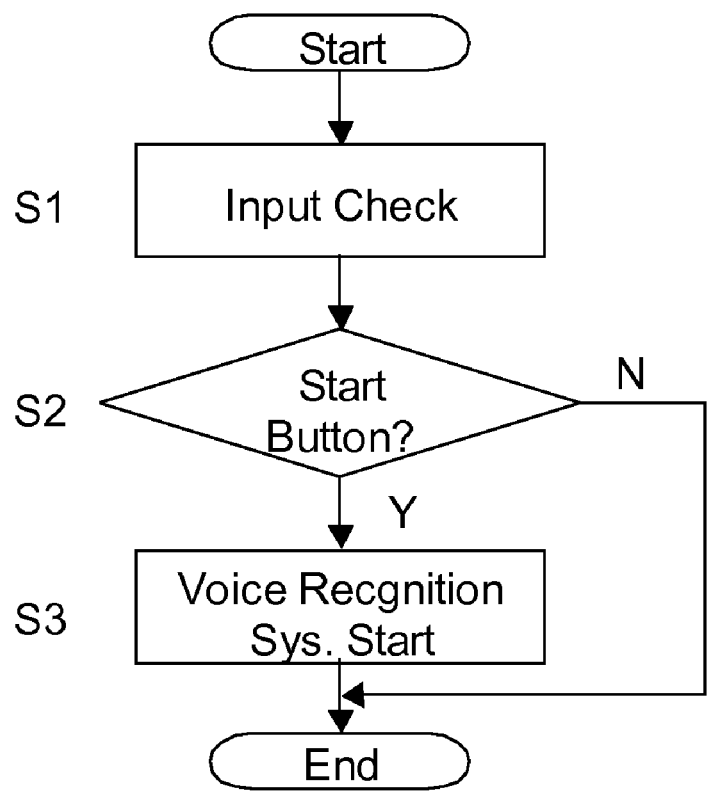

Table #1

| Audio Info #1 | Scott |
|---|---|
| Audio Info #2 | Carol |
| Audio Info #3 | Peter |
| Audio Info #4 | Amy |
| Audio Info #5 | Brian |

Fig. 8

Table #2

| Scott | (916) 411-2526 |
|---|---|
| Carol | (418) 675-6566 |
| Peter | (220) 890-1567 |
| Amy | (615) 125-3411 |
| Brian | (042) 645-2097 |

Fig. 9

Table #A

| Audio Info #1 | (916) 411-2526 |
|---|---|
| Audio Info #2 | (418) 675-6566 |
| Audio Info #3 | (220) 890-1567 |
| Audio Info #4 | (615) 125-3411 |
| Audio Info #5 | (042) 645-2097 |

Fig. 10

ROM 207

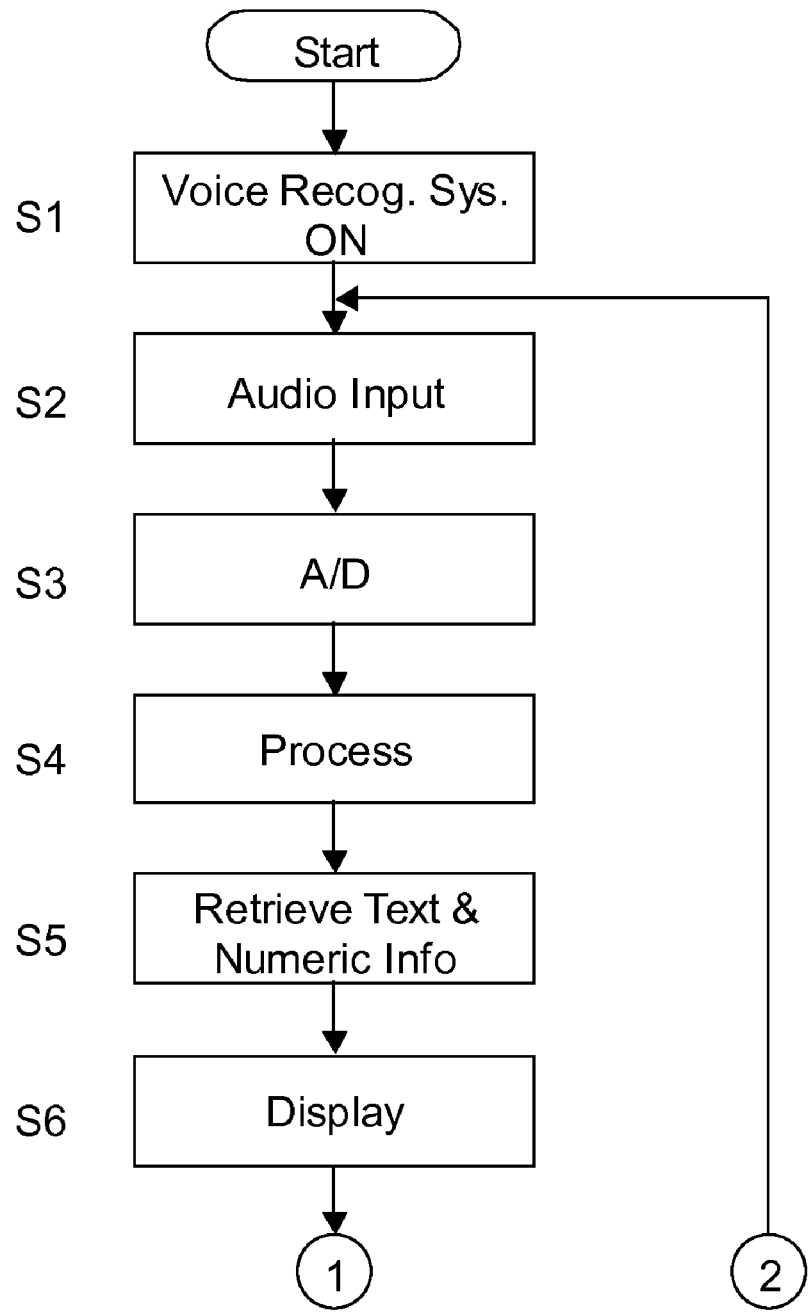

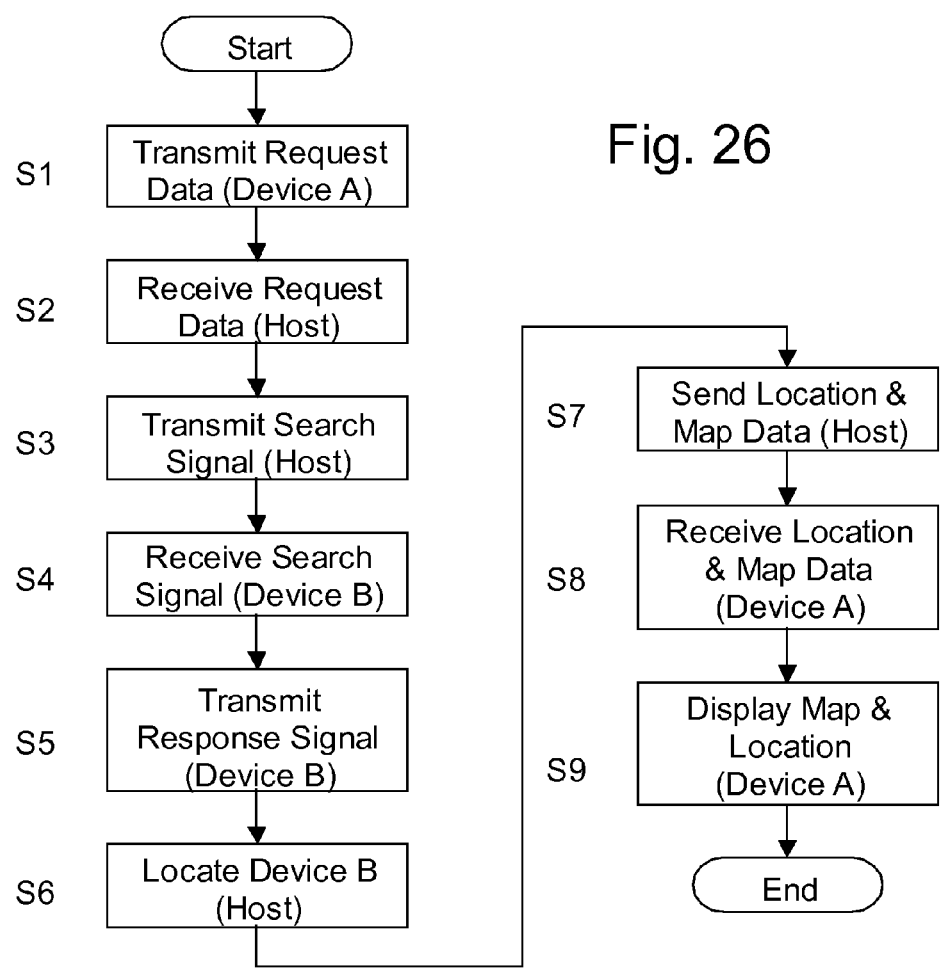

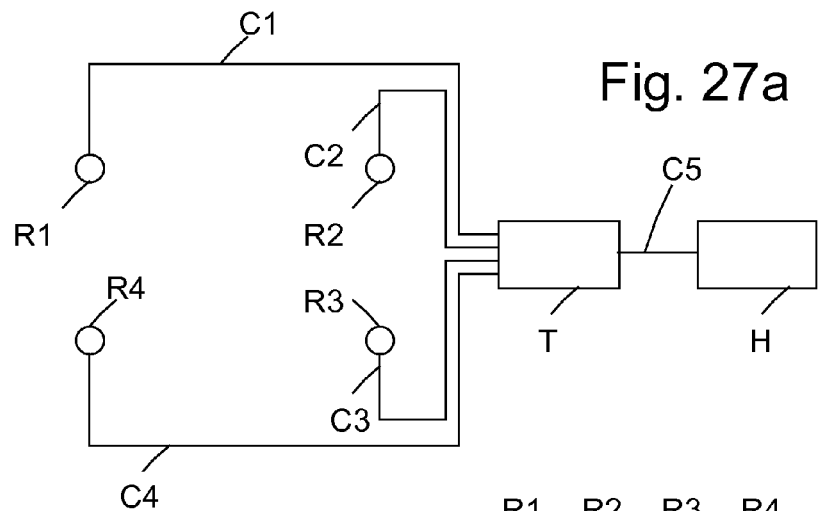
Fig. 27a
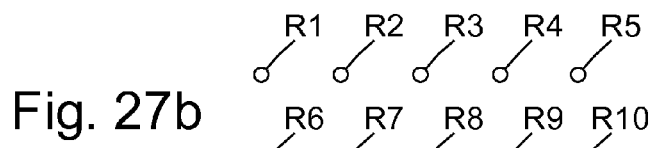
Fig. 27b
Fig. 28
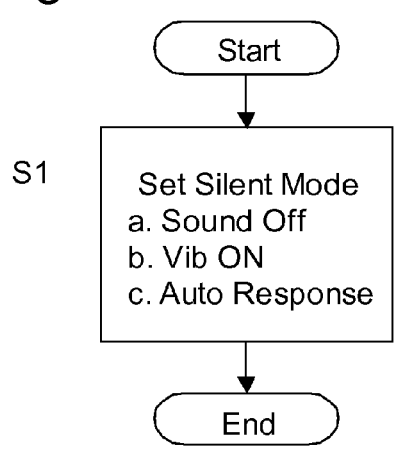

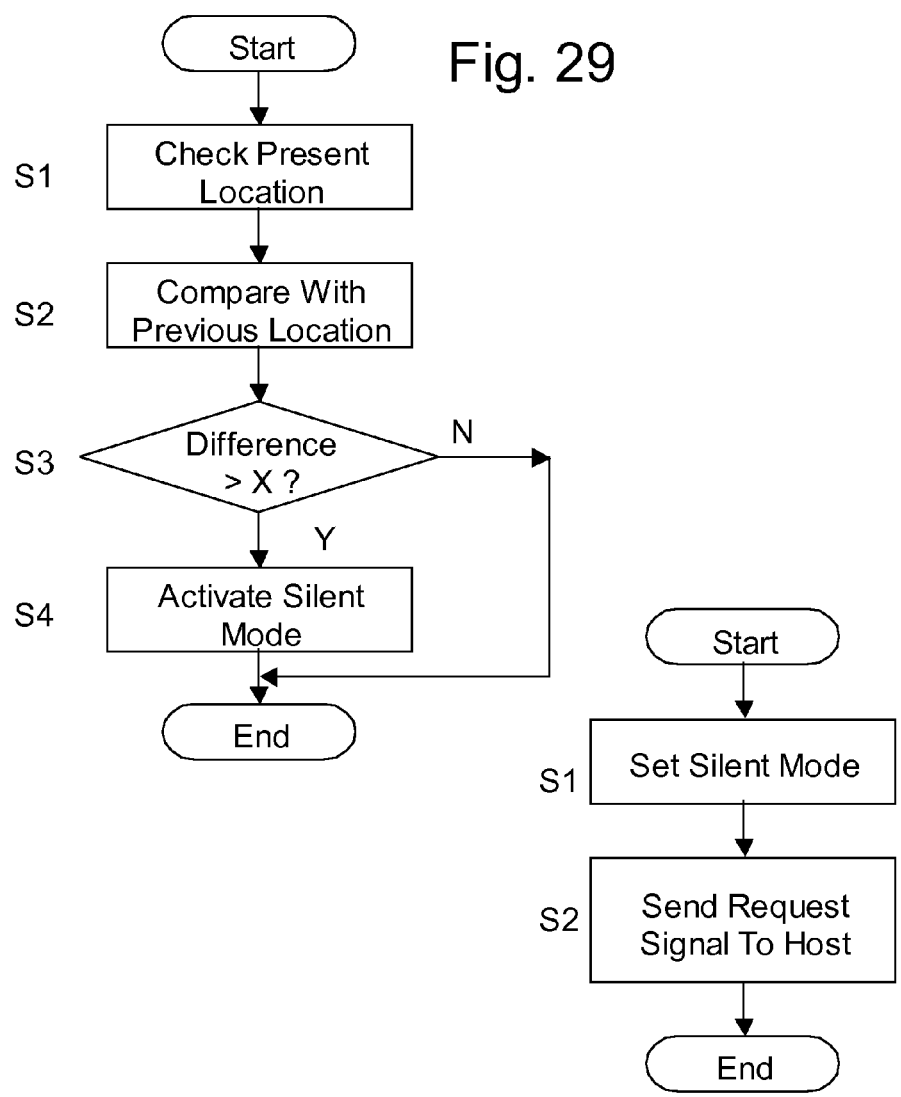

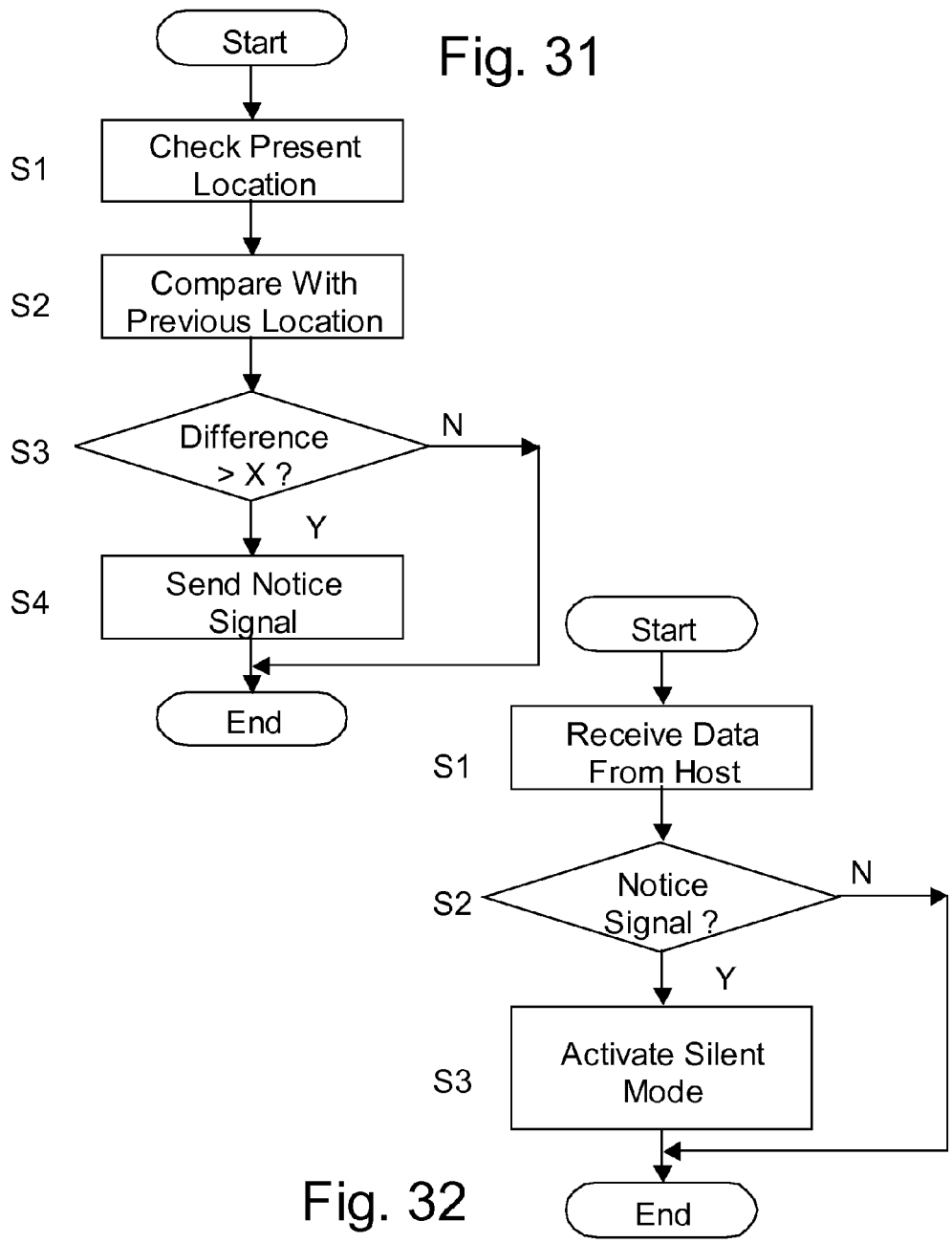

Fig. 32a
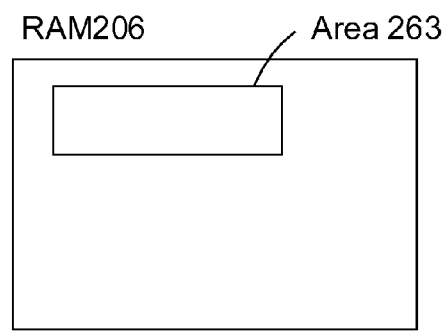
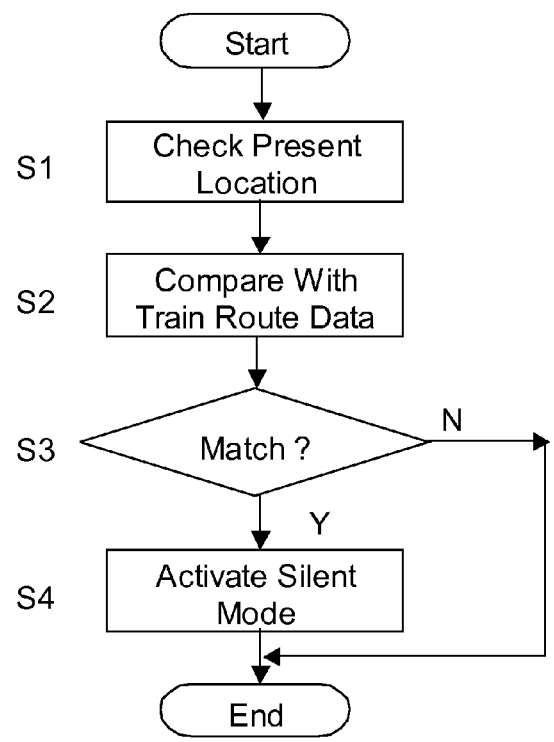
Fig. 32b

RAM 206

Table C

| Phone #1 | Color A | Sound E |
| Phone #2 | Color B | Sound F |
| Phone #3 | Color C | Sound G |
| Phone #4 | Color D | Sound H |

Fig. 73
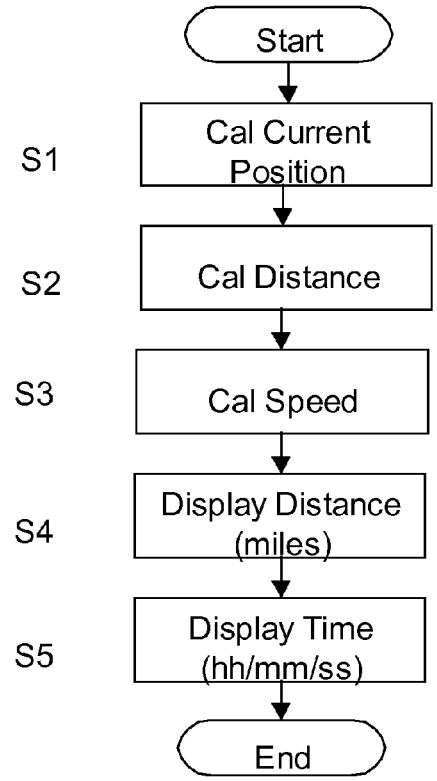
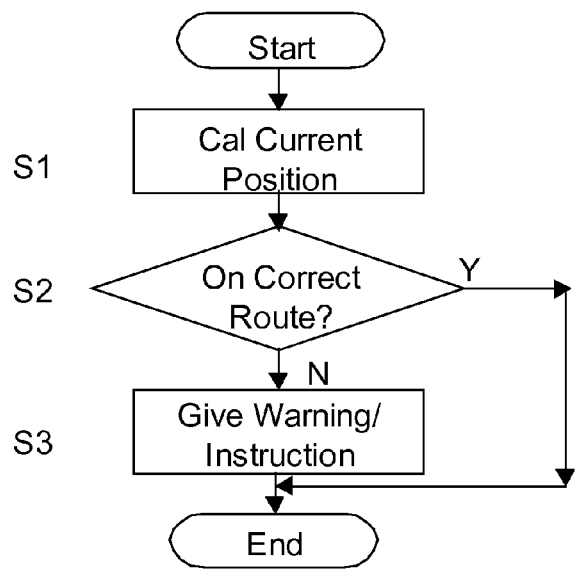
Fig. 74

COMMUNICATION DEVICE

CROSS REFERENCE TO RELATED APPLICATIONS

This application is a continuation of U.S. Ser. No. 12/110,294, filed Apr. 26, 2008, which is a continuation of U.S. Ser. No. 10/904,291, filed Nov. 3, 2004, now U.S. Pat. No. 7,466,992, which is a continuation of U.S. Ser. No. 10/202,374, filed Jul. 24, 2002, which claims the benefit of U.S. Provisional Application No. 60/329,964, filed Oct. 18, 2001, all of which are hereby incorporated herein by reference in their entirety.

FIELD OF THE INVENTION

The invention relates to communication device and more particularly to the communication device which has a capability to communicate with another communication device in a wireless fashion.

BACKGROUND OF THE INVENTION

U.S. Pat. No. 6,363,320 introduces a system for tracking objects which includes a database for storing reference data as line segments corresponding to coordinate locations along environmental reference features; mobile units for connection to the objects for receiving coordinate object target point locations, and having means for receiving signals from an external location system and for generating the object data, and a wireless object data transmitter; and a computer having access to the database and to the object data, and generating an interpreted location of each of the objects in terms relative to automatically selected ones of the reference features. Also disclosed is a method for tracking the objects. Further disclosed is a computer program embodied on a computer-readable medium and having code segments for tracking objects according to the method. In this prior art, FIG. 2 illustrates the theory and/or the concept of producing and displaying a plurality of two-dimensional images on a display of a wireless communication devise, however, does not disclose the wireless communication device, which implements voice communication, which further implements a first function and a second function, wherein when the first function is implemented, the video image generator generates a plurality of two-dimensional text images and the plurality of two-dimensional text images are displayed on the display, and when the second function is implemented, the video image generator generates a plurality of three-dimensional graphic images and the plurality of three-dimensional graphic images are displayed on the display, and when a phone call from a specific caller is received, the wireless communication device refrains from answering the phone call.

SUMMARY OF THE INVENTION

It is an object of the present invention to provide a system and method to facilitate the user of the communication device to enjoy both two-dimensional images and three-dimensional images displayed thereon.

Still another object is to overcome the aforementioned shortcomings associated with the prior art.

Further objects, features, and advantages of the present invention over the prior art will become apparent from the detailed description which follows, when considered with the attached figures.

The present invention introduces the wireless communication device, which implements voice communication, which further implements a first function and a second function, wherein when the first function is implemented, the video image generator generates a plurality of two-dimensional text images and the plurality of two-dimensional text images are displayed on the display, and when the second function is implemented, the video image generator generates a plurality of three-dimensional graphic images and the plurality of three-dimensional graphic images are displayed on the display, and when a phone call from a specific caller is received, the wireless communication device refrains from answering the phone call.

BRIEF DESCRIPTION OF THE DRAWINGS

The above and other aspects, features, and advantages of the invention will be better understood by reading the following more particular description of the invention, presented in conjunction with the following drawings, wherein:

FIG. 5 is a flowchart illustrating an exemplary embodiment of the present invention.

FIG. 8 is a simplified illustration illustrating an exemplary embodiment of the present invention.

FIG. 9 is a simplified illustration illustrating an exemplary embodiment of the present invention.

FIG. 10 is a simplified illustration illustrating an exemplary embodiment of the present invention.

FIG. 17a is a flowchart illustrating an exemplary embodiment of the present invention.

FIG. 26 is a flowchart illustrating an exemplary embodiment of the present invention.

FIG. 27a is a simplified illustration illustrating an exemplary embodiment of the present invention.

FIG. 27b is a simplified illustration illustrating an exemplary embodiment of the present invention.

FIG. 28 is a flowchart illustrating an exemplary embodiment of the present invention.

FIG. 29 is a flowchart illustrating an exemplary embodiment of the present invention.

FIG. 30 is a flowchart illustrating an exemplary embodiment of the present invention.

FIG. 31 is a flowchart illustrating an exemplary embodiment of the present invention.

FIG. 32 is a flowchart illustrating an exemplary embodiment of the present invention.

FIG. 32a is a block diagram illustrating an exemplary embodiment of the present invention.

FIG. 32b is a flowchart illustrating an exemplary embodiment of the present invention.

FIG. 73 is a flowchart illustrating an exemplary embodiment of the present invention.

FIG. 74 is a flowchart illustrating an exemplary embodiment of the present invention.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
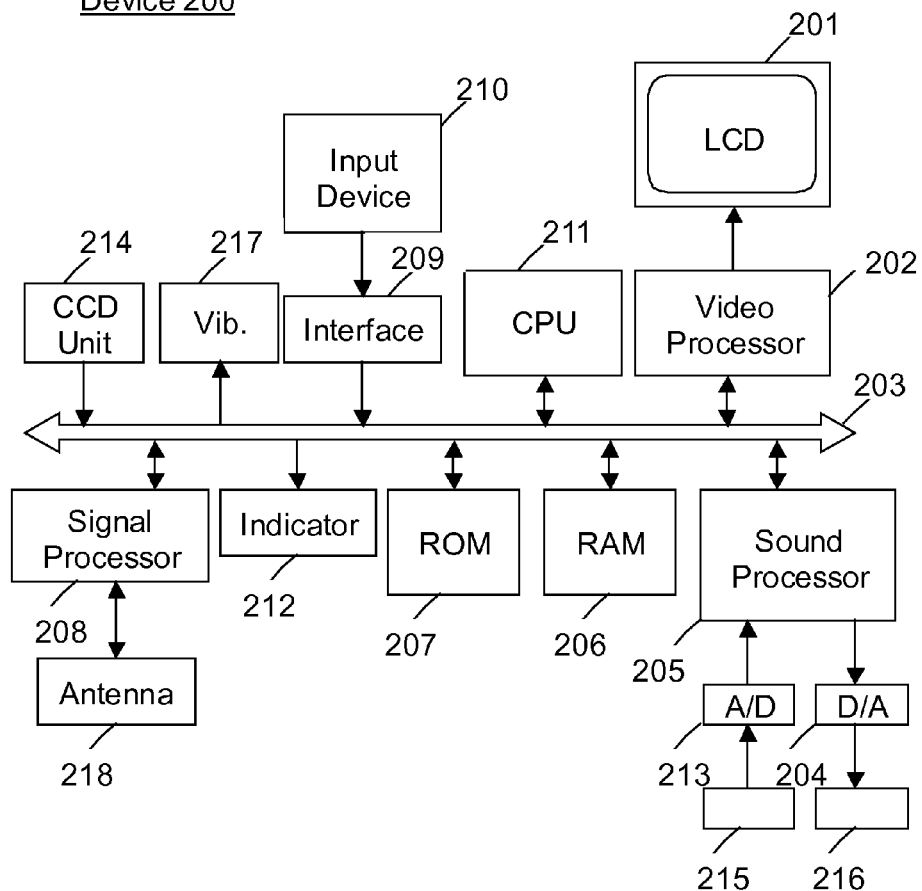
FIG. 1 is a block diagram illustrating an exemplary embodiment of the present invention.

FIG. 1 is a simplified block diagram of the communication device 200 utilized in the present invention. In FIG. 1 communication device 200 includes CPU 211 which controls and administers the overall function and operation of communication device 200. CPU 211 uses RAM 206 to temporarily store data and/or to perform calculation to perform its function. Video processor 202 generates analog and/or digital video signals which are displayed on LCD 201. ROM 207 stores data and programs which are essential to operate communication device 200. Wireless signals are received by antenna 218 and processed by signal processor 208. Input signals are input by input device 210, such as dial pad, and the signal is transferred via input interface 209 and data bus 203 to CPU 211. Indicator 212 is an LED lamp which is designed to output different colors (e.g., red, blue, green, etc). Analog audio data is input to microphone 215. A/D 213 converts the analog audio data into a digital format. Speaker 216 outputs analog audio data which is converted into an analog format by D/A 204. Sound processor 205 produces digital audio signals that are transferred to D/A 204 and also processes the digital audio signals transferred from A/D 213. CCD unit 214 captures video image which is stored in RAM 206 in a digital format. Vibrator 217 vibrates the entire device by the command from CPU 211.

Figure 2A:
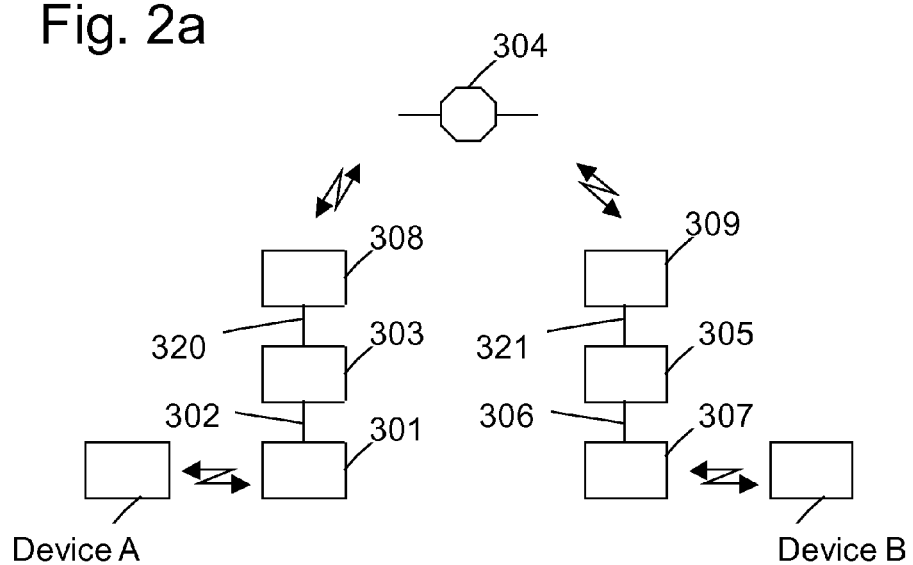
FIG. 2a is a simplified illustration illustrating an exemplary embodiment of the present invention.

FIG. 2a illustrates one of the preferred methods of the communication between two communication devices. In FIG. 2a both device A and device B represents communication device 200 in FIG. 1. Device A transfers wireless data to transmitter 301 which relays the data to host 303 via cable 302. The data is transferred to transmitter 308 (e.g., a satellite dish) via cable 320 and then to artificial satellite 304. Artificial satellite 304 transfers the data to transmitter 309 which transfers the data to host 305 via cable 321. The data is then transferred to transmitter 307 via cable 306 and to device B in a wireless format.

Figure 2B:
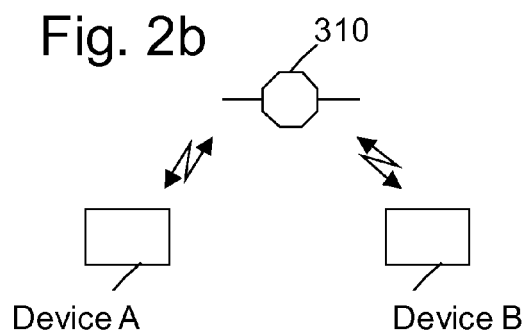
FIG. 2b is a simplified illustration illustrating an exemplary embodiment of the present invention.

FIG. 2b illustrates another preferred method of the communication between two communication devices. In this example device A directly transfers the wireless data to host 310, an artificial satellite, which transfers the data directly to device B.

Figure 2C:
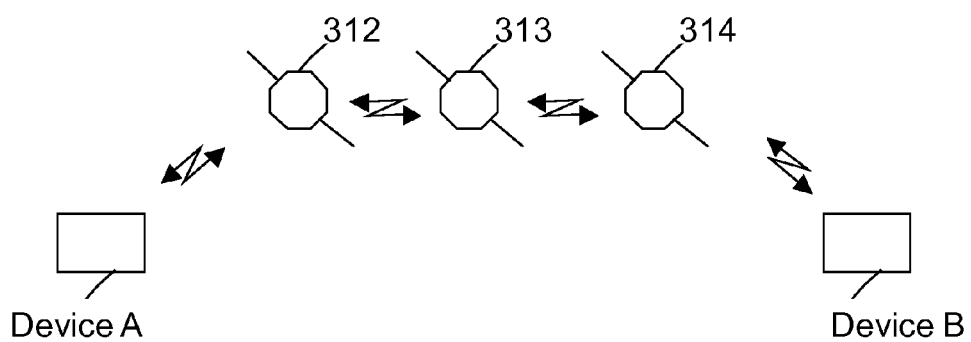
FIG. 2c is a simplified illustration illustrating an exemplary embodiment of the present invention.

FIG. 2c illustrates another preferred method of the communication between two communication devices. In this example device A transfers wireless data to transmitter 312, an artificial satellite, which relays the data to host 313, which is also an artificial satellite, in a wireless format. The data is transferred to transmitter 314, an artificial satellite, which relays the data to device B in a wireless format.

Voice Recognition

Communication device 200 has a function to operate the device by the user's voice or convert the user's voice into a text format (i.e., voice recognition). The voice recognition function can be performed in terms of software by using area 261, the voice recognition working area, of RAM 206 (FIG. 1) which is specifically allocated to perform such function as described in FIG. 3, or can also be performed in terms of hardware circuit where such space is specifically allocated in area 282 of sound processor 205 (FIG. 1) for the voice recognition system as described in FIG. 4.

Figure 3:
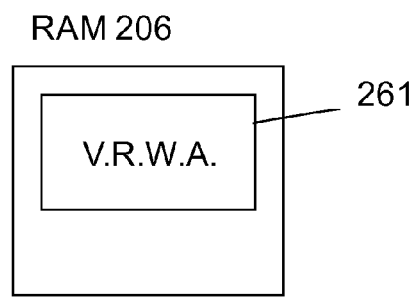
FIG. 3 is a block diagram illustrating an exemplary embodiment of the present invention.
Figure 4:
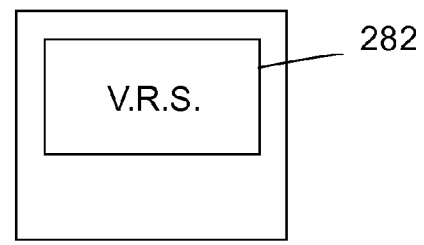
FIG. 4 is a block diagram illustrating an exemplary embodiment of the present invention.

FIG. 5 illustrates how the voice recognition function is activated. CPU 211 (FIG. 1) periodically checks the input status of input device 210 (FIG. 1) (S1). If the CPU 211 detects a specific signal input from input device 210 (S2) the voice recognition system which is described in FIG. 2 and/or FIG. 3 is activated.

Voice Recognition—Dialing/Auto-Off During Call

Figure 6A:
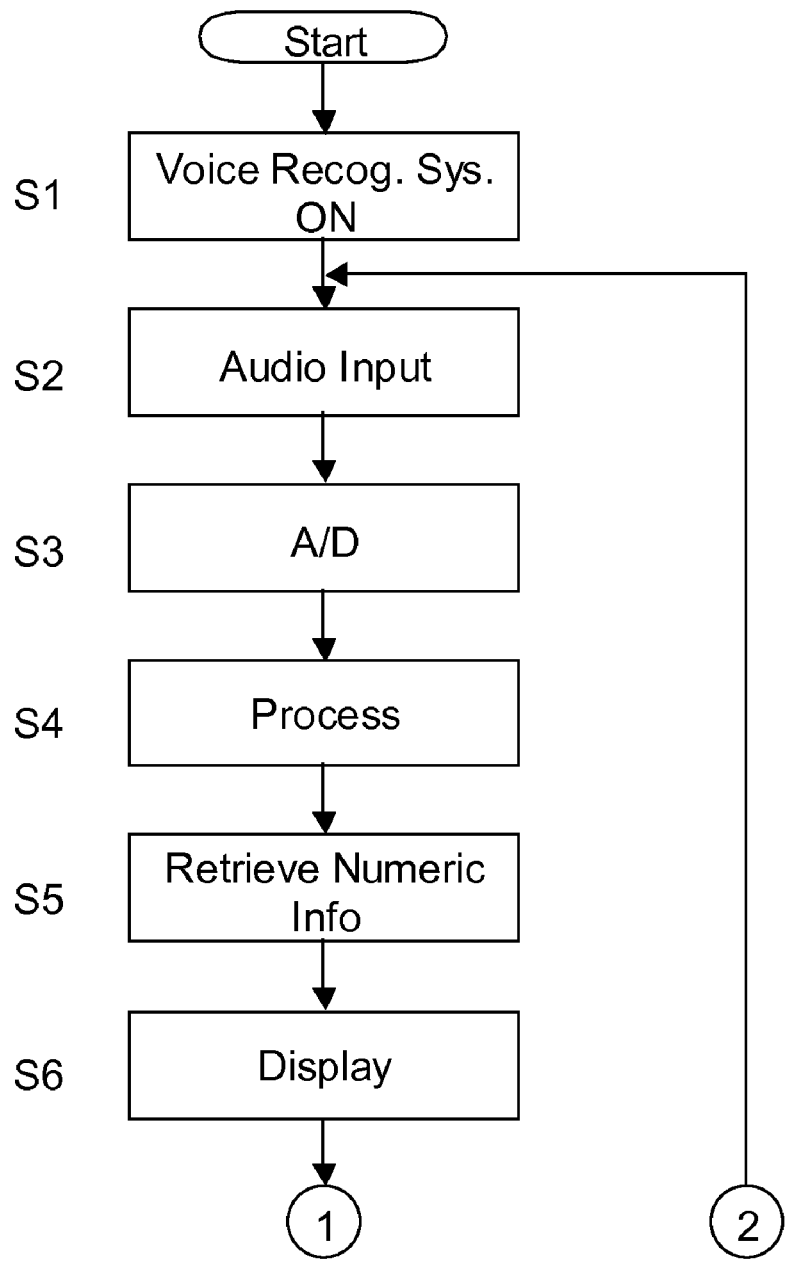
FIG. 6a is a flowchart illustrating an exemplary embodiment of the present invention.
Figure 6B:
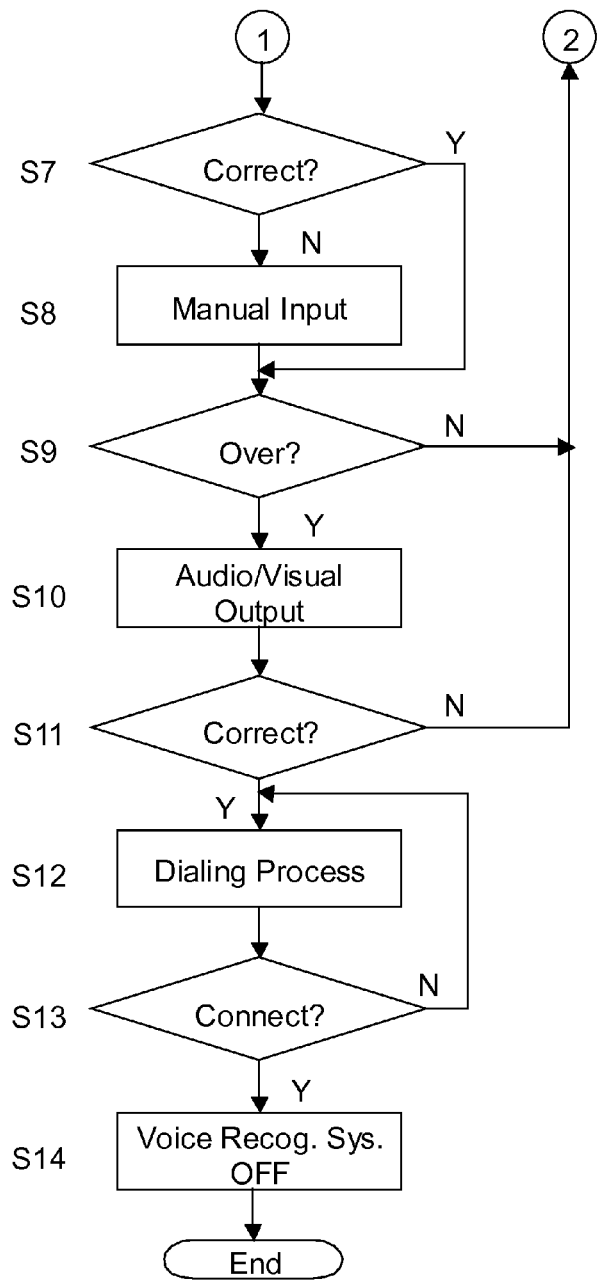
FIG. 6b is a flowchart illustrating an exemplary embodiment of the present invention.
Figure 7:
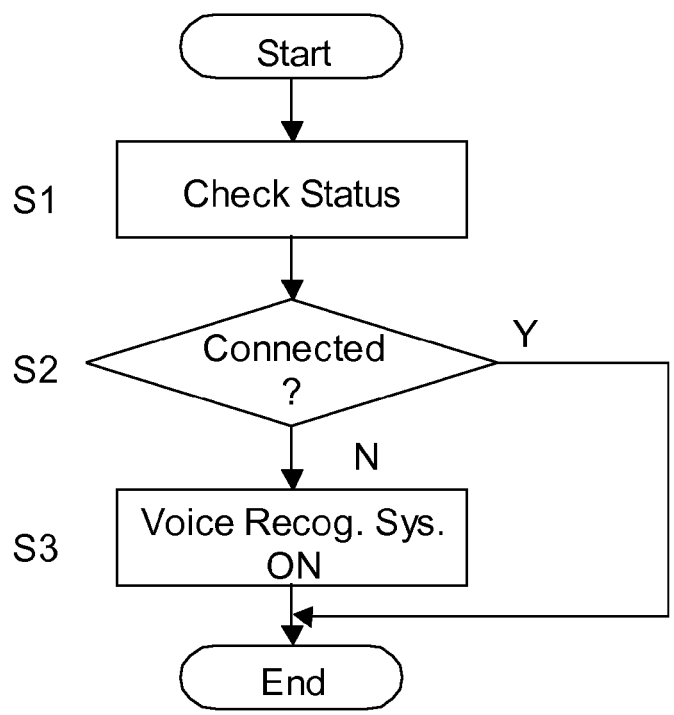
FIG. 7 is a flowchart illustrating an exemplary embodiment of the present invention.

FIG. 6a and FIG. 6b illustrate the operation of the voice recognition in the present invention. Once the voice recognition system is activated (S1) the analog audio data is input from microphone 215 (FIG. 1) (S2). The analog audio data is converted into digital data by A/D 213 (FIG. 1) (S3). The digital audio data is processed by sound processor 205 (FIG. 1) to retrieve the text and numeric information therefrom (S4). Then the numeric information is retrieved (S5) and displayed on LCD 201 (FIG. 1) (S6). If the retrieved numeric information is not correct (S7) the user can input the correct numeric information manually by using input device 210 (FIG. 1) (S8). Once the sequence of inputting the numeric information is completed the entire numeric information is displayed on LCD 201 and the sound is output from speaker 216 under control of CPU 211 (S10). If the numeric information is correct (S11) communication device 200 (FIG. 1) initiates the dialing process by using the numeric information (S12). The dialing process continues until communication device 200 is connected to another device (S13). Once CPU 211 detects that the line is connected it automatically deactivates the voice recognition system (S14). CPU 211 checks the status communication device 200 periodically (S1) as described in FIG. 7 and remains the voice recognition system offline during call (S2). If the connection is severed, i.e., user hangs up, then CPU 211 reactivates the voice recognition system (S3).

Voice Recognition—Tag

Figure 11:
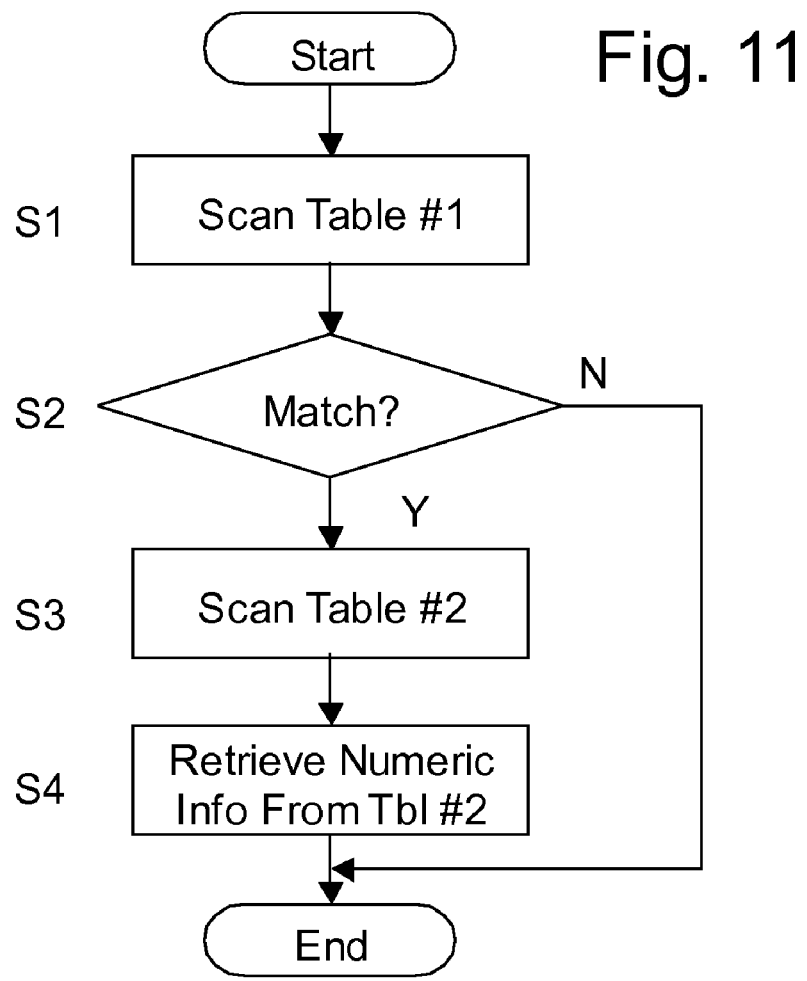
FIG. 11 is a flowchart illustrating an exemplary embodiment of the present invention.
Figure 12:
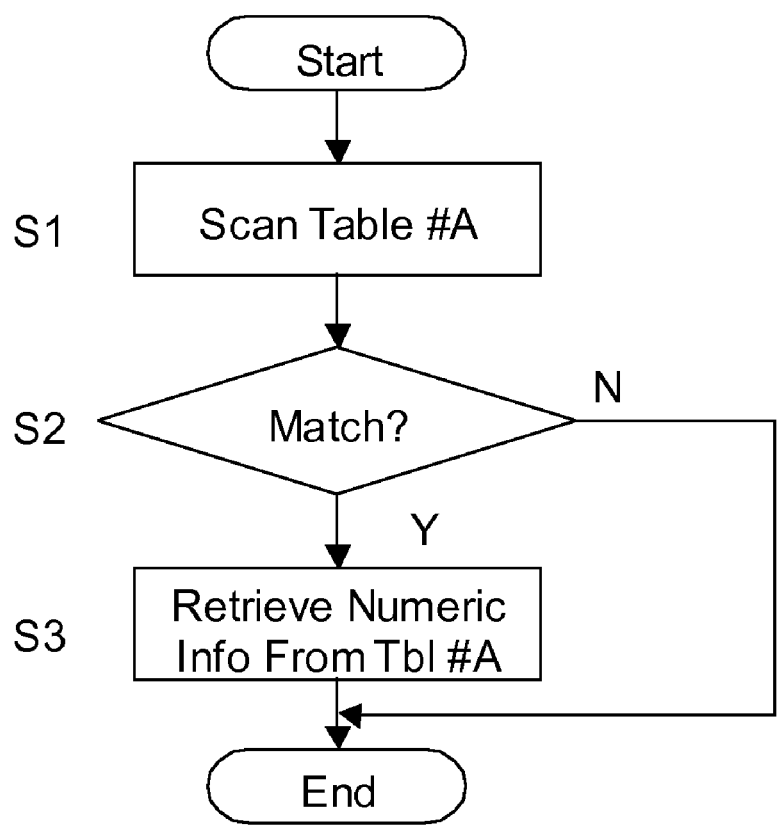
FIG. 12 is a flowchart illustrating an exemplary embodiment of the present invention.

FIG. 8 through FIG. 12 describes the method of inputting the numeric information in a convenient manner. RAM 206 includes Table #1 (FIG. 8) and Table #2 (FIG. 9). In FIG. 8 audio information #1 corresponds to tag "Scott." Namely audio information, such as wave data, which represents the sound of "Scott" (sounds like "S-ko-t") is registered in Table #1, which corresponds to tag "Scott". In the same manner audio information #2 corresponds to a tag "Carol"; audio information #3 corresponds to a tag "Peter"; audio information #4 corresponds to a tag "Amy"; and audio information #5 corresponds to a tag "Brian." In FIG. 9 tag "Scott" corresponds to numeric information "(916) 411-2526"; tag "Carol" corresponds to numeric information "(418) 675-6566"; tag "Peter" corresponds to numeric information "(220) 890-1527"; tag "Amy" corresponds to numeric information "(615) 125-3411"; and tag "Brian" corresponds to numeric information "(042) 643-2097." FIG. 11 illustrates how CPU 211 (FIG. 1) operates by utilizing both Table #1 and Table #2. Once the audio data is processed as described in S4 of FIG. 6 CPU 211 scans Table #1 (S1). If the retrieved audio data matches with one of the audio information registered in Table #1 (S2) it scans Table #2 (S3) and retrieves the corresponding numeric information from Table #2 (S4). FIG. 10 illustrates another embodiment of the present invention. Here, RAM 206 includes Table #A instead of Table #1 and Table #2 described above. In this embodiment audio info #1 (i.e., wave data which represents the sound of "Scot") directly corresponds to numeric information "(916) 411-2526." In the same manner audio info #2 corresponds to numeric information "(410) 675-6566"; audio info #3 corresponds to numeric information "(220) 890-1567"; audio info #4 corresponds to numeric information "(615) 125-3411"; and audio info #5 corresponds to numeric information "(042)645-2097." FIG. 12 illustrates how CPU 211 (FIG. 1) operates by utilizing Table #A. Once the audio data is processed as described in S4 of FIG. 6 CPU 211 scans Table #A (S1). If the retrieved audio data matches with one of the audio information registered in Table #A (S2) it retrieves the corresponding numeric information therefrom (S3). As another embodiment RAM 206 may contain only Table #2 and tag can be retrieved from the voice recognition system explained in FIG. 3 through FIG. 7. Namely once the audio data is processed by CPU 211 as described in S4 of FIG. 6 and retrieves the text data therefrom and detects one of the tags registered in Table #2 (e.g., "Scot") it retrieves the corresponding numeric information (e.g., "(916) 411-2526") from the same table.

Voice Recognition—Background Noise Filter

Figure 13:
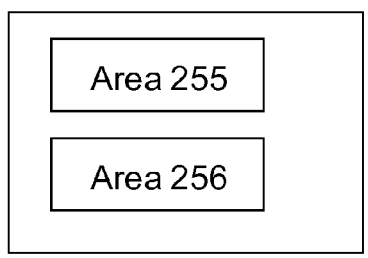
FIG. 13 is a block diagram illustrating an exemplary embodiment of the present invention.
Figure 14:
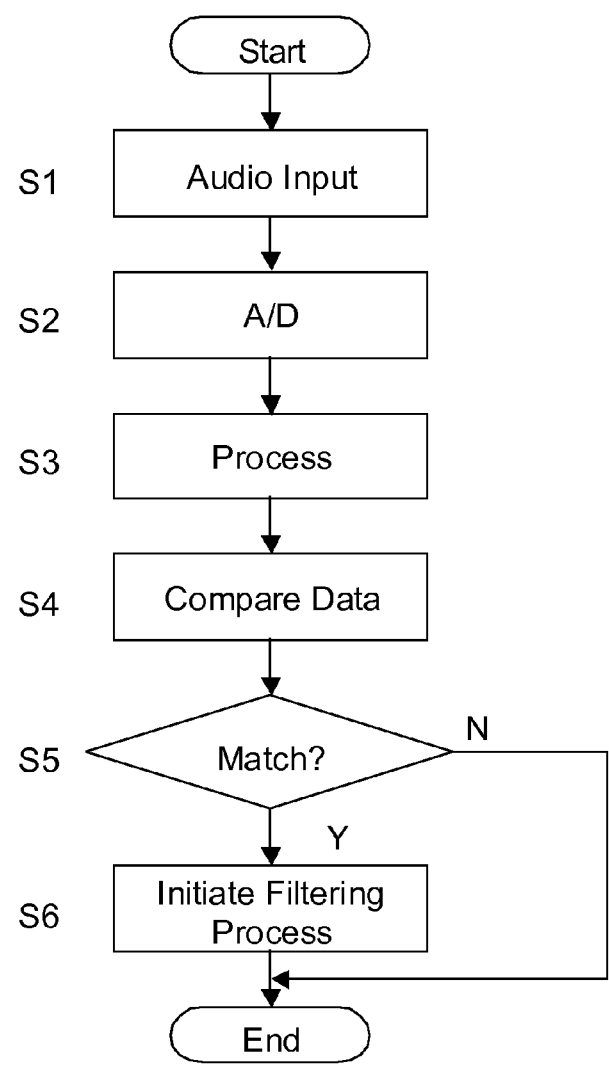
FIG. 14 is a flowchart illustrating an exemplary embodiment of the present invention.
Figure 14A:
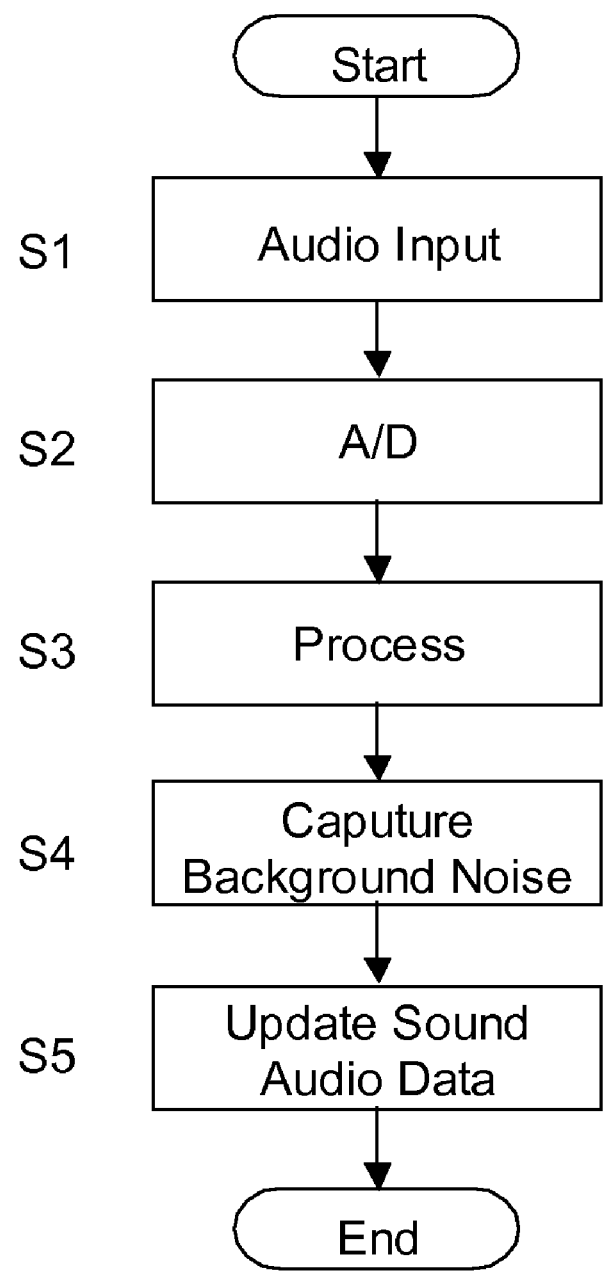
FIG. 14a is a flowchart illustrating an exemplary embodiment of the present invention.
Figure 15:
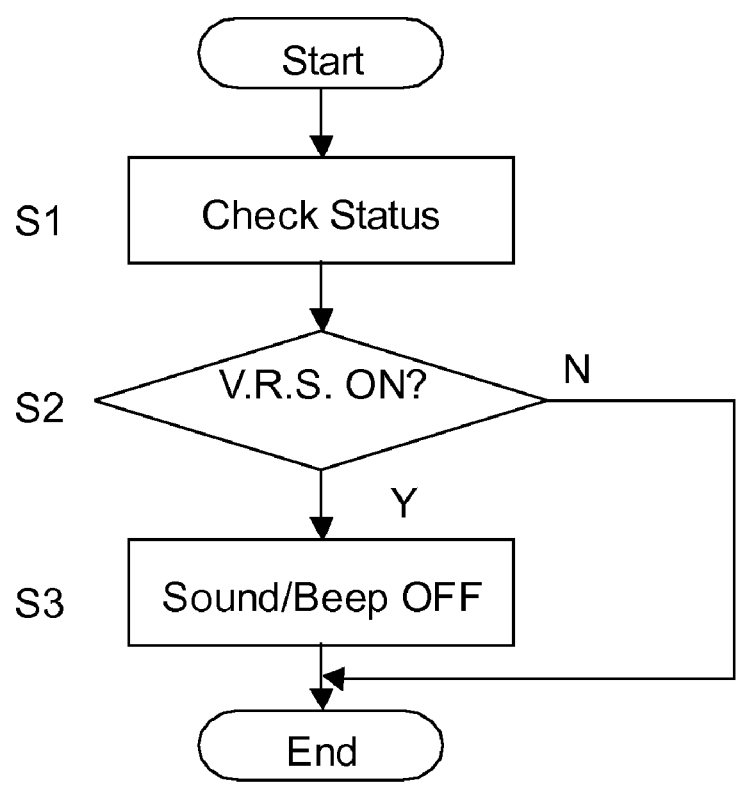
FIG. 15 is a flowchart illustrating an exemplary embodiment of the present invention.

FIG. 13 through FIG. 15 describes the method of minimizing the undesired effect of the background noise. ROM 207 includes area 255 and area 256. Sound audio data which represents background noise is stored in area 255, and sound audio data which represents the beep, ringing sound and other sounds which are emitted from the communication device 200 are stored in area 256. FIG. 14 describes how these data are utilized. When the voice recognition system is activated as described in FIG. 5 the analog audio data is input from microphone 215 (FIG. 1) (S1). The analog audio data is converted into digital data by A/D 213 (FIG. 1) (S2). The digital audio data is processed by sound processor 205 (FIG. 1) (S3) and compared to the data stored in area 255 and area 256 (S4). Such comparison can be done by either sound processor 205 or CPU 211. If the digital audio data matches to the data stored in area 255 and/or area 256 the filtering process is initiated and deleted as background noise. Such sequence of process is done before retrieving text and numeric information from the digital audio data. FIG. 14*a* describes the method of updating area 255. When the voice recognition system is activated as described in FIG. 5 the analog audio data is input from microphone 215 (FIG. 1) (S1). The analog audio data is converted into digital data by A/D 213 (FIG. 1) (S2). The digital audio data is processed by sound processor 205 (FIG. 1) (S3) and the background noise is captured (S4). CPU 211 (FIG. 1) scans area 255 and if the captured background noise is not registered in area 255 it updates the sound audio data stored therein. FIG. 15 describes another embodiment of the present invention. CPU 211 (FIG. 1) routinely checks whether the voice recognition system is activated (S1). If the system is activated (S2) the beep, ringing sound and other sounds which are emitted from the communication device 200 are automatically turned off (S3).

Voice Recognition—Automatic Turn-Off

Figure 16:
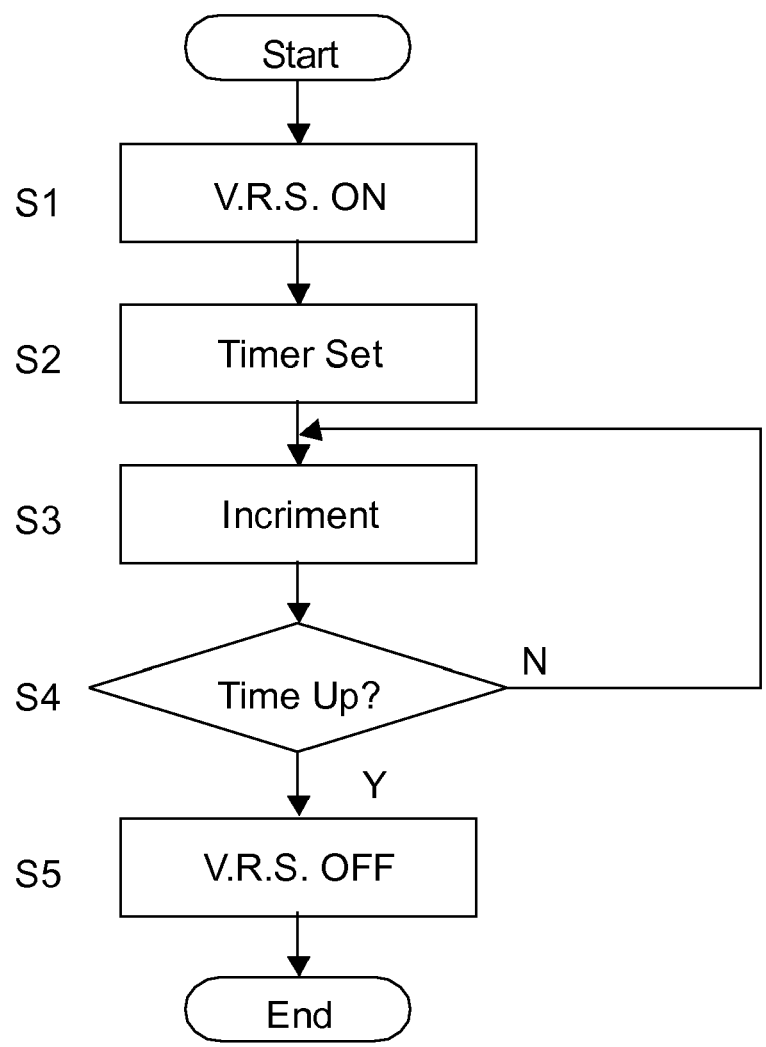
FIG. 16 is a flowchart illustrating an exemplary embodiment of the present invention.

The voice recognition system can automatically be turned off to avoid glitch as described in FIG. 16. When the voice recognition system is activated (S1) CPU 211 (FIG. 1) automatically sets a timer (S2). The value of timer (i.e., the length of time until the system is deactivated) can be set manually by the user. The timer is incremented periodically (S3) and if the incremented time equals to the predetermined value of time as set in S2 (S4) the voice recognition system is automatically deactivated (S5).

Voice Recognition—E-Mail

Figure 17B:
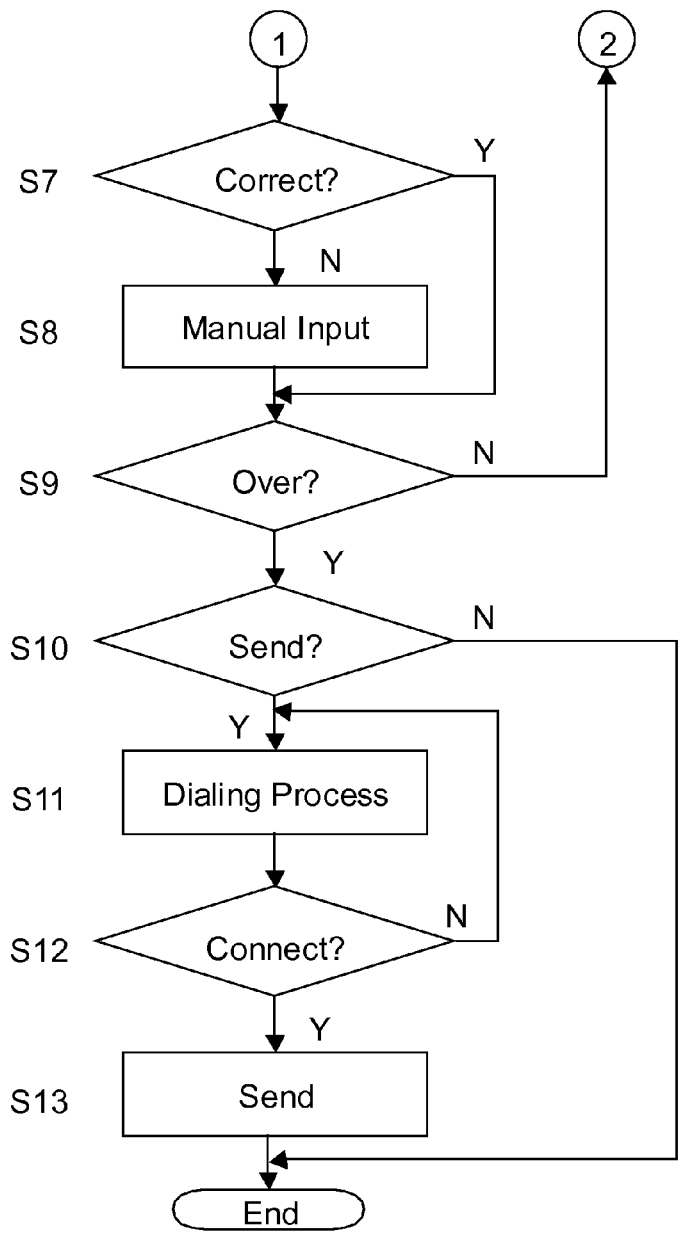
FIG. 17b is a flowchart illustrating an exemplary embodiment of the present invention.

FIG. 17*a* and FIG. 17*b* illustrate the method of typing and sending e-mails by utilizing the voice recognition system. Once the voice recognition system is activated (S1) the analog audio data is input from microphone 215 (FIG. 1) (S2). The analog audio data is converted into digital data by A/D 213 (FIG. 1) (S3). The digital audio data is processed by sound processor 205 (FIG. 1) to retrieve the text and numeric information therefrom (S4). Then the text and numeric information are retrieved (S5) and displayed on LCD 201 (FIG. 1) (S6). If the retrieved information is not correct (S7) the user can input the correct text and/or numeric information manually by using the input device 210 (FIG. 1) (S8). If inputting the text and numeric information is completed (S9) and CPU 211 detects input signal from input device 210 to send the e-mail (S10) the dialing process is initiated (S11). The dialing process is repeated until communication device 200 is connected to its host (S12) and the e-mail is sent to the designated address (S13).

Voice Recognition—Speech-to-Text

Figure 18:
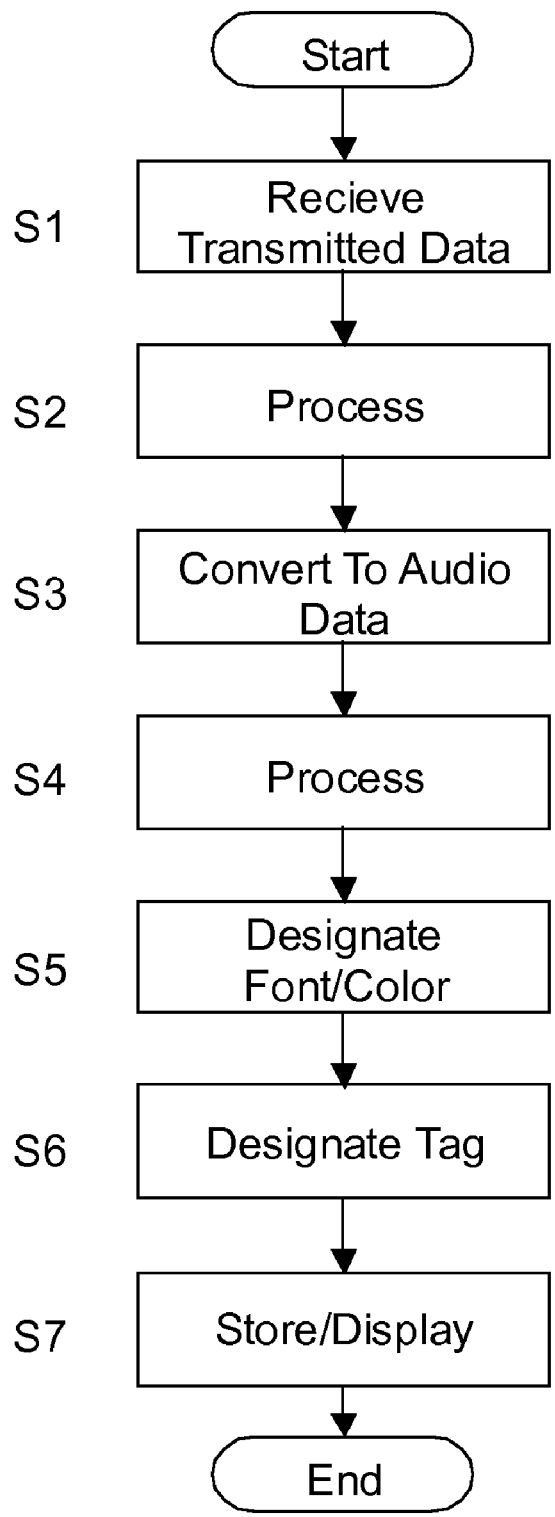
FIG. 18 is a flowchart illustrating an exemplary embodiment of the present invention.
Figure 19:
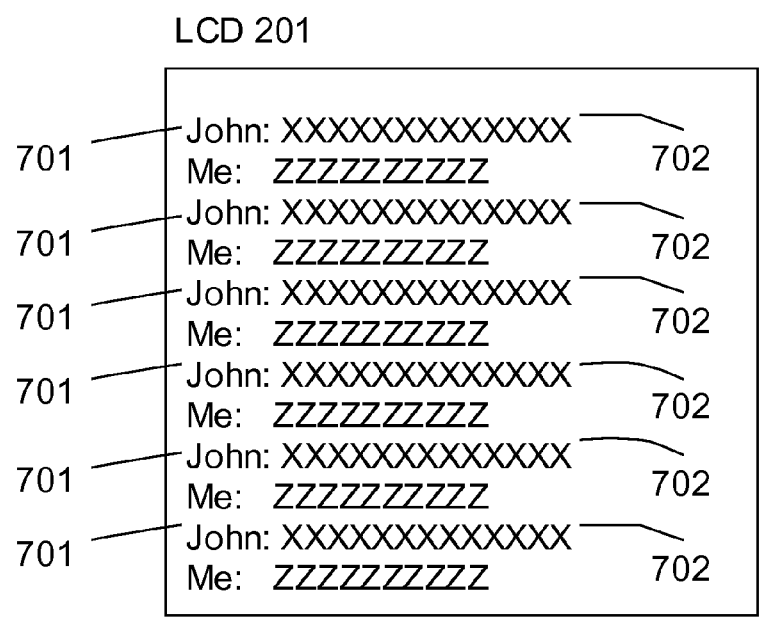
FIG. 19 is a simplified illustration illustrating an exemplary embodiment of the present invention.

FIG. 18 illustrates the speech-to-text function of communication device 200. Once communication device 200 receives a transmitted data from another device via antenna 218 (FIG. 1) (S1) signal processor 208 (FIG. 1) processes the data (e.g., such as decompression) (S2) and the transmitted data is converted into audio data (S3). Such conversion can be done by either CPU 211 (FIG. 1) or signal processor 208. The audio data is transferred to sound processor 205 (FIG. 1) via data bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7). FIG. 19 illustrates how the text and numeric information as well as the tag are displayed. On LCD 201 the text and numeric information 702 ("XXXXXXXXX") are displayed with the predetermined font and color as well as with the tag 701 ("John").

Positioning System

Figure 20A:
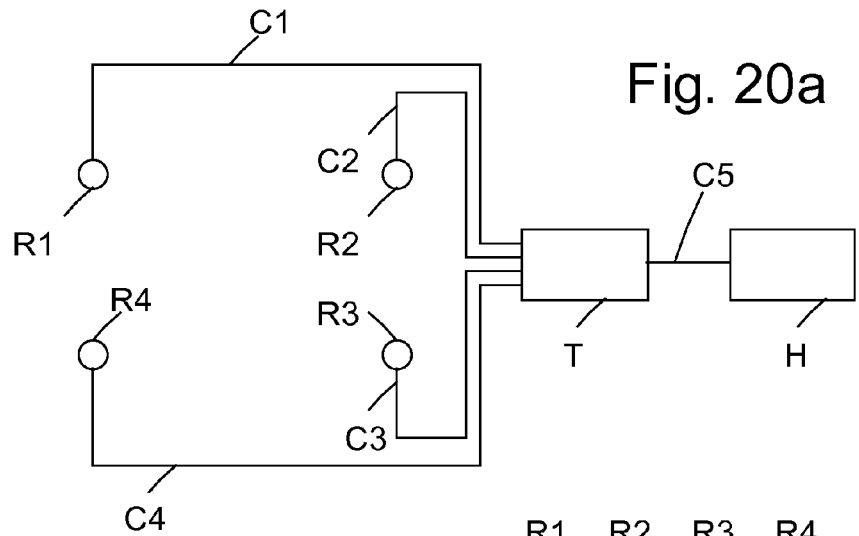
FIG. 20a is a simplified illustration illustrating an exemplary embodiment of the present invention.
Figure 20B:
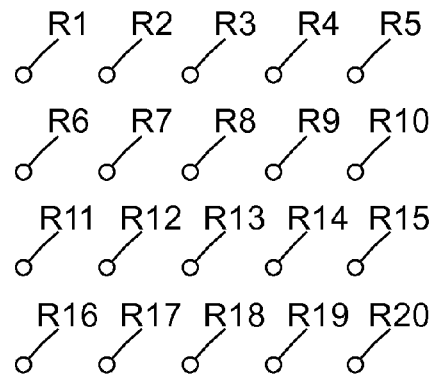
FIG. 20b is a simplified illustration illustrating an exemplary embodiment of the present invention.
Figure 21:
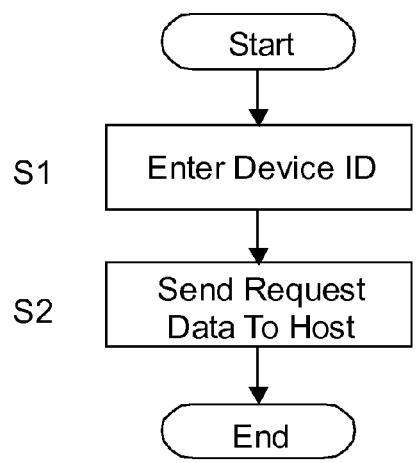
FIG. 21 is a flowchart illustrating an exemplary embodiment of the present invention.

FIG. 20*a* illustrates the simplified block diagram to detect the position of communication device 200. In FIG. 20*a* relay R1 is connected to cable C1, relay R2 is connected to cable C2, relay R3 is connected to cable C3, and relay R4 is connected to cable C4. Cables C1, C2, C3, and C4 are connected to transmitter T, which is connected to host H by cable C5. The relays (R 1 . . . R 20) are located throughout the predetermined area in the pattern illustrated in FIG. 20*b*. The system illustrated in FIG. 20*a* and FIG. 20*b* is designed to pin-point the position of communication device 200 by using the method so-called "global positioning system" or "GPS."

FIG. 21 through FIG. 26 illustrate how the positioning is performed. Assuming that device A, communication device 200, seeks to detect the position of device B, another communication device 200, which is located somewhere in the matrix of relays illustrated in FIG. 20*b*. First of all the device ID of device B is entered by using input device 210 (FIG. 1) of device A (S1). The device ID may be its corresponding phone number. A request data including the device ID is sent to host H from device A (S2).

Figure 22:
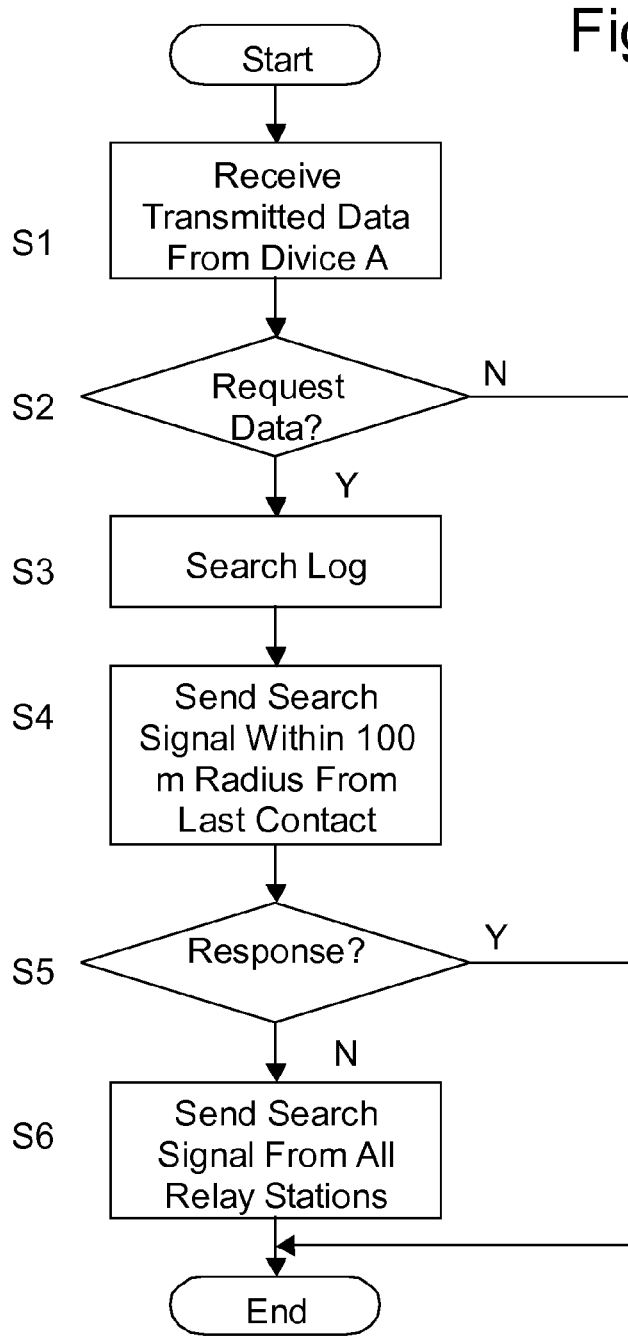
FIG. 22 is a flowchart illustrating an exemplary embodiment of the present invention.

As illustrated in FIG. 22 host H periodically receives data from Device A (S1). If the received data is the request data (S2) host H first of all searches its communication log which records the location of device B which it last communicated with host H (S3). Then host H sends search signal from relays described in FIG. 20*b* which are located within 100 meter radius from the location registered in the communication log. If there is no response from Device B (S5) host H sends search signal from all relays (from R1 to R20 in FIG. 20*b*) (S6).

Figures 23, 24:
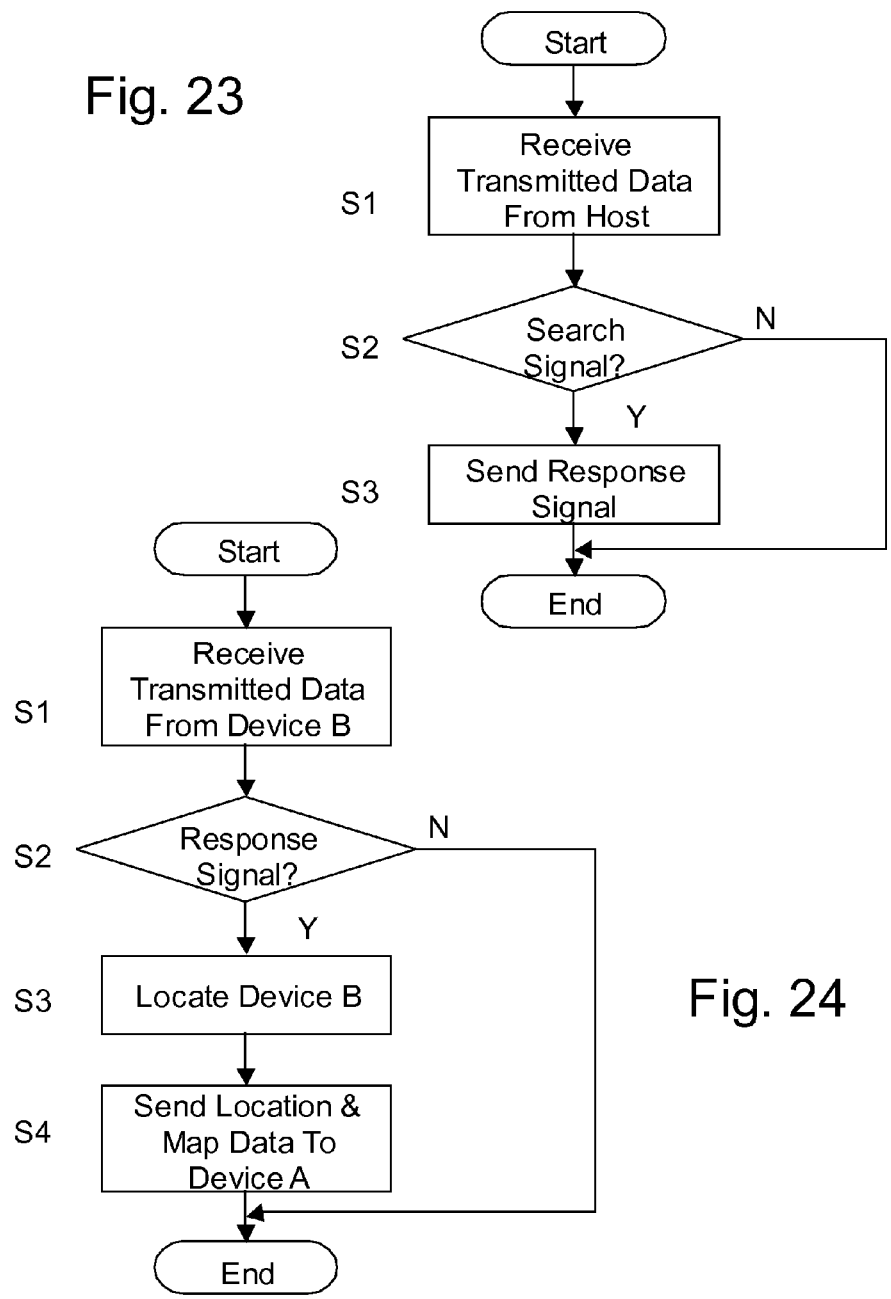
FIG. 23 is a flowchart illustrating an exemplary embodiment of the present invention.
FIG. 24 is a flowchart illustrating an exemplary embodiment of the present invention.

As illustrated in FIG. 23 device B periodically receives data from host H (S1). If the data received is the search signal (S2) device B sends response signal to host H (S3).

As illustrated in FIG. 24 host H periodically receives data from device B (S1). If the data received is the response signal (S2) host H locates the position of device B by using the method described in FIG. 20*a* and FIG. 20*b* (S3), and sends the location data and the relevant map data of the area where device B is located to device A (S4).

Figure 25:
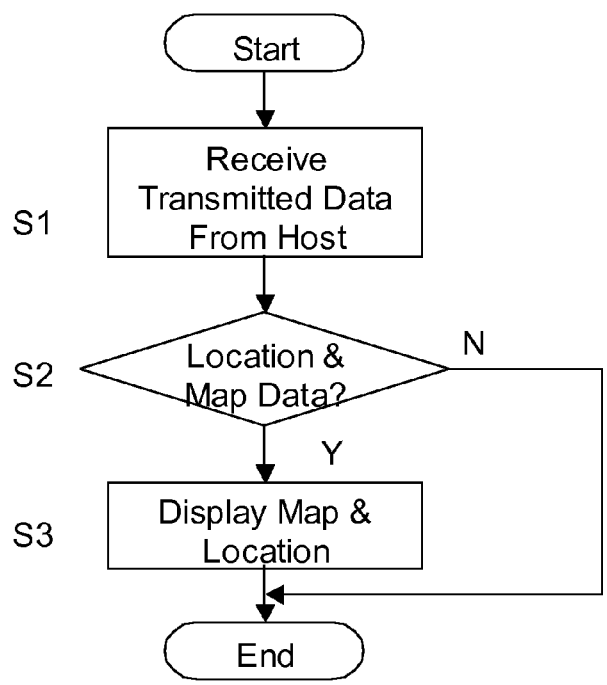
FIG. 25 is a flowchart illustrating an exemplary embodiment of the present invention.

As illustrated in FIG. 25 device A periodically receives data from host H (S1). If the data received is the location data and the relevant map data mentioned above device A displays the map based on the relevant map data and indicates the location thereon based on the location data (S3).

Device A can continuously track down the location of device B as illustrated in FIG. 26. First, device A sends a request data to host H (S1). As soon as host H receives the request data (S2) it sends a search signal in the manner illustrated in FIG. 22 (S3). As soon as device B receives the search signal (S4) it sends a response signal to host H (S5). Based on the response signal host H locates device B with the method described in FIG. 20*a* and FIG. 20*b* (S6). Then host H sends to device A a renewed location data and a relevant map data of the area where device B is located (S7). As soon as these data are received (S8) device A displays the map based on the relevant map data and indicates the updated location based on the renewed location data (S9). If device B is still within the specified area device A may use the original relevant map data. As another embodiment of the present invention S1 through S4 may be omitted and make device B send a response signal continuously to host H until host H sends a command signal to device B to cease sending the response signal.

Positioning System—Automatic Silent Mode

FIG. 27*a* through FIG. 32*g* illustrate the automatic silent mode of communication device 200.

In FIG. 27*a* relay R1 is connected to cable C1, relay R2 is connected to cable C2, relay R3 is connected to cable C3, and relay R4 is connected to cable C4. Cables C1, C2, C3, and C4 are connected to transmitter T, which is connected to host H by cable C5. The relays (R 1 . . . R 20) are located throughout the predetermined area in the pattern illustrated in FIG. 27*b*. The system illustrated in FIG. 27*a* and FIG. 27*b* is designed to pin-point the position of communication device 200 by using the method so-called "global positioning system" or "GPS."

As illustrated in FIG. 28 the user of communication device 200 may set the silent mode by input device 210 (FIG. 1). When communication device 200 is in the silent mode (a) the ringing sound is turned off, (b) vibrator 217 (FIG. 1) activates when communication device 200 receives call, and/or (c) communication device 200 sends a automatic response to the caller device when a call is received. The user may, with his discretion, select any of these predetermined function of the automatic silent mode.

FIG. 29 illustrates how the automatic silent mode is activated. Communication device 200 checks its present location with the method so-called "global positioning system" or "GPS" by using the system illustrated in FIG. 27*a* and FIG. 27*b* (S1). Communication device 200 then compares the present location and the previous location (S2). If the difference of the two values is more than the specified amount X, i.e., when the moving velocity of communication device 200 exceeds the predetermined value (S3) the silent mode is activated and (a) the ringing sound is automatically turned off, (b) vibrator 217 (FIG. 1) activates, and/or (c) communication device 200 sends an automatic response to the caller device according to the user's setting. Here, the silent mode is automatically activated because the user of communication device 200 is presumed to be on an automobile and is not in a situation to freely answer the phone, or the user is presumed to be riding a train and does not want to disturb other passengers.

As another embodiment of the present invention the automatic silent mode may be administered by host H (FIG. 27*a*). As illustrated in FIG. 30 the silent mode is set in the manner described in FIG. 28 (S1) and communication device 200 sends to host H a request signal. When host H detects a call to communication device 200 after receiving the request signal it checks the current location of communication device 200 (S1) and compares it with the previous location (S2). If the difference of the two values is more than the specified amount X, i.e., when the moving velocity of communication device 200 exceeds the predetermined value (S3) host H sends a notice signal to communication device 200 (S4). As illustrated in FIG. 32 communication device 200 receives data periodically from host H (S1). If the received data is a notice signal (S2) communication device 200 activates the silent mode (S3) and (a) the ringing sound is automatically turned off, (b) vibrator 217 (FIG. 1) activates, and/or (c) communication device 200 sends an automatic response to the caller device according to the user's setting. The automatic response may be sent from host H instead.

Figure 32C:
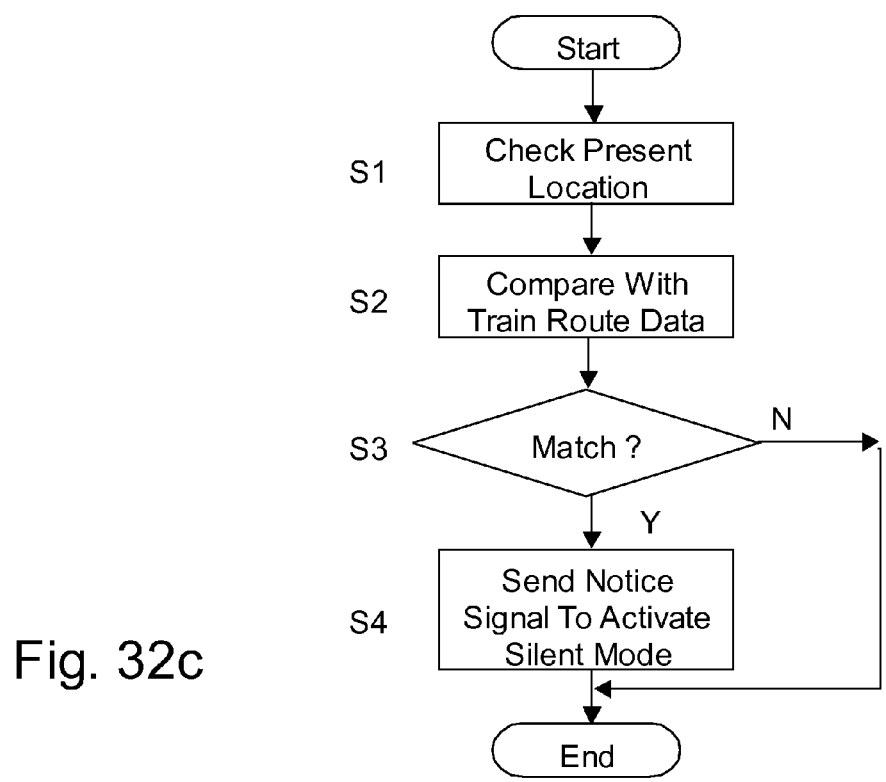
FIG. 32c is a flowchart illustrating an exemplary embodiment of the present invention.

As another embodiment of the present invention a train route data may be used. As illustrated in FIG. 32*a* the train route data is stored in area 263 of RAM 206. The train route data contains three-dimensional train route map including the location data of the route. FIG. 32*b* illustrates how the train route data is utilized. CPU 211 (FIG. 1) checks the present location of communication device 200 by the method described in FIG. 27*a* and FIG. 27*b* (S1). Then CPU 211 compares with the train route data stored in area 263 of RAM 206 (S2). If the present location of communication 200 matches the train route data (i.e., if communication device is located on the train route) (S3) the silent mode is activated in the manner described above. The silent mode is activated because the user of communication device 200 is presumed to be currently on the train and may not want to disturb the other passengers on the same train. As another embodiment of the present invention such function can be delegated to host H (FIG. 27*a*) as described in FIG. 32*c*. Namely, host H checks the present location of communication device 200 by the method described in FIG. 27*a* and FIG. 27*b* (S1). Then host H compares the present location with the train route data stored in its own storage (not shown) (S2). If the present location of communication 200 matches the train route data (i.e., if communication device is located on the train route) (S3) host H sends a notice signal to communication device 200 thereby activating the silent mode in the manner described above.

Figure 32D:
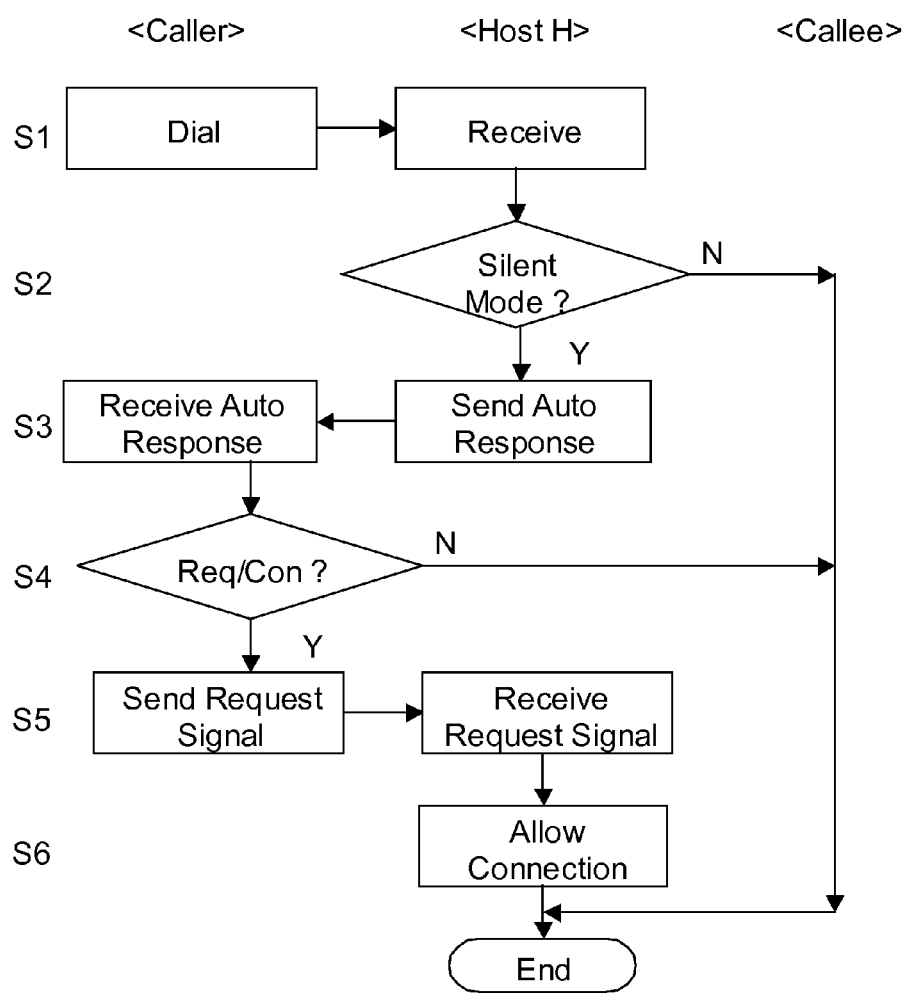
FIG. 32d is a flowchart illustrating an exemplary embodiment of the present invention.
Figure 32E:
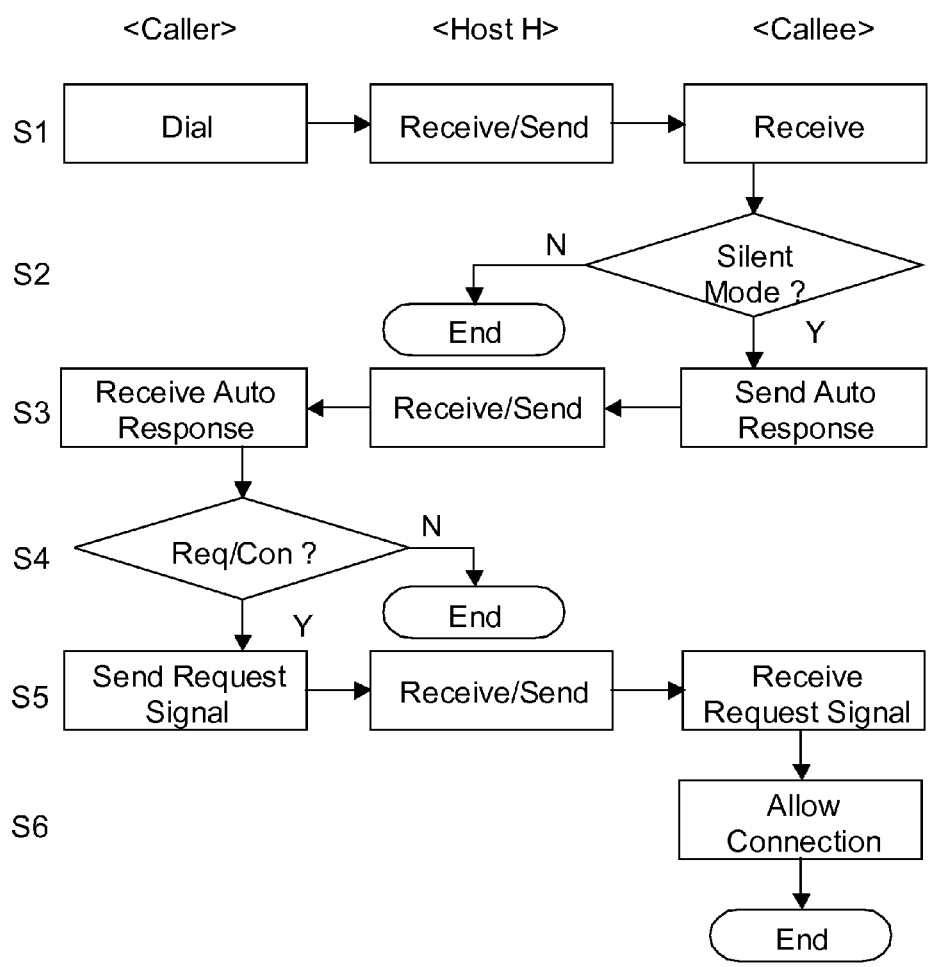
FIG. 32e is a flowchart illustrating an exemplary embodiment of the present invention.
Figure 32F:
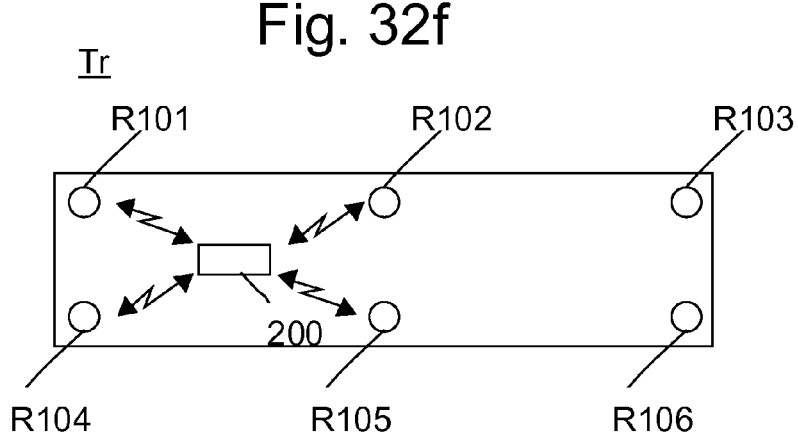
FIG. 32f is a simplified illustration illustrating an exemplary embodiment of the present invention.
Figure 32G:
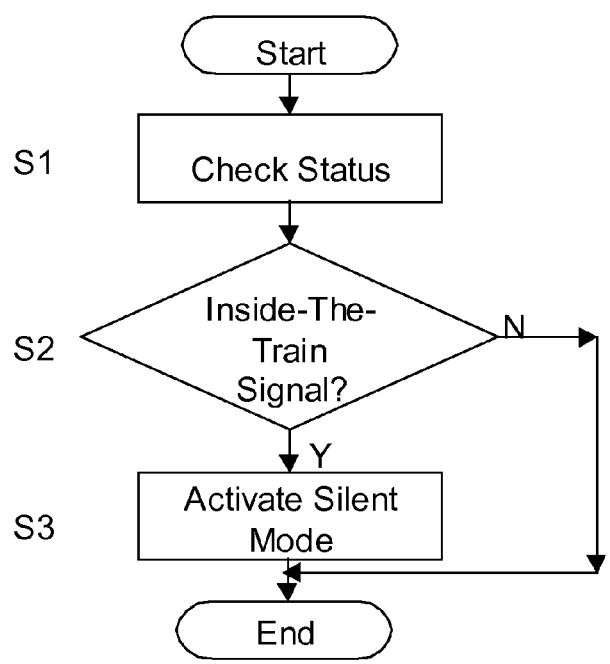
FIG. 32g is a flowchart illustrating an exemplary embodiment of the present invention.
Figure 33:
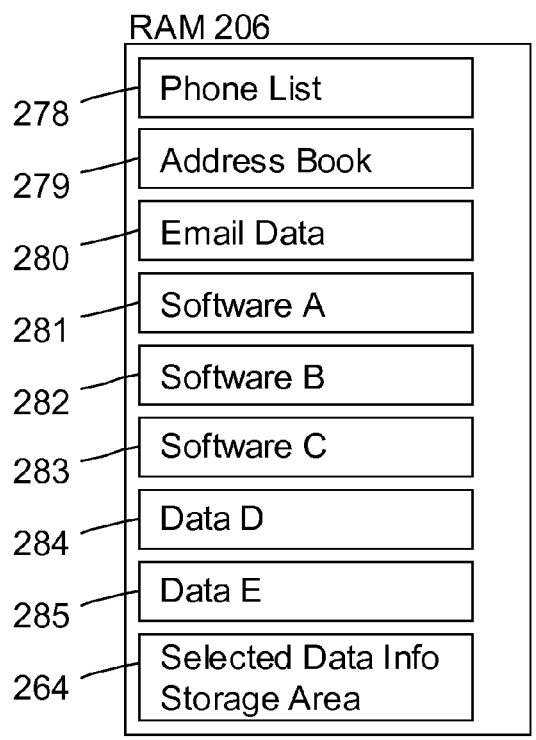
FIG. 33 is a block diagram illustrating an exemplary embodiment of the present invention.

Another embodiment is illustrated in FIG. 32*f* and FIG. 32*g*. As illustrated in FIG. 32*f* relays R 101, R 102, R 103, R 104, R 105, R 106, which perform the same function to the relays described in FIG. 27*a* and FIG. 27*b*, are installed in train Tr. The signals from these relays are sent to host H illustrated in FIG. 27*a*. Relays R 101 through R 106 emit inside-the-train signals which are emitted only inside train Tr. FIG. 32*g* illustrates how communication device 200 operates inside train Tr. Communication device 200 checks the signal received in train Tr (S1). If communication device 200 determines that the signal received is an inside-the-train signal (S2) it activates the silent mode in the manner described above.

Positioning System—Auto Response

FIG. 32*d* and FIG. 32*e* illustrates the method to send an automatic response to a caller device when the silent mode is activated. Assume that the caller device, a communication device 200, intends to call a callee device, another communication device 200 via host H. As illustrated in FIG. 32*d* the caller device dials the callee device and the dialing signal is sent to host H (S1). Host H checks whether the callee device is in the silent mode (S2). If host H detects that the callee device is in the silent mode it sends a predetermined auto response which indicates that the callee is probably on a train and may currently not be available, which is received by the caller device (S3). If the user of the caller device still desires to request for connection and certain code is input from input device 210 (FIG. 1) (S4) a request signal for connection is sent and received by host H (S5), and the line is connected between the caller device and the callee device via host H (S6). As another embodiment of the present invention the task of host H which is described in FIG. 32*d* may be delegated to the callee device as illustrated in FIG. 32*e*. The caller device dials the callee device and the dialing signal is sent to the callee device via host H (S1). The callee device checks whether it is in the silent mode (S2). If the callee device detects that it is in the silent mode it sends an predetermined auto response which indicates that the callee is probably on a train and may currently not be available, which is sent to the caller device via host H (S3). If the user of the caller device still desires to request for connection and certain code is input from input device 210 (FIG. 1) (S4) a request signal for connection is sent to the callee device via host H (S5), and the line is connected between the caller device and the callee device via host H (S6).

Auto Backup

FIG. 32 through FIG. 37 illustrate the automatic backup system of communication device 200. As illustrated in FIG. 32 RAM 206 (FIG. 1) includes areas to store the data essential to the user of communication device 200, such as area 278 for a phone list, area 279 for an address book, area 280 for email data, area 281 for software A, area 282 for software B, area 283 for software C, area 284 for data D, area 285 for data E. RAM 206 also includes area 264, i.e., the selected data info storage area, which will be explained in details hereinafter.

Figure 34:
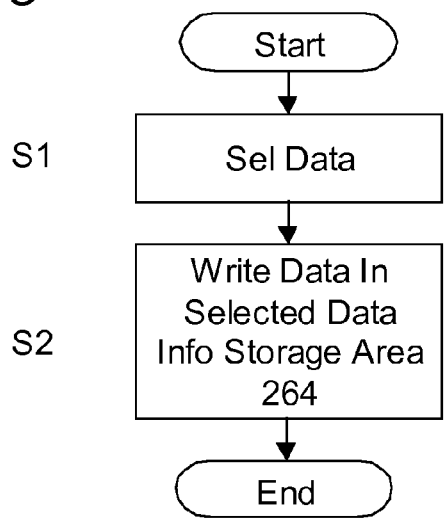
FIG. 34 is a flowchart illustrating an exemplary embodiment of the present invention.

As described in FIG. 34 the user selects data by using input device 210 (FIG. 1) which he/she intends to be automatically backed up (S1). The selected data are written in area 264, the selected data info storage area (S2).

Figure 35A:
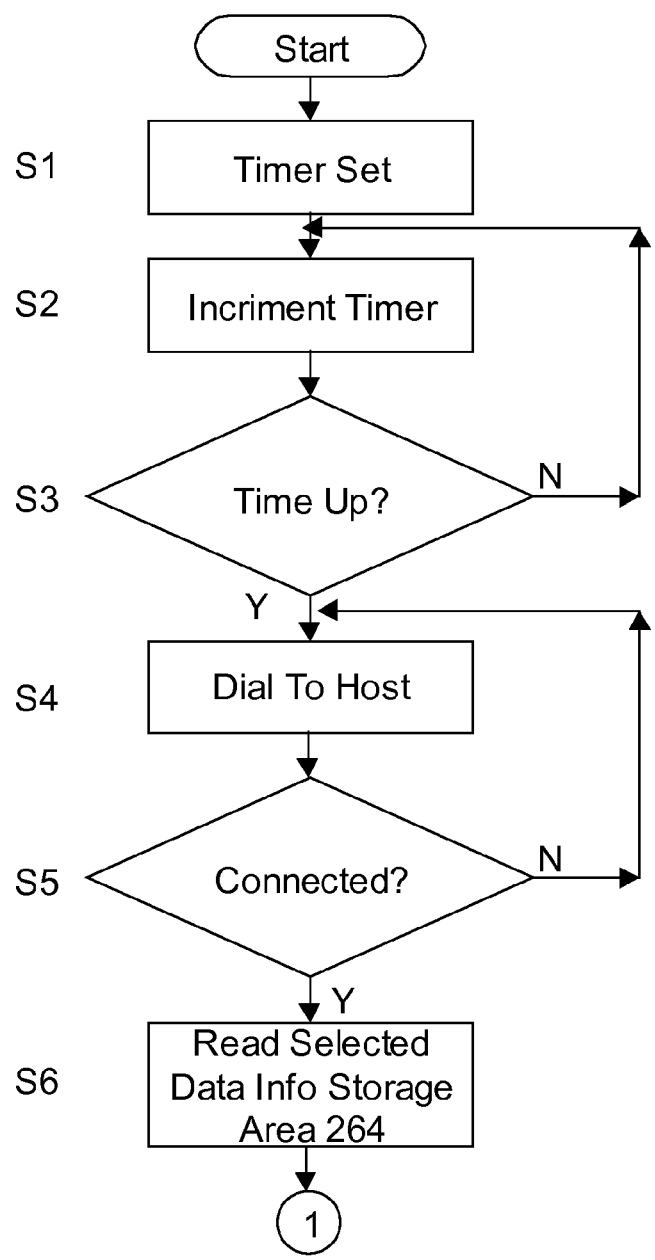
FIG. 35a is a flowchart illustrating an exemplary embodiment of the present invention.
Figure 35B:
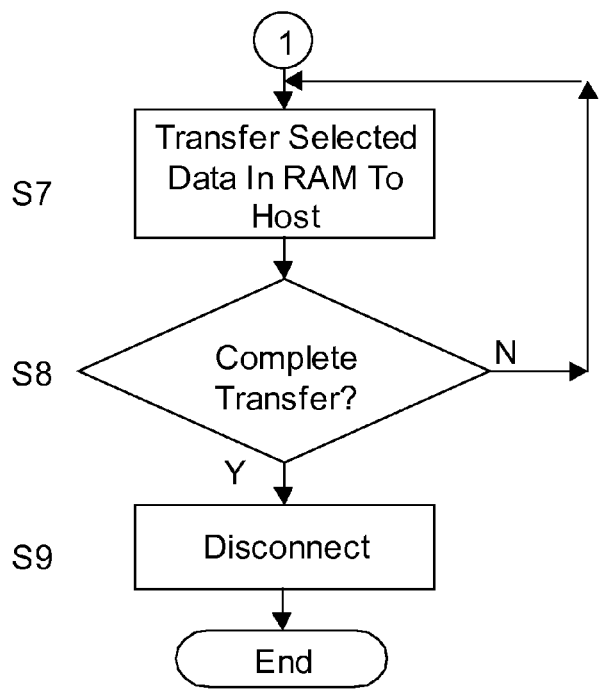
FIG. 35b is a flowchart illustrating an exemplary embodiment of the present invention.

The overall operation of this function is illustrated in FIG. 35*a* and FIG. 35*b*. First of all, a timer (not shown) is set by a specific input signal produced by input device 210 (FIG. 1) (S1). The timer is incremented periodically (S2) and when the incremented value equals the predetermined value (S3) communication device 200 initiates the dialing process (S4). The dialing process continues until communication device 200 is connected to host 400 explained in FIG. 37 (S5). Once the line is connected CPU 211 reads the information stored in area 264 (S6) and based on such information it initiates to transfer the selected data from RAM 206 to host 400 (S7). The transfer continues until all of the selected data are transferred to host 400 (S8) and the line is disconnected thereafter (S9). This backup sequence can be initiated automatically and periodically by using a timer or manually. As another embodiment of the present invention, instead of selecting the data that are to be backed up, all data in RAM 206 (FIG. 1) can be transferred to host 400.

Figure 36:
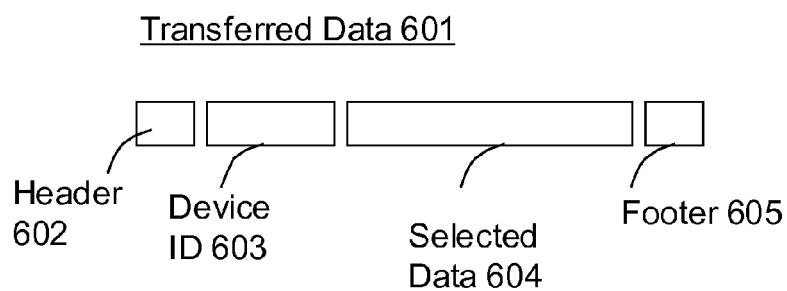
FIG. 36 is a simplified illustration illustrating an exemplary embodiment of the present invention.

FIG. 36 illustrates the basic structure of the data transferred to host 400. Transferred data 601 includes header 602, device ID 603, selected data 604 and footer 605. Device ID 603 is the identification number of communication device 200 preferably its phone number, and selected data 604 is the pack of data which are transferred from RAM 206 to host 400 based on information stored in area 264.

Figure 37:
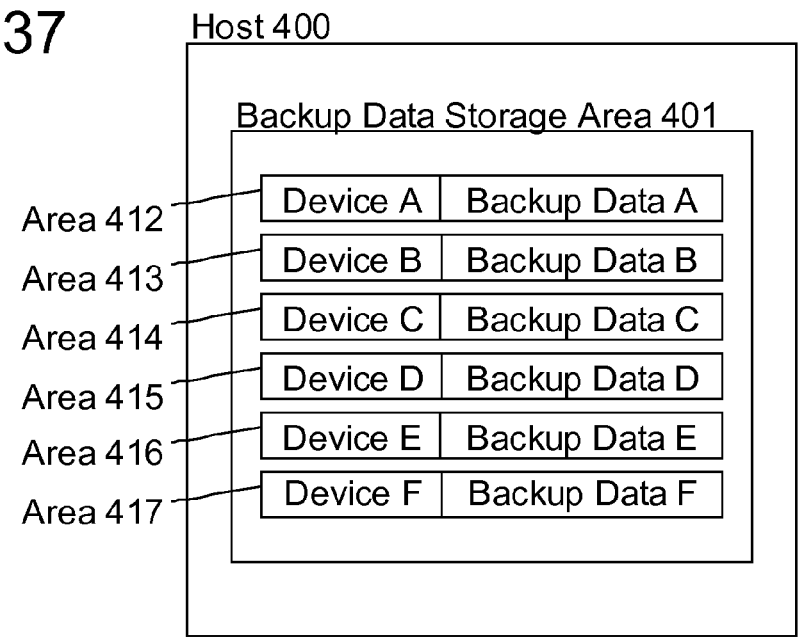
FIG. 37 is a block diagram illustrating an exemplary embodiment of the present invention.

FIG. 37 illustrates the basic structure of host 400. Host 400 includes backup data storage area 401 which is used to backup all of the backup data transferred from all communication devices. Host 400 stores the transferred data 601 to the designated area based on the device ID included in transferred data 601. For example, transferred data 601 transferred from device A is stored in area 412 as backup data A. In the same manner transferred data 601 transferred from device B is stored in area 413 as backup data B; transferred data 601 transferred from device C is stored in area 414 as backup data C; transferred data 601 transferred from device D is stored in area 415 as backup data D; transferred data 601 transferred from device E is stored in area 416 as backup data E; and transferred data 601 transferred from device F is stored in area 417 as backup data F.

Signal Amplifier

Figure 38:
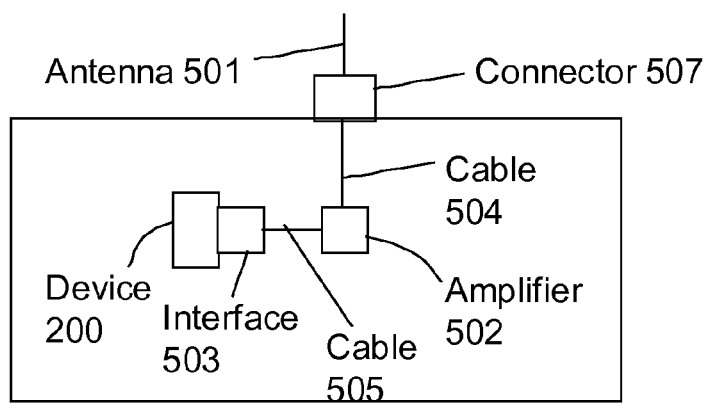
FIG. 38 is a simplified illustration illustrating an exemplary embodiment of the present invention.

FIG. 38 illustrates a signal amplifier utilized for automobiles and other transportation carriers, such as trains, airplanes, space shuttles, and motor cycles. As described in FIG. 38 automobile 500 includes interface 503, an interface detachably connectable to communication device 200, which is connected to amplifier 502 via cable 505: Amplifier 502 is connected to antenna 501 via cable 504 and connector 507 as described in this drawing. The signal produced by communication device 200 is transferred to interface 503. Then the signal is transferred to amplifier via cable 505 where the signal is amplified. The amplified signal is transferred to antenna 501 via cable 504 and connector 507, which transmits the amplified signal to host H (not shown). The receiving signal is received by antenna 501 and transferred to amplifier 502 via connector 507 and cable 504, and then is transferred to interface 503 via cable 505, which transfers the amplified signal to communication device 200.

Audio/Video Data Capturing System

Figure 39:
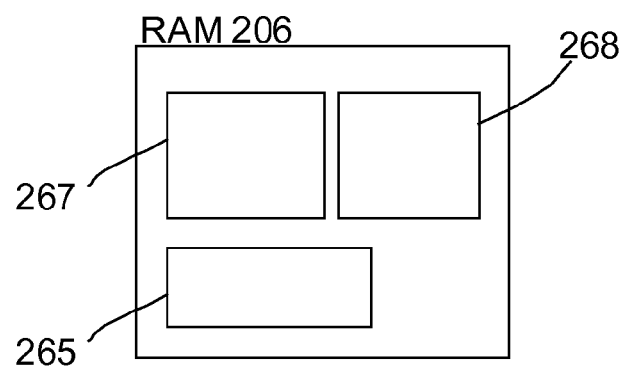
FIG. 39 is a block diagram illustrating an exemplary embodiment of the present invention.

FIG. 39 through FIG. 44 illustrate the audio/video capturing system of communication device 200. Assuming that device A, a communication device 200, captures audio/video data and transfers such data to device B, another communication device 200, via a host (not shown). Primarily video data is input from CCD unit 214 (FIG. 1) and audio data is input from microphone 215 of (FIG. 1) of device A. As illustrated in FIG. 39 RAM 206 includes area 267 which stores audio data, area 268 which stores video data, and area 265 which is a work area utilized for the process explained hereinafter.

Figure 40:
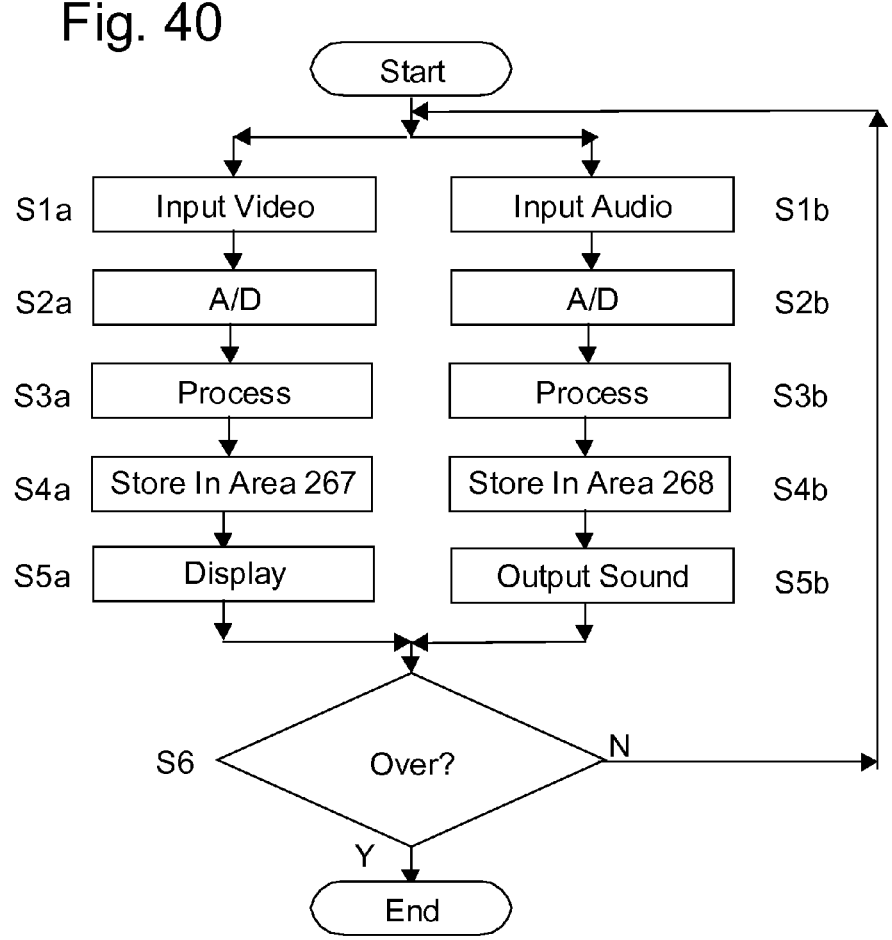
FIG. 40 is a flowchart illustrating an exemplary embodiment of the present invention.

As described in FIG. 40 the video data input from CCD unit 214 (S1a) is converted from analog data to digital data (S2a) and is processed by CCD unit 214 (S3a). Area 265 is used as work area for such process. The processed video data is stored in area 267 of RAM 206 (S4a) and displayed on LCD 201 (FIG. 1). As described in the same drawing the audio data input from microphone 215 (S1b) is converted from analog data to digital data by A/D 213 (FIG. 1) (S2b) and is processed by sound processor 205 (FIG. 1) (S3b). Area 265 is used as work area for such process. The processed audio data is stored in area 268 of RAM 206 (S4b) and is transferred to sound processor 205 and is output from speaker 216 (FIG. 1) via D/A 204 (FIG. 1) (S5b). The sequences of S1a through S5a and S1b through S5b are continued until a specific signal indicating to stop such sequence is input from input device 210 (FIG. 1) (S6).

Figure 41:
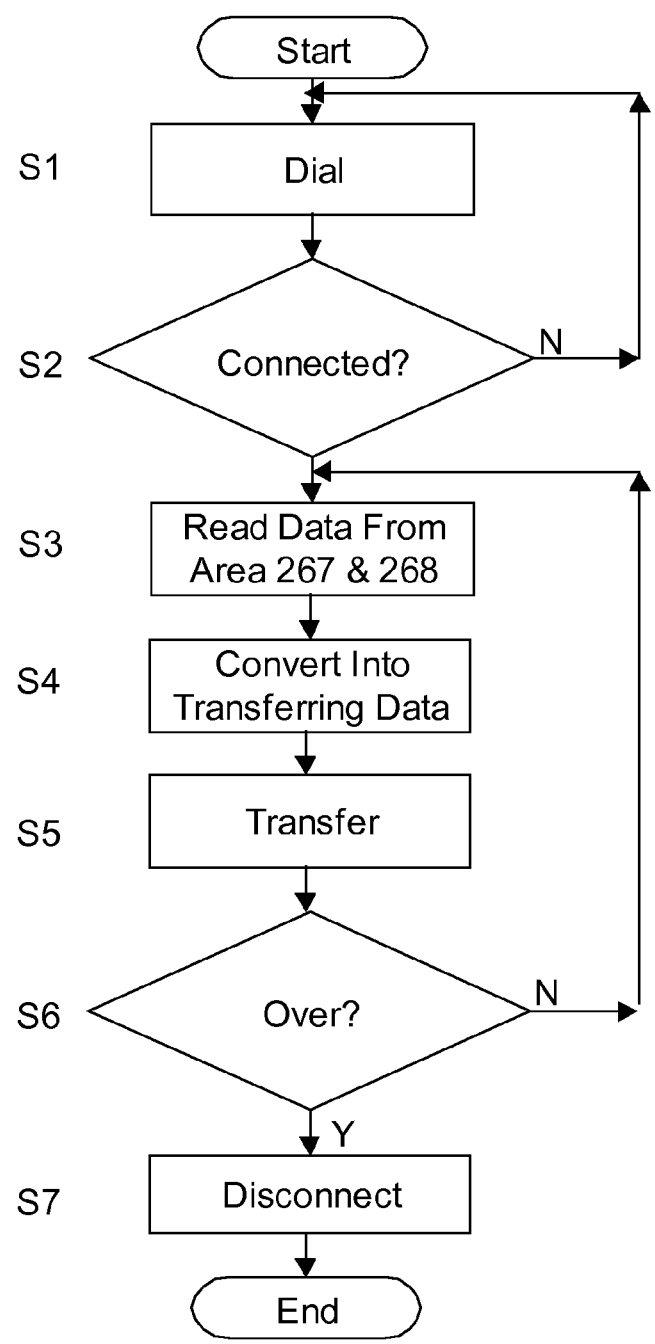
FIG. 41 is a flowchart illustrating an exemplary embodiment of the present invention.

As described in FIG. 41 CPU 211 (FIG. 1) of device A initiates a dialing process (S1) until the line is connected to a host (not shown) (S2). As soon as the line is connected CPU 211 reads the audio/video data stored in area 267 and area 268 (S3) and transfer them to signal processor 208 where the data are converted into a transferring data (S4). The transferring data is transferred from antenna 218 in a wireless fashion (S5). The sequence of S1 through S5 is continued until a specific signal indicating to stop such sequence is input from input device 210 (FIG. 1) (S6). The line is disconnected thereafter (S7).

Figure 42:
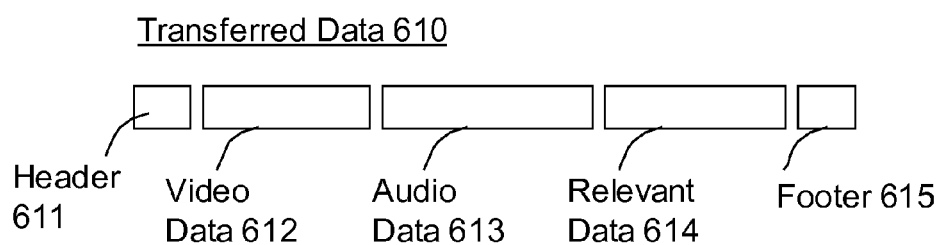
FIG. 42 is a simplified illustration illustrating an exemplary embodiment of the present invention.

FIG. 42 illustrates the basic structure of the transferred data which is transferred from device A as described in S4 and S5 of FIG. 41. Transferred data 610 is primarily composed of header 611, video data 612, audio data 613, relevant data 614, and footer 615. Video data 612 corresponds to the video data stored in area 267 of RAM 206, and audio data 613 corresponds to the audio data stored in area 268 of RAM 206. Relevant data 614 includes various types of data, such as the identification number of device A (i.e., transferor device) and device B (transferee device), a location data which represents the location of device A, etc.

Figure 43:
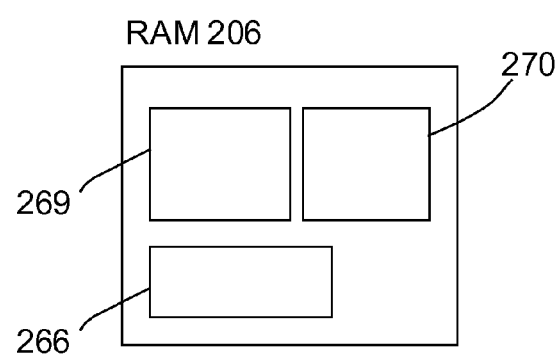
FIG. 43 is a block diagram illustrating an exemplary embodiment of the present invention.

FIG. 43 illustrates the data contained in RAM 206 (FIG. 1) of device B. As illustrated in FIG. 39 RAM 206 includes area 269 which stores audio data, area 270 which stores video data, and area 266 which is a work area utilized for the process explained hereinafter.

Figure 44A:
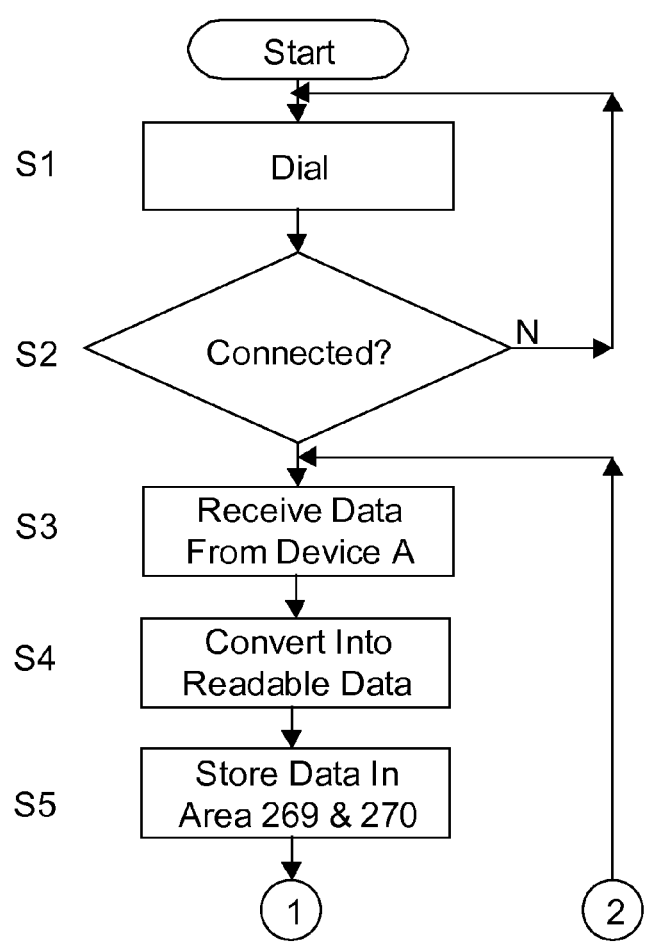
FIG. 44a is a flowchart illustrating an exemplary embodiment of the present invention.
Figure 44B:
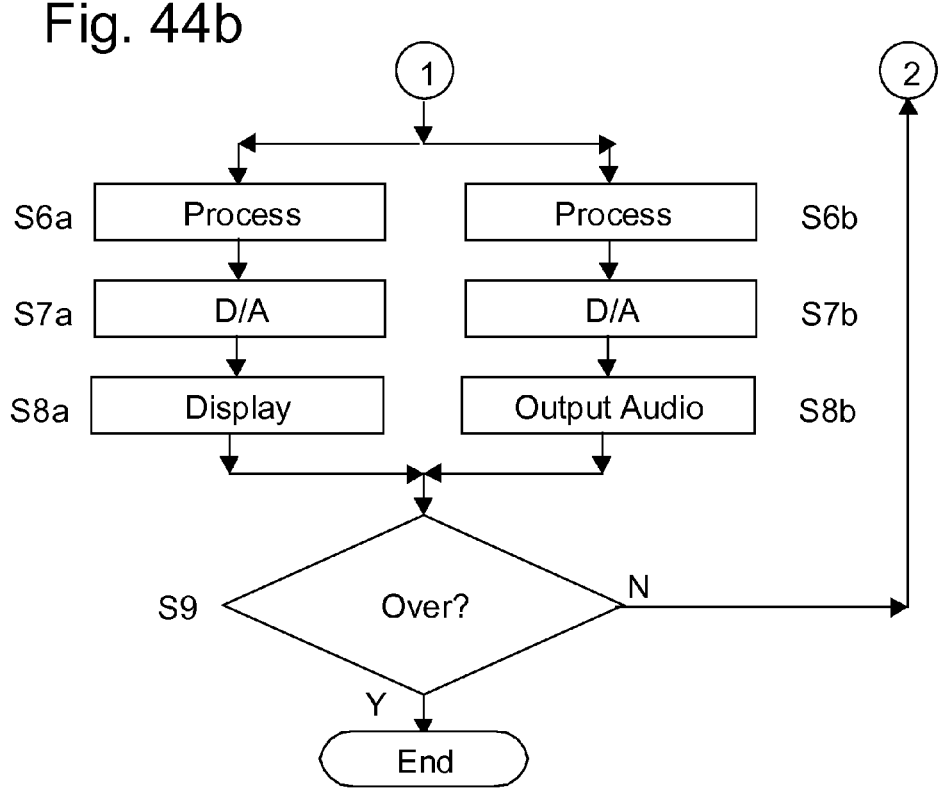
FIG. 44b is a flowchart illustrating an exemplary embodiment of the present invention.

As described in FIG. 44a and FIG. 44b CPU 211 (FIG. 1) of device B initiates a dialing process (S1) until device B is connected to a host (not shown) (S2). Transferred data 610 is received by antenna 218 (FIG. 1) of device B (S3) and is converted by signal processor 208 into a readable data which is readable by CPU 211 (S4). Video data and audio data are retrieved from transferred data 610 and stored into area 269 and area 270 of RAM 206 respectively (S5). The video data stored in area 269 is processed by video processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in area 270 is processed by sound processor 205 (FIG. 1) (S6b). The processed audio data is converted into analog data by D/A 204 (FIG. 1) (S7b) and output from speaker 216 (FIG. 1) (S8b). The sequences of S6a through S8a and S6b through S8b are continued until a specific signal indicating to stop such sequence is input from input device 210 (FIG. 1) (S9).

Digital Mirror

Figure 44C:
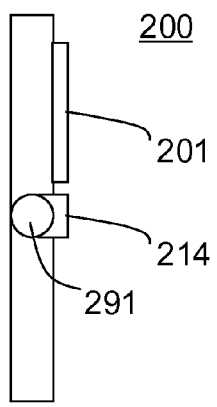
FIG. 44c is a simplified illustration illustrating an exemplary embodiment of the present invention.
Figure 44D:
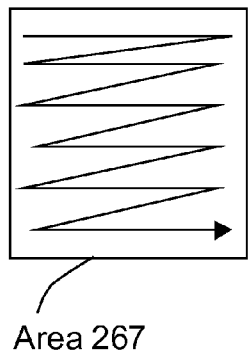
FIG. 44d is a simplified illustration illustrating an exemplary embodiment of the present invention.
Figure 44E:
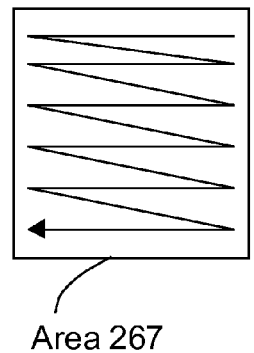
FIG. 44e is a simplified illustration illustrating an exemplary embodiment of the present invention.

FIG. 44c through FIG. 44e illustrates the method of using communication device 200 as a mirror. In this embodiment communication device 200 includes rotator 291 as described in FIG. 44c. Rotator 291 is fixed to the side of communication device 200 and rotates CCD unit 214 (FIG. 1) and thereby CCD unit 214 is enabled to face multi-direction. CPU 211 (FIG. 1) reads the video data stored in area 267 (FIG. 39) from left to right as described in FIG. 44d when CCD unit 214 is facing the opposite direction from LCD 201. However, when CCD unit 214 is facing the same direction with LCD 201, CPU 211 reads the video data stored in area 267 from right to left as described in FIG. 44e thereby producing a "mirror image" on LCD 201.

As another embodiment of the present invention more than one CCD units which face multi-direction may be utilized instead of enabling one CCD unit to rotate in the manner described above.

Caller ID

Figures 45, 46:
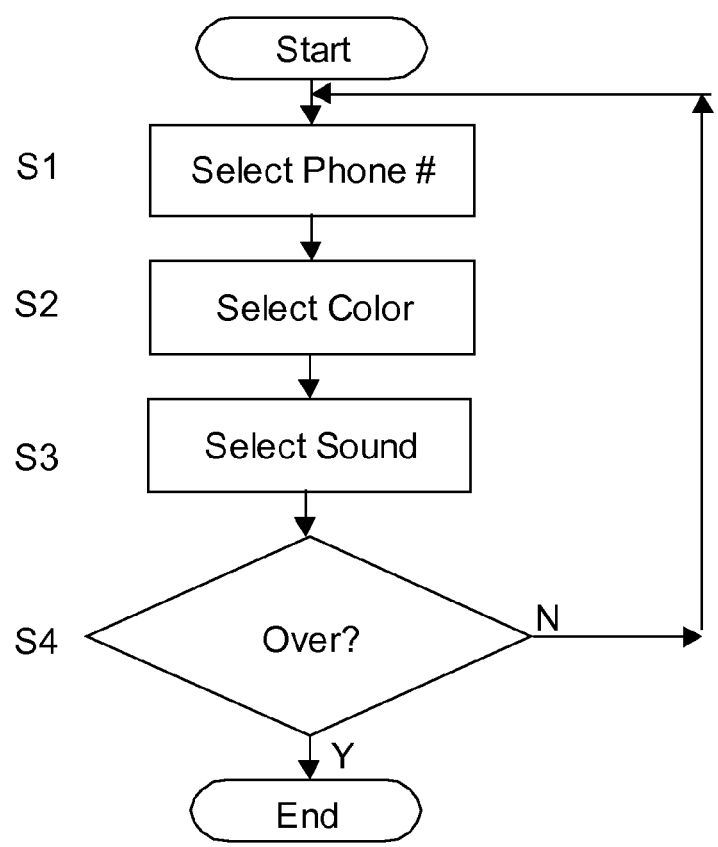
FIG. 45 is a block diagram illustrating an exemplary embodiment of the present invention.
FIG. 46 is a flowchart illustrating an exemplary embodiment of the present invention.
Figure 47:
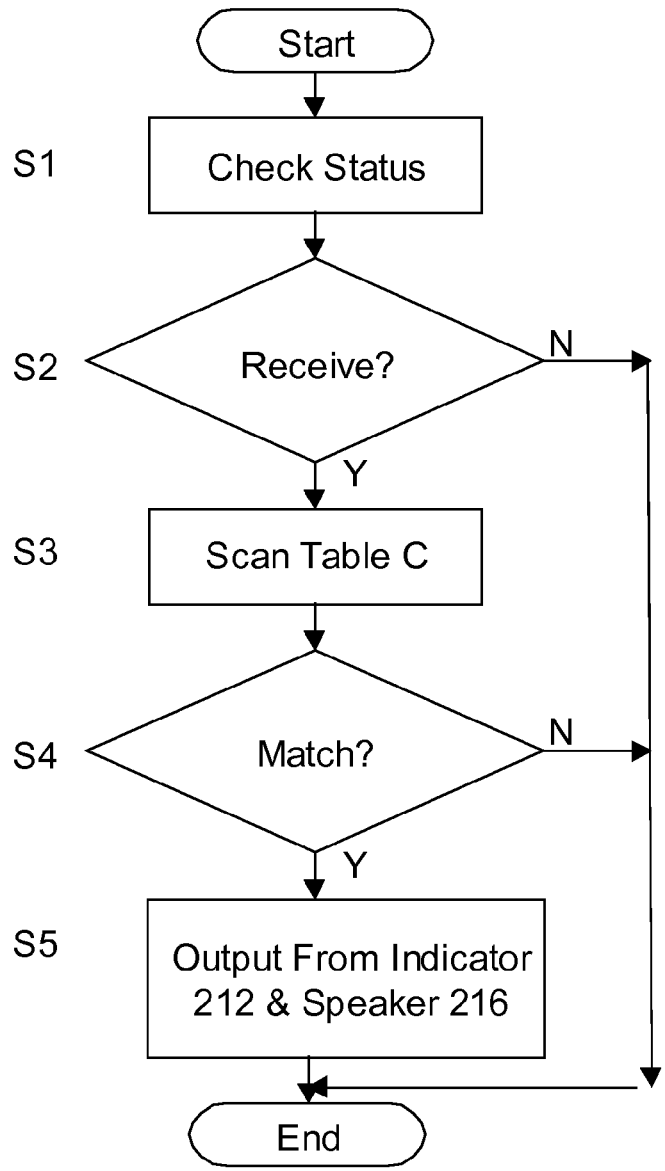
FIG. 47 is a flowchart illustrating an exemplary embodiment of the present invention.

FIG. 45 through FIG. 47 illustrate the caller ID system of communication device 200.

As illustrated in FIG. 45 RAM 206 includes Table C. As shown in the drawing each phone number corresponds to a specific color and sound. For example phone #1 corresponds to color A and sound E; phone #2 corresponds to color B and sound F; phone #3 corresponds to color C and sound G; and phone #4 corresponds to color D and sound H.

As illustrated in FIG. 46 the user of communication device 200 selects or inputs a phone number (S1) and selects a specific color (S2) and a specific sound (S3) designated for that phone number. Such sequence can be repeated until there is a specific input from input device 210 ordering to do otherwise (S4).

As illustrated in FIG. 47 CPU 211 (FIG. 1) periodically checks whether it has received a call from other communication devices (S1). If it receives a call (S2) CPU 211 scans Table C (FIG. 45) to see whether the phone number of the caller device is registered in the table (S3). If there is a match (S4) the designated color is output from indicator 212 (FIG. 1) and the designated sound is output from speaker 216 (FIG. 1) (S5). For example if the incoming call is from phone #1 color A is output from indicator 212 and sound E is output from speaker 216.

Stock Purchase

FIG. 48 through FIG. 52 illustrate the method of purchasing stocks by utilizing communication device 200.

Figure 48:
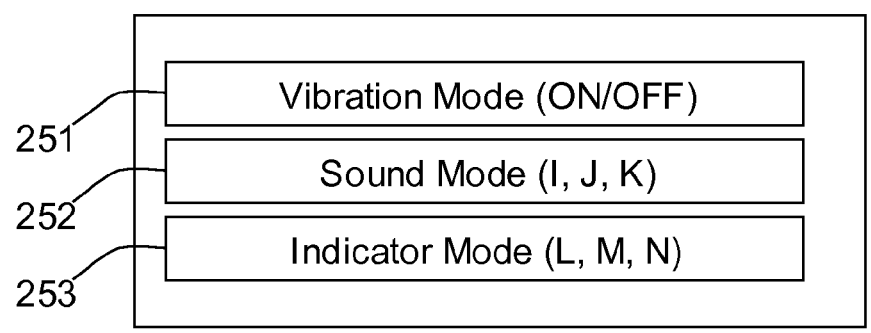
FIG. 48 is a block diagram illustrating an exemplary embodiment of the present invention.

FIG. 48 illustrates the data stored in ROM 207 (FIG. 1) necessary to set the notice mode. Area 251 stores the program regarding the vibration mode; area 252 stores the program regarding sound which is emitted from speaker 216 (FIG. 1) and several types of sound data, such as sound data I, sound data J, and sound data K; area 253 stores the program regarding the color emitted from indicator 212 (FIG. 1) and several types of color data, such as color data L, color data, M, and color data N.

Figure 49:
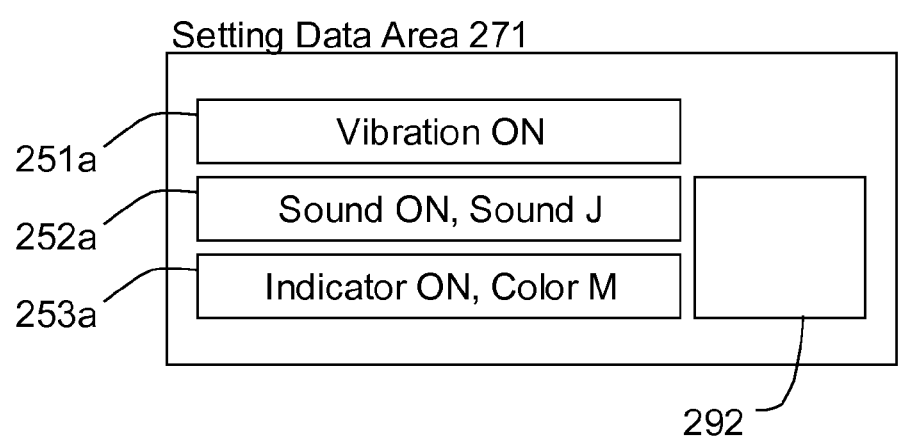
FIG. 49 is a block diagram illustrating an exemplary embodiment of the present invention.

As illustrated in FIG. 49 the notice mode is activated in the manner in compliance with the settings stored in setting data area 271 of RAM 206. In the example illustrated in FIG. 49 when the notice mode is activated vibrator 217 (FIG. 1) is turned on in compliance with the data stored in area 251a, speaker 216 (FIG. 1) is turned on and sound data J is emitted therefrom in compliance with the data stored in area 252a, and indicator 212 (FIG. 1) is turned on and color M is emitted therefrom in compliance with the data stored in area 253a. Area 292 stores the stock purchase data, i.e., the name of the brand, the amount of limited price, the name of the stock market (such as NASDAQ and/or NYSE) and other relevant information regarding the stock purchase.

Figure 50:
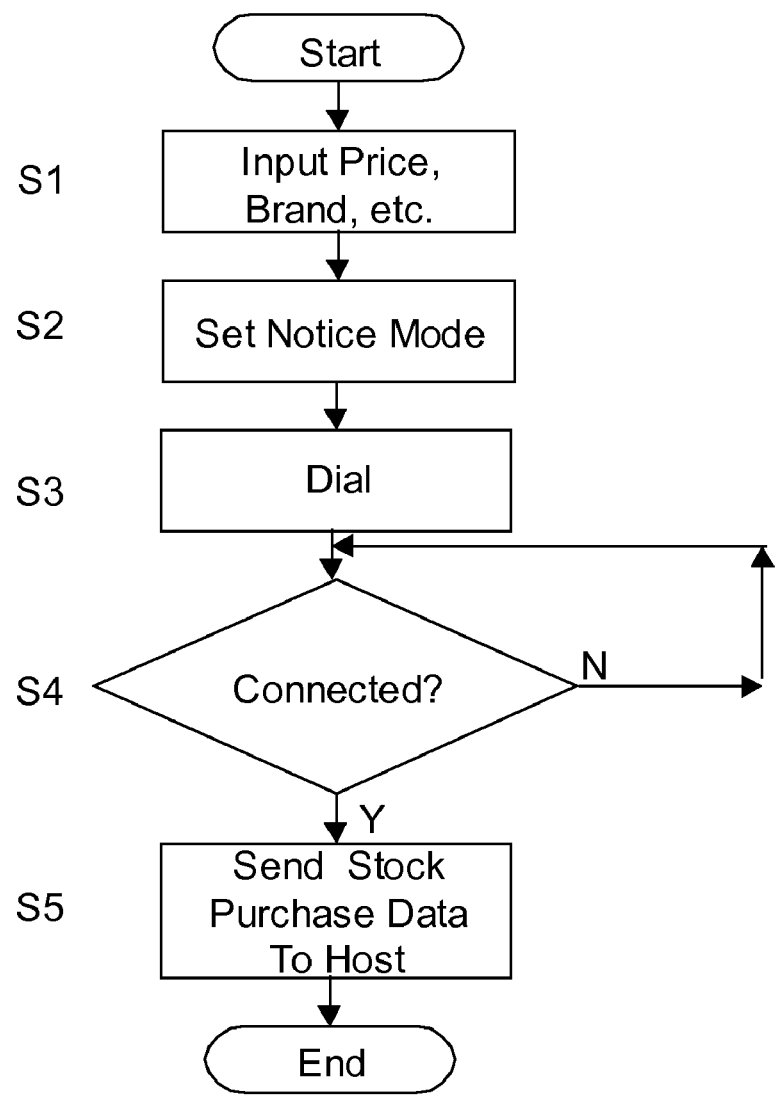
FIG. 50 is a flowchart illustrating an exemplary embodiment of the present invention.

As illustrated in FIG. 50 the user of communication device 200 inputs the stock purchase data from input device 210 (FIG. 1), which is stored in area 292 of RAM 206 (S1). By way of inputting specific data from input device 210 the property of notice mode (i.e., vibration ON/OFF, sound ON/OFF and the type of sound, indicator ON/OFF and the type of color) is set and the relevant data are stored in area 271 (i.e., areas 251a, 252a, 253a) of RAM 206 by the programs stored in areas 251, 252, 253 of ROM 207 (S2). Communication device 200 initiates a dialing process (S3) until it is connected to host H (described hereafter) (S4) and sends the stock purchase data thereto.

Figure 51:
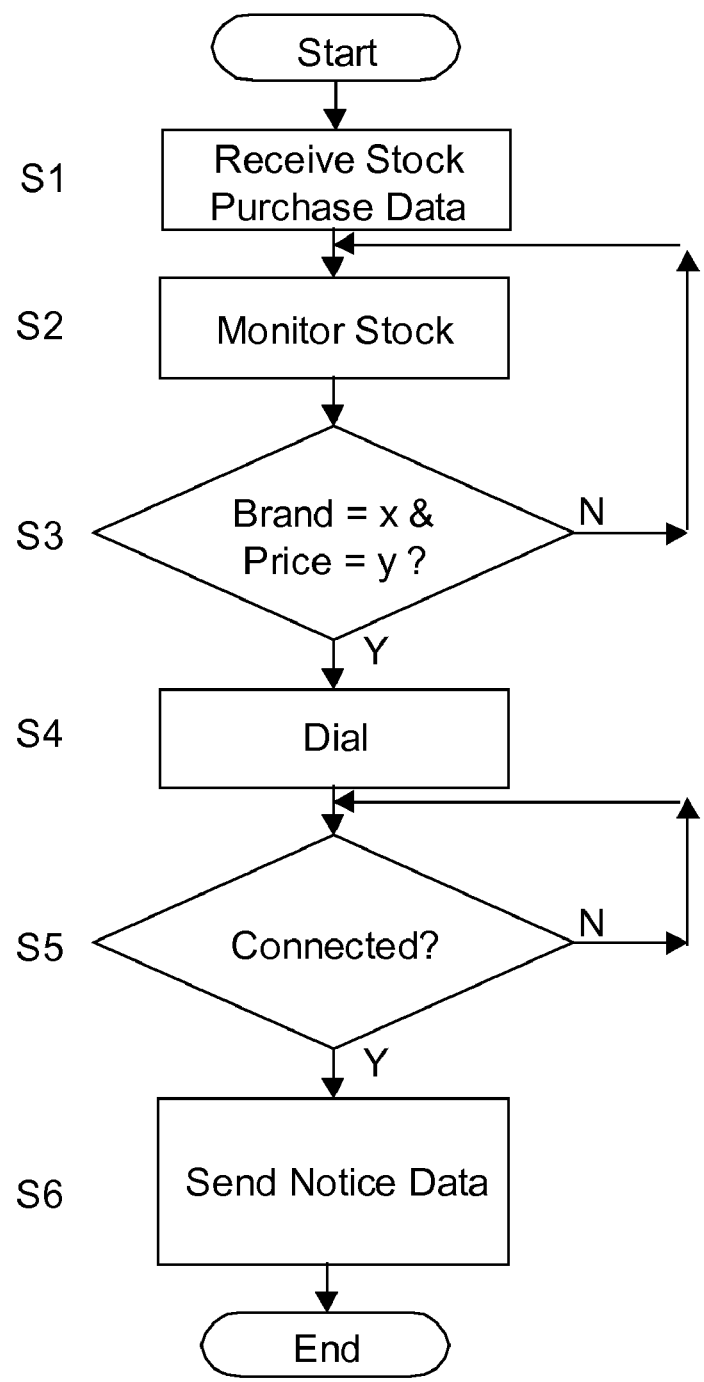
FIG. 51 is a flowchart illustrating an exemplary embodiment of the present invention.
Figure 52:
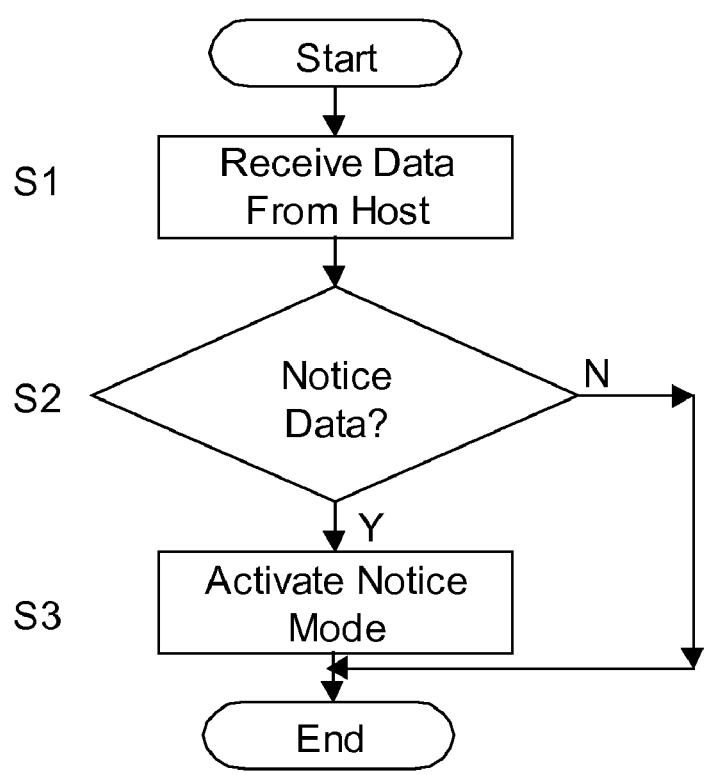
FIG. 52 is a flowchart illustrating an exemplary embodiment of the present invention.

FIG. 51 illustrates the operation of host H. As soon as host H receives the stock purchase data from communication device 200 (S1) it initiates monitoring the stock markets which is specified in the stock purchase data (S2). If host H detects that the price of the certain brand specified in the stock purchase data meets the limited price specified in the stock purchase data (S3) it initiates a dialing process (S4) until it is connected to communication device 200 (S5) and sends a notice data thereto (S6). As illustrated in FIG. 52 communication device 200 periodically monitors the data received from host H (S1). If the data received is a notice data (S2) the notice mode is activated in the manner in compliance with the settings stored in setting data area 271 of RAM 206 (S3). In the example illustrated in FIG. 49 vibrator 217 (FIG. 1) is turned on, sound data J is emitted from speaker 216 (FIG. 1), and indicator 212 (FIG. 1) emits color M.

Timer Email

Figure 53A:
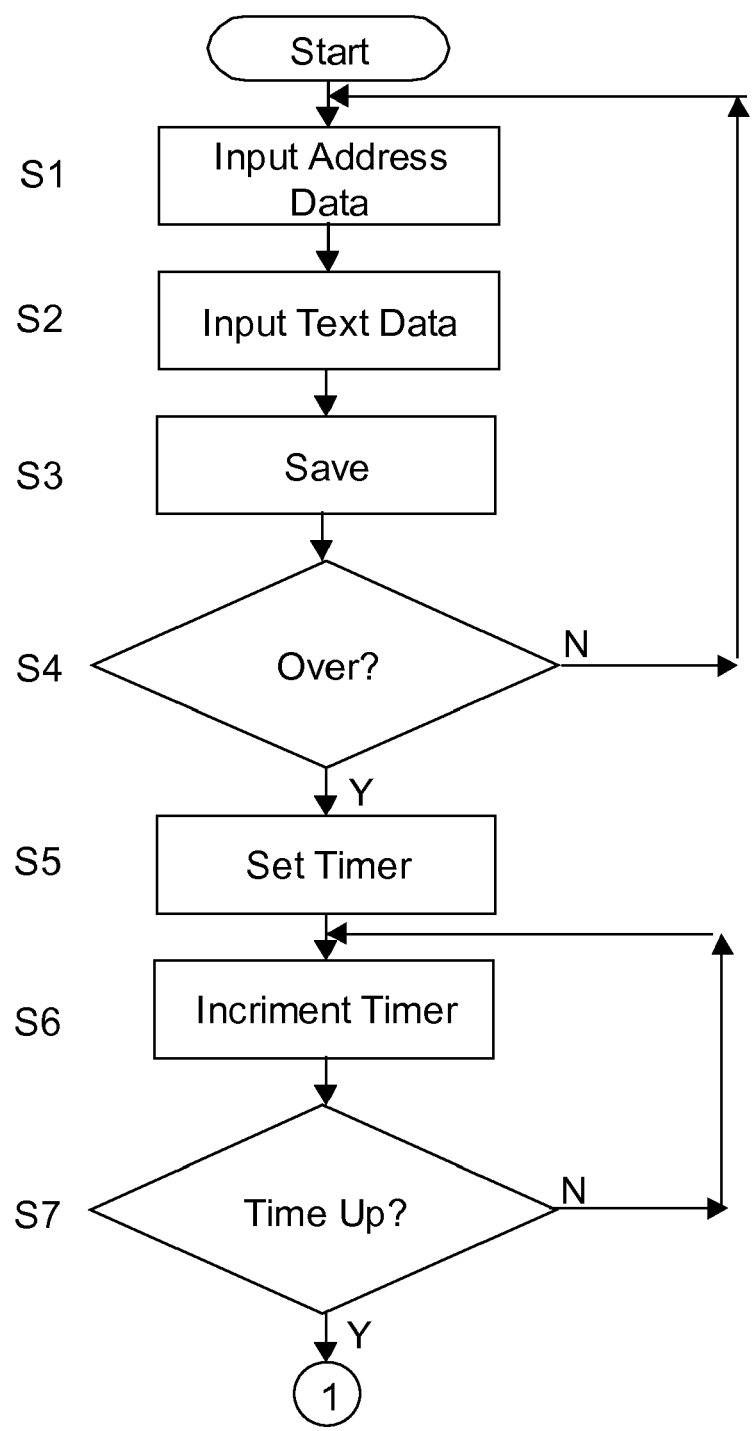
FIG. 53a is a flowchart illustrating an exemplary embodiment of the present invention.
Figure 53B:
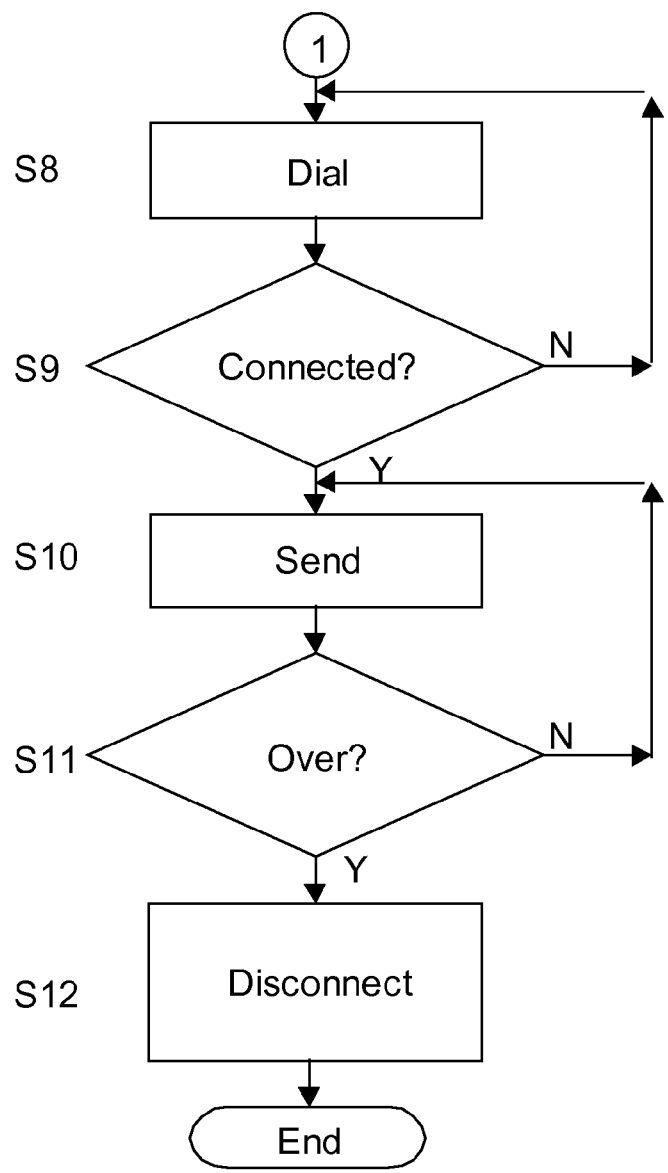
FIG. 53b is a flowchart illustrating an exemplary embodiment of the present invention.

FIG. 53a and FIG. 53b illustrate the method of sending emails from communication device 200 by utilizing a timer. Address data, i.e., email address is input by input device 210 or by voice recognition system explained in FIG. 3, FIG. 4, FIG. 5, FIG. 13, FIG. 14, FIG. 14a, FIG. 15, FIG. 16 and/or FIG. 17 (S1) and the text data, the text of the email message is input by the same manner (S2). The address data and the text data are automatically saved in RAM 206 (FIG. 1) (S3). The sequence of S1 through S3 is repeated (i.e., writing more than one email) until a specified input signal is input from input device 210 or by utilizing the voice recognition system explained above (FIG. 1). Once inputting both the address data and the text data (which also includes numeric data, images and programs) are completed a timer (not shown) is set by input device 210 or by utilizing the voice recognition system (S5), and the timer is incremented periodically (S6) until the timer value equals the predetermined value specified in S5 (S7). A dialing process is continued (S8) until the line is connected (S9) and the text data are sent thereafter to email addresses specified in S1 (S10). All of the emails are sent (S11) and the line is disconnected thereafter (S12).

As another embodiment of the present invention a specific time may be input by input device 210 and send the text data on the specific time (i.e., a broad meaning of "timer").

Call Blocking

Figure 54:
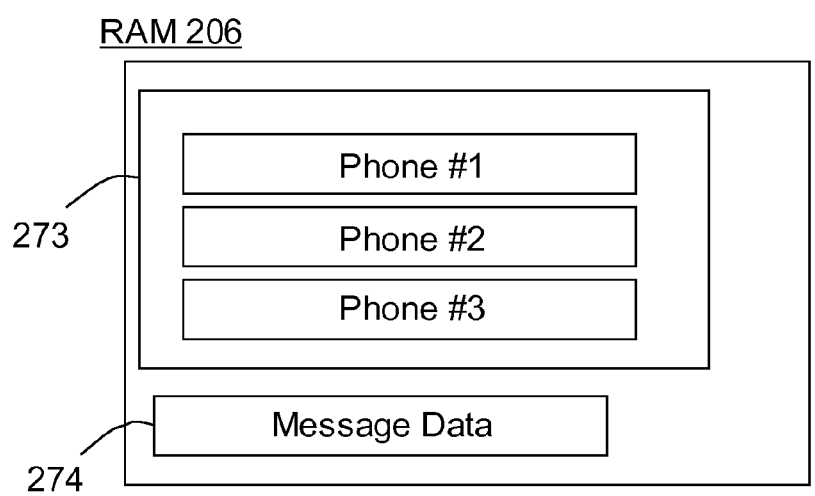
FIG. 54 is a block diagram illustrating an exemplary embodiment of the present invention.
Figure 55:
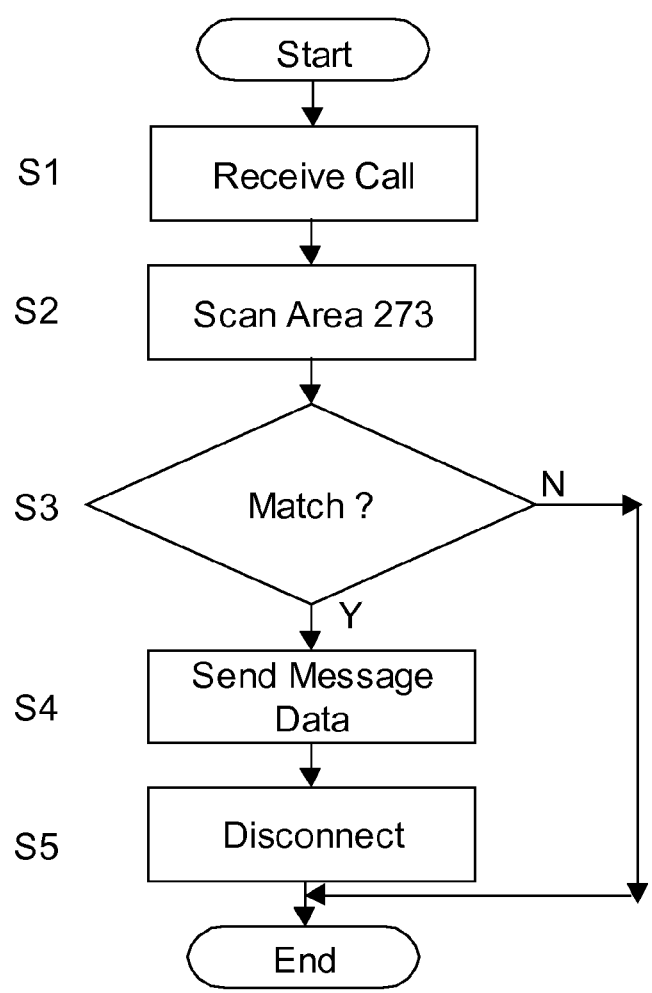
FIG. 55 is a flowchart illustrating an exemplary embodiment of the present invention.
Figure 56:
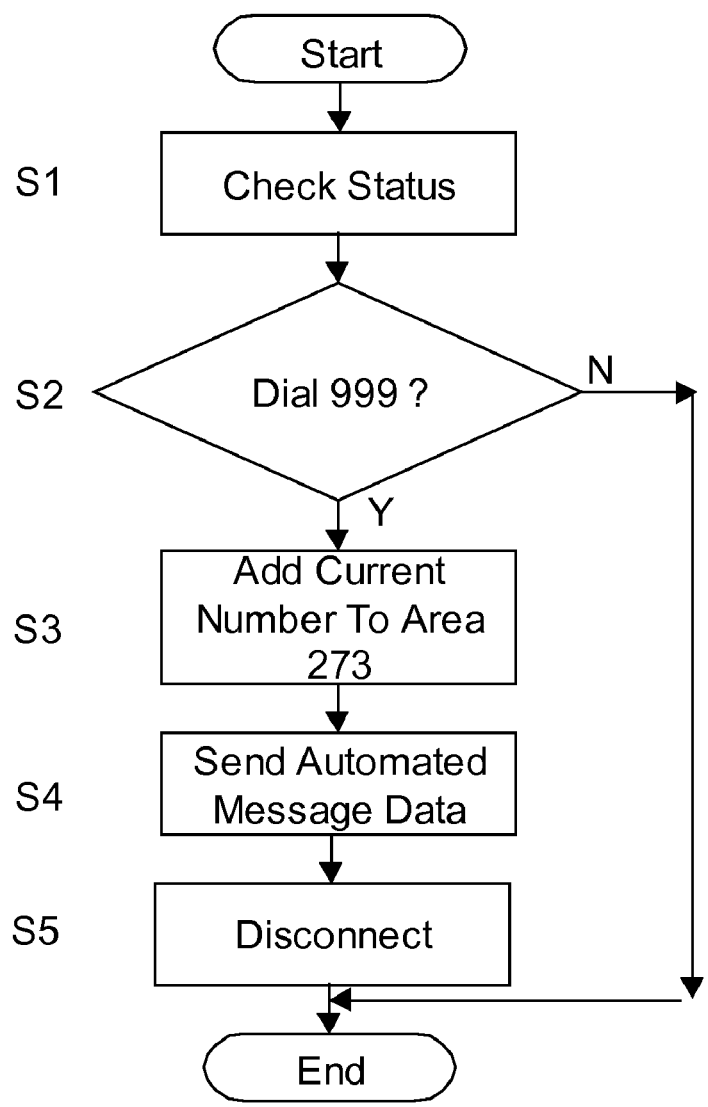
FIG. 56 is a flowchart illustrating an exemplary embodiment of the present invention.

FIG. 54 through FIG. 56 illustrates the method of so-called "call blocking."

As illustrated in FIG. 54 RAM 206 (FIG. 1) includes area 273 and area 274. Area 273 stores phone numbers that should be blocked. In the example illustrated in FIG. 54 phone #1, phone #2, and phone #3 are blocked. Area 274 stores a message data stating that the phone can not be connected.

FIG. 55 illustrates the operation of communication device 200. When communication device 200 receives a call (S1), CPU 211 (FIG. 1) scans area 273 of RAM 206 (S2). If the phone number of the incoming call matches one of the phone numbers stored in area 273 of RAM 206 (S3) CPU 211 sends the message data stored in area 274 of RAM 206 to the caller device (S4) and disconnects the line (S5).

FIG. 56 illustrates the method of updating area 273 of RAM 206. Assuming that the phone number of the incoming call does not match any of the phone numbers stored in area 273 of RAM 206 (see S3 of FIG. 55). In that case communication device 200 is connected to the caller device. However, the user of communication device 200 may decide to have such number "blocked" after all. In that case the user dials "999" while the line is connected. Technically CPU 211 (FIG. 1) periodically checks the signals input from input device 210 (FIG. 1) (S1). If the input signal represents "9991" from input device 210 (S2) CPU 211 adds the phone number of the pending call to area 273 (S3) and sends the message data stored in area 274 of RAM 206 to the caller device (S4). The line is disconnected thereafter (S5).

Figure 57:
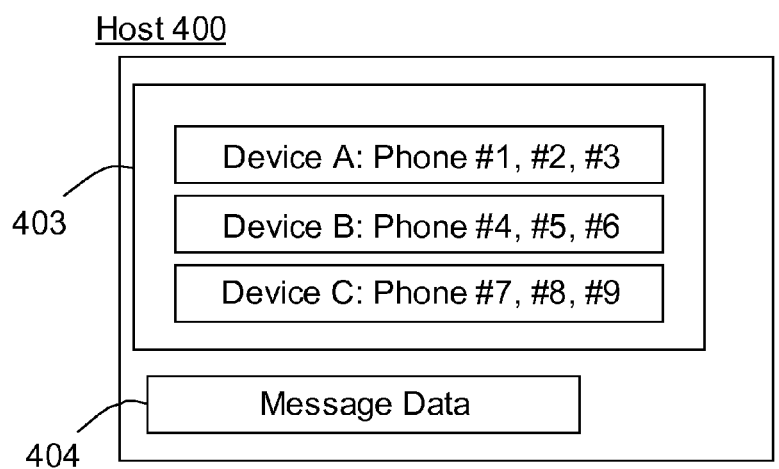
FIG. 57 is a block diagram illustrating an exemplary embodiment of the present invention.
Figure 58:
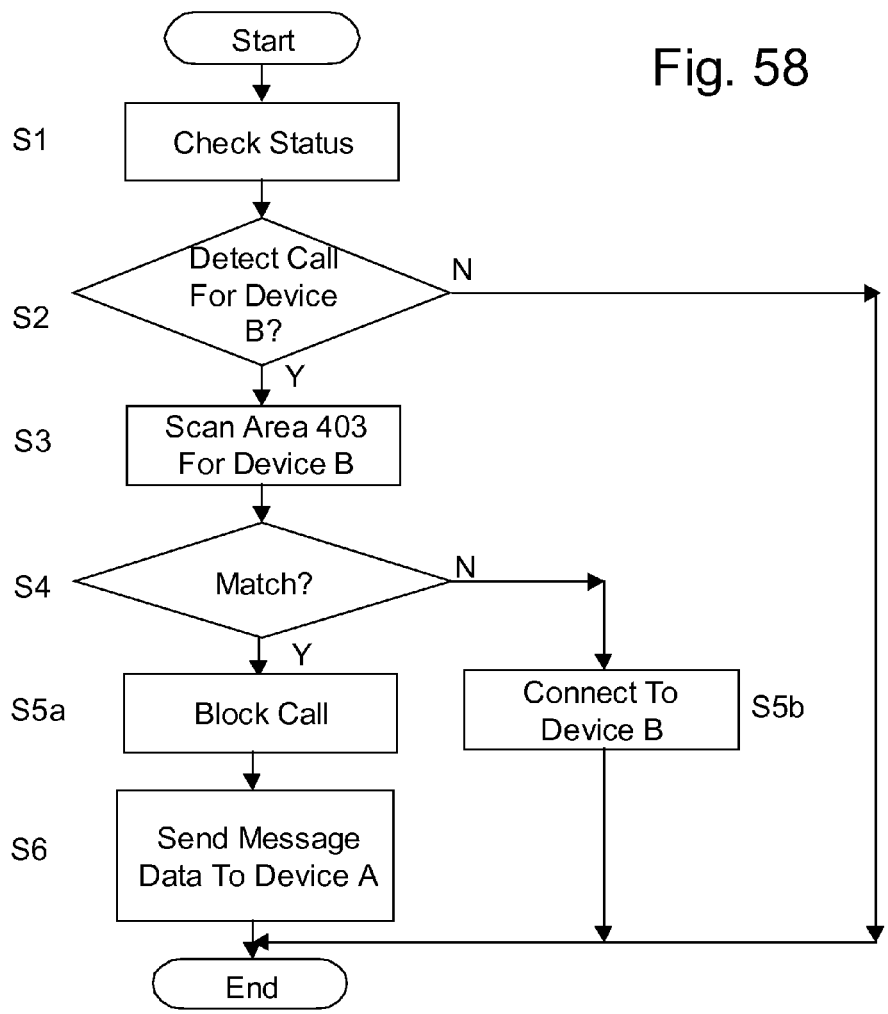
FIG. 58 is a flowchart illustrating an exemplary embodiment of the present invention.
Figure 59:
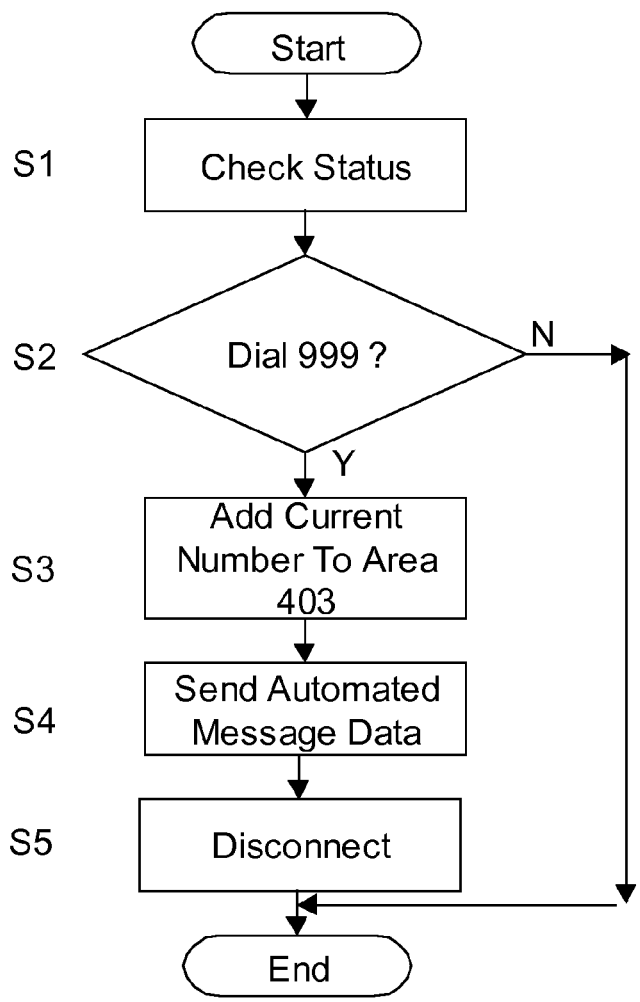
FIG. 59 is a flowchart illustrating an exemplary embodiment of the present invention.

FIG. 57 through FIG. 59 illustrates another embodiment of the present invention.

As illustrated in FIG. 57 host 400 includes area 403 and area 404. Area 403 stores phone numbers of communication device 200 that should be blocked. In the example illustrated in FIG. 57 phone #1, phone #2, and phone #3 are blocked for device A; phone #4, phone #5, and phone #6 are blocked for device B; and phone #7, phone #8, and phone #9 are blocked for device C. Area 404 stores a message data stating that the phone can not be connected.

FIG. 58 illustrates the operation of host 400. Assuming that the caller device is attempting to connect to device B illustrated in FIG. 57. Host 400 periodically checks the signals from all communication device 200 (S1). If host 400 detects a call for device B (S2) it scans area 403 and checks whether the phone number of the incoming call matches one of the phone numbers stored therein (S4). If the phone number of the incoming call does not match any of the phone numbers stored in area 403 the line is connected to device B (S5b). On the other hand, if the phone number of the incoming call matches one of the phone numbers stored in area 403 the line is "blocked," i.e., not connected to device B (S5a) and host 400 sends the massage data stored in area 404 to the caller device (S6).

FIG. 59 illustrates the method of updating area 403 of host 400. Assuming that the phone number of the incoming call does not match any of the phone numbers stored in area 403 (see S4 of FIG. 58). In that case host 400 allows the connection between the caller device and communication device 200. However, the user of communication device 200 may decide to have such number "blocked", after all. In that case the user simply dials "999" while the line is connected. Technically host 400 (FIG. 57) periodically checks the signals input from input device 210 (FIG. 1) (S1). If the input signal represents "999" from input device 210 (FIG. 1) (S2) host 400 adds the phone number of the pending call to area 403 (S3) and sends the message data stored in area 404 to the caller device (S4). The line is disconnected thereafter (S5). As another embodiment of the method illustrated in FIG. 59 host 400 may delegate some of its tasks to communication device 200 (this embodiment is not shown in drawings). Namely communication device 200 periodically checks the signals input from input device 210 (FIG. 1). If the input signal represents "999" from input device 210 communication device 200 sends to host a block request signal as well as with the phone number of the pending call. Host 400, upon receiving the block request signal from communication device 200, adds the phone number of the pending call to area 403 and sends the message data stored in area 404 to the caller device. The line is disconnected thereafter.

Online Payment

FIG. 60 through FIG. 64 illustrates the method of online payment by utilizing communication device 200.

Figure 60:
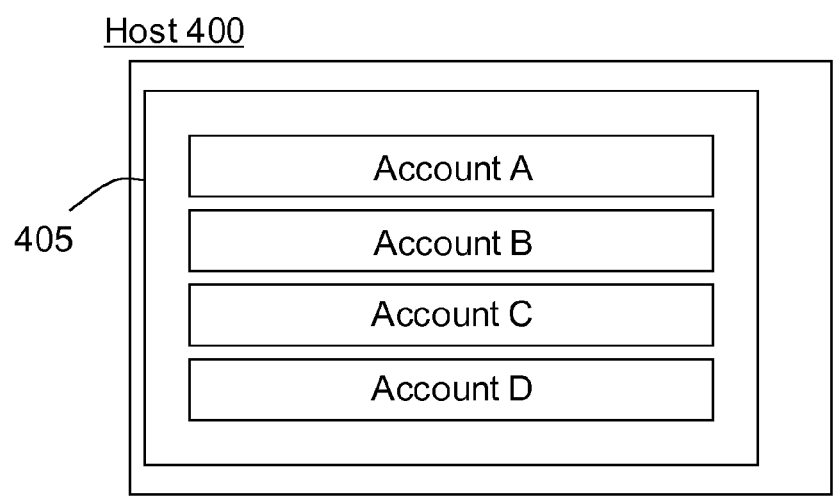
FIG. 60 is a block diagram illustrating an exemplary embodiment of the present invention.

As illustrated in FIG. 60 host 400 includes account data storage area 405. All of the account data of the users of communication device 200 who have signed up for the online payment service are stored in area 405. In the example described in FIG. 60 account A stores the relevant account data of the user using device A; account B stores the relevant account data of the user using device B; account C stores the relevant account data of the user using device C; and account D stores the relevant account data of the user using device D. Here, device A, B, C, and D are communication device 200.

Figure 61A:
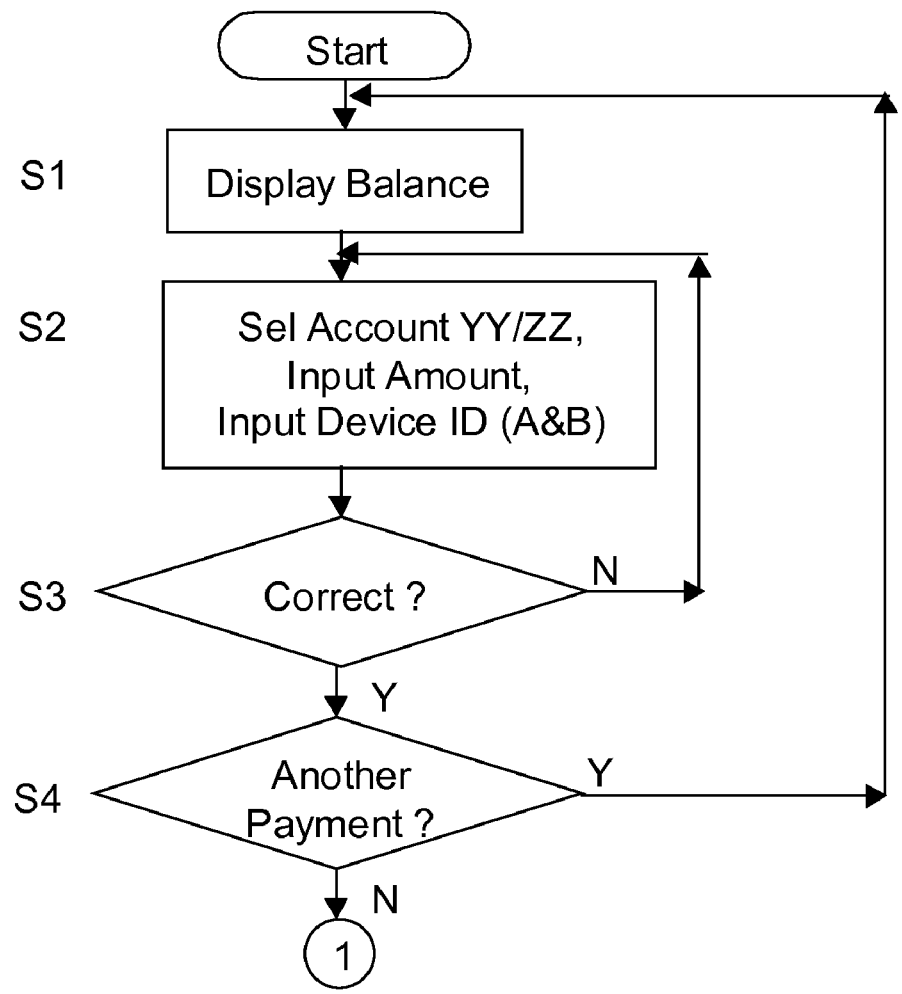
FIG. 61a is a flowchart illustrating an exemplary embodiment of the present invention.
Figure 61B:
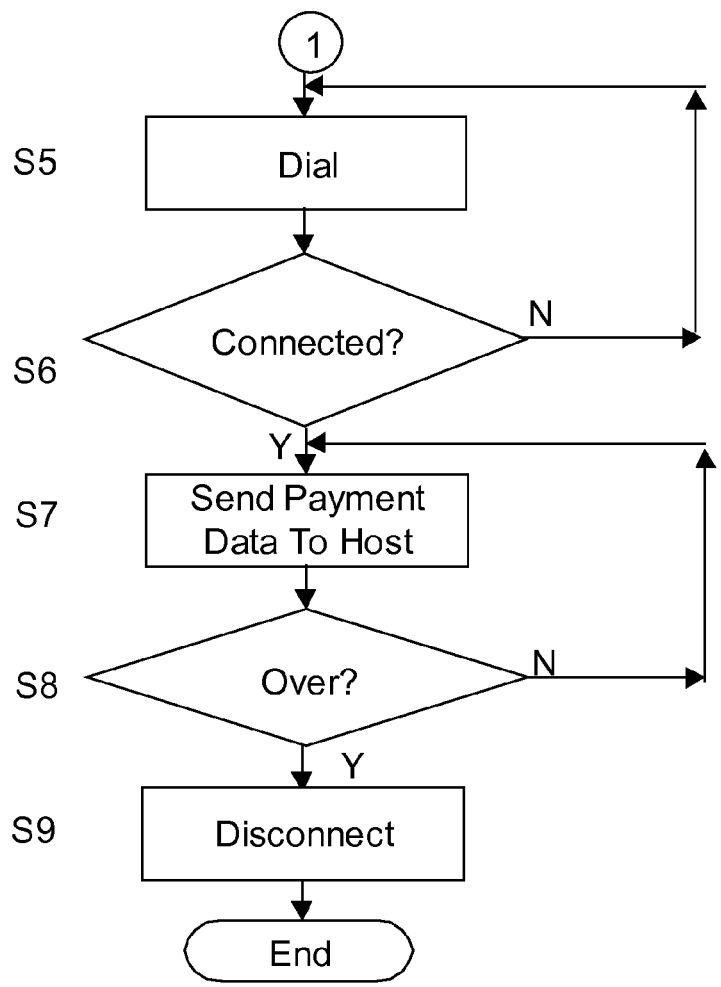
FIG. 61b is a flowchart illustrating an exemplary embodiment of the present invention.

FIG. 61a and FIG. 61b illustrate the operation of the payer device. Assuming that device A is the payer device and device B is the payee device. Account A explained in FIG. 60 stores the account data of the user of device A, and account B explained in the same drawing stores the account data of the user of device B. As illustrated in FIG. 61a LCD 201 of device A displays the balance of account A by receiving the relevant data from host 400 (FIG. 60) (S1). From the signal input from input device 210 (FIG. 1) the payer's account and the payee's account are selected (in the present example account A as the payer's account and account B as the payee's account), the amount of payment and the device ID (in the present example device A as the payer's device and device B as the payee's device) (S2). If the data input from input device 210 is correct (S3) CPU 211 (FIG. 1) of device A prompts for other payments. If there are other payments to make the sequence of S1 through S3 is repeated until all of the payments are made (S4). The dialing process is initiated and repeated thereafter (S5) until the line is connected to host 400 (S6). Once the line is connected device A sends the payment data to host 400 (FIG. 60) (S7). The line is disconnected when all of the payment data are sent to host 400 (S8 and S9).

Figure 62:
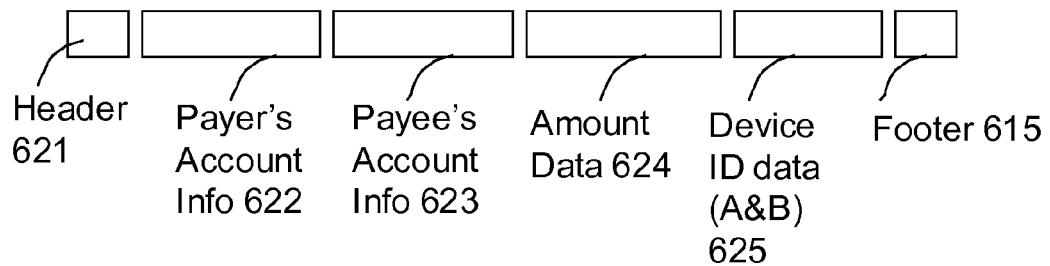
FIG. 62 is a simplified illustration illustrating an exemplary embodiment of the present invention.

FIG. 62 illustrates the payment data described in S7 of FIG. 61b. Payment data 620 is consisted of header 621, payer's account information 622, payee's account information 623, amount data 624, device ID data 625, and footer 615. Payer's account information 622 represents the information regarding the payer's account data stored in host 400 which is, in the present example, account A. Payee's account information 623 represents the information regarding the payee's account data stored in host 400 which is, in the present example, account B. Amount data 624 represents the amount of monetary value either in the U.S. dollars or in other currencies which is to be transferred from the payer's account to the payee's account. The device ID data represents the data of the payer's device and the payee's device, i.e., in the present example, device A and device B.

Figure 63:
FIG. 63 is a simplified illustration illustrating an exemplary embodiment of the present invention.

FIG. 63 illustrates the basic structure of the payment data described in S7 of FIG. 61b when multiple payments are made, i.e., when more than one payment is made in S4 of FIG. 61a. Assuming that three payments are made in S4 of FIG. 61a. In that case payment data 630 is consisted of header 631, footer 635, and three data sets, i.e., data set 632, data set 633, data set 634. Each data set represents the data components described in FIG. 62 excluding header 621 and footer 615.

Figure 64:
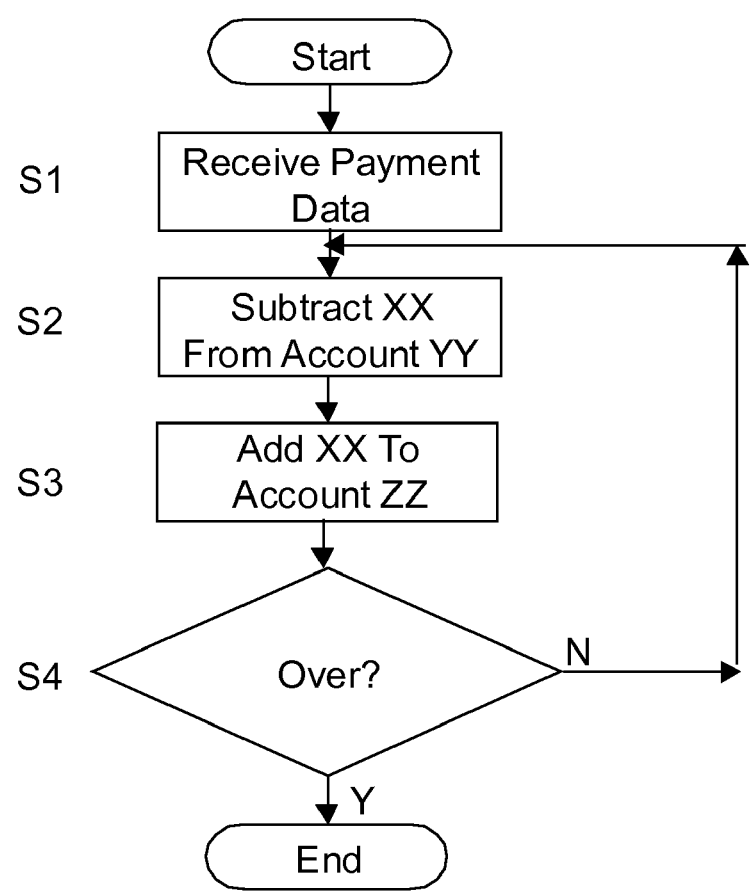
FIG. 64 is a flowchart illustrating an exemplary embodiment of the present invention.

FIG. 64 illustrates the operation of host 400 (FIG. 60). After receiving payment data from device A described in FIG. 62 and FIG. 63 host 400 retrieves therefrom the payer's account information (in the present example account A), the payee's account information (in the present example account B), the amount data which represents the monetary value, the device IDs of both the payer's device and the payee's device (in the present example device A and device B) (S1). Host 400 based on such data subtracts the monetary value represented by the amount data from the payer's account (in the present example account A) (S2), and adds the same amount to the payee's account (in the present example account B) (S3). If there are other payments to make, i.e., if host 400 received a payment data which has a structure of the one described in FIG. 63 the sequence of S2 and S3 is repeated as many times as the amount of the data sets are included in such payment data.

Navigation System

FIG. 65 through FIG. 74 illustrate the navigation system of communication device 200.

Figure 65:
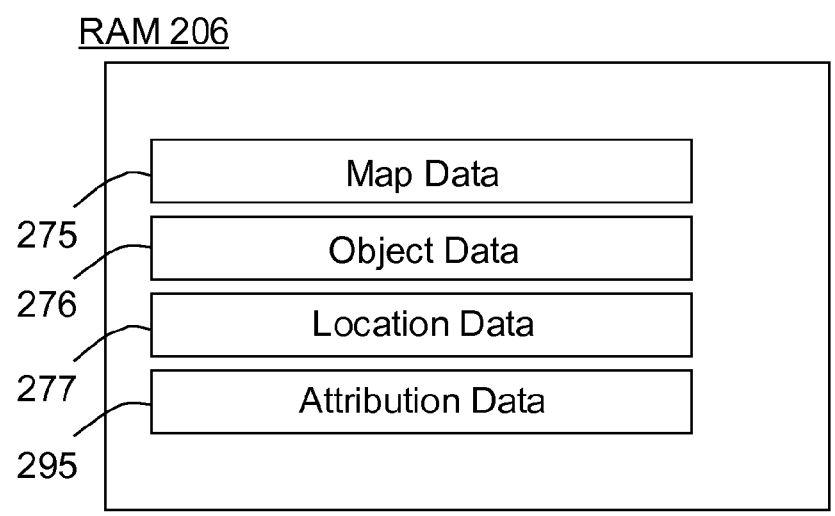
FIG. 65 is a block diagram illustrating an exemplary embodiment of the present invention.

As illustrated in FIG. 65 RAM 206 (FIG. 1) includes area 275, area 276, area 277, and area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called "texture mapping" which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in area 276. Area 277 also stores a plurality of data representing the street address of each object stored in area 276. In addition area 277 stores the current position data of communication device 200 and the destination data which are explained in details hereafter. The map data stored in area 275 and the location data stored in area 277 are linked each other. Area 295 stores a plurality of attribution data attributing to the map data stored in area 275 and location data stored in area 277, such as road blocks, traffic accidents, and road constructions, and traffic jams. The attribution data stored in area 295 is updated periodically by receiving an updated data from a host (not shown).

Figure 66:
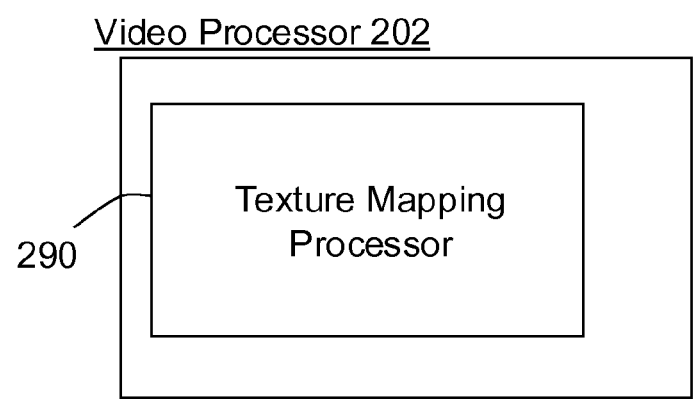
FIG. 66 is a block diagram illustrating an exemplary embodiment of the present invention.

As illustrated in FIG. 66 video processor 202 (FIG. 1) includes texture mapping processor 290. Texture mapping processor 290 produces polygons in a three-dimensional space and "pastes" textures to each polygons.

Figure 67:
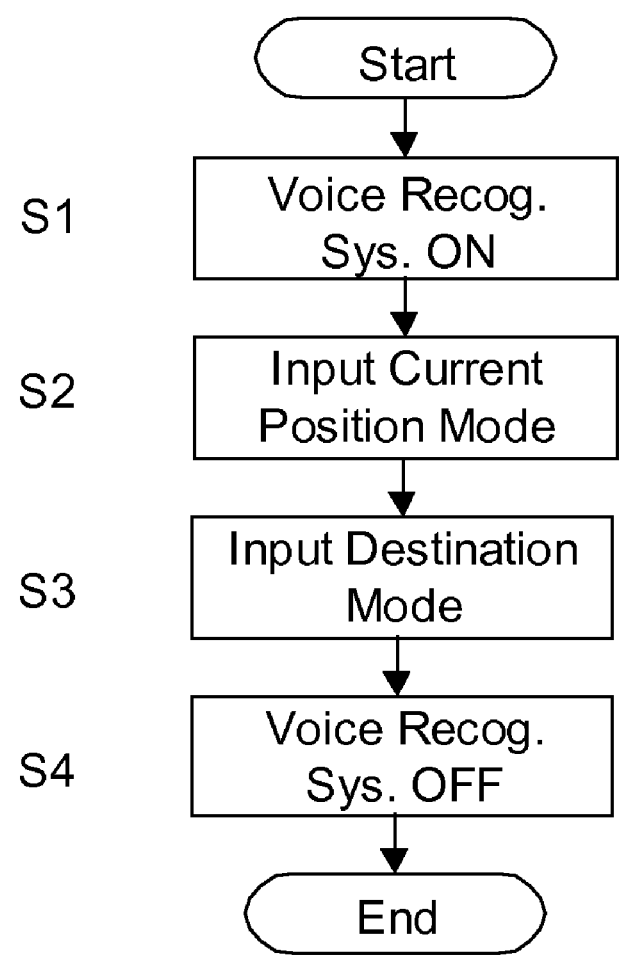
FIG. 67 is a flowchart illustrating an exemplary embodiment of the present invention.

As illustrated in FIG. 67 the voice recognition system is activated when the CPU 211 (FIG. 1) detects a specific signal input from input device 210 (FIG. 1) (S1). After the voice recognition system is activated the input current position mode starts and the current position of communication device 200 is input by voice recognition system explained in FIG. 3, FIG. 4, FIG. 5, FIG. 13, FIG. 14, FIG. 14a, FIG. 15, FIG. 16 and/or FIG. 17 (S2). The current position can also be input from input device 210. As another embodiment of the present invention the current position can automatically be detected by the method so-called "global positioning system" or "GPS" as illustrated in FIG. 20a through FIG. 26 and input the current data therefrom. After the process of inputting the current data is completed the input destination mode starts and the destination is input by the voice recognition system explained above or by the input device 210 (S3), and the voice recognition system is deactivated after the process of inputting the destination data is completed by using such system (S4).

Figure 68:
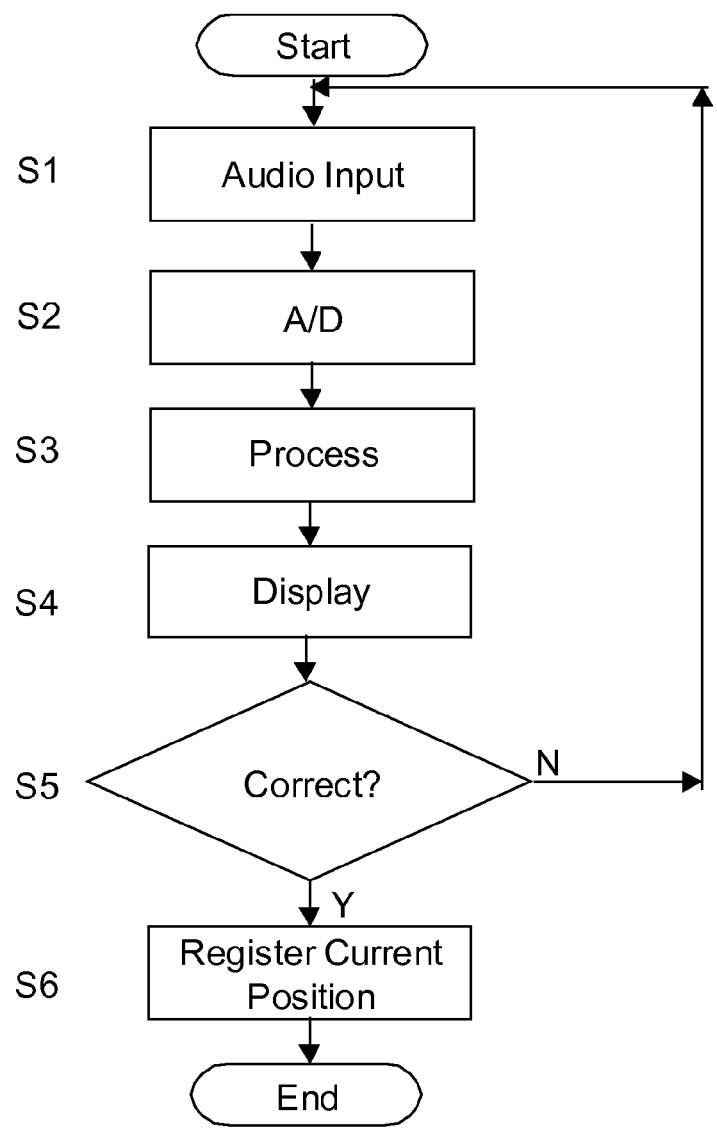
FIG. 68 is a flowchart illustrating an exemplary embodiment of the present invention.

FIG. 68 illustrates the sequence of the input current position mode described in S2 of FIG. 67. When analog audio data is input from microphone 215 (FIG. 1) (S1) such data is converted into digital audio data by A/D 213 (FIG. 1) (S2). The digital audio data is processed by sound processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed such data is registered as current position data (S6). As stated above the current position data can input manually by input device 210 (FIG. 1) and/or by automatically inputting such data by the method so-called "global positioning system" or "GPS" as described above.

Figure 69:
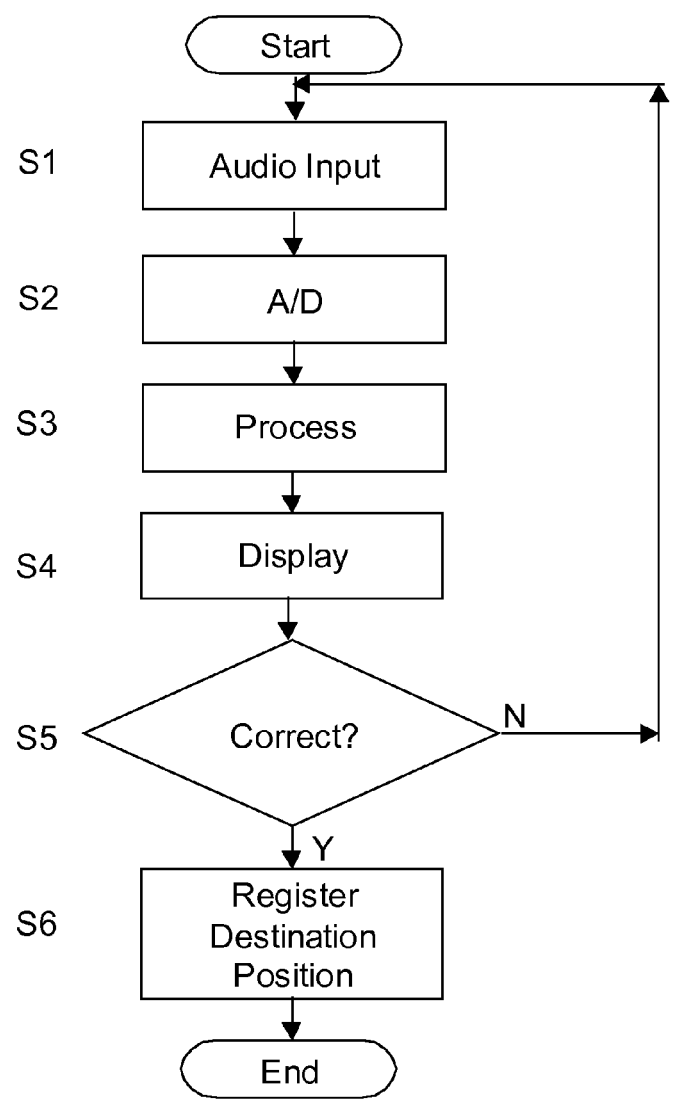
FIG. 69 is a flowchart illustrating an exemplary embodiment of the present invention.

FIG. 69 illustrates the sequence of the input destination mode described in S3 of FIG. 67. When analog audio data is input from microphone 215 (FIG. 1) (S1) such data is converted into digital audio data by A/D 213 (FIG. 1) (S2). The digital audio data is processed by sound processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed such data is registered as destination data (S6).

Figure 70:
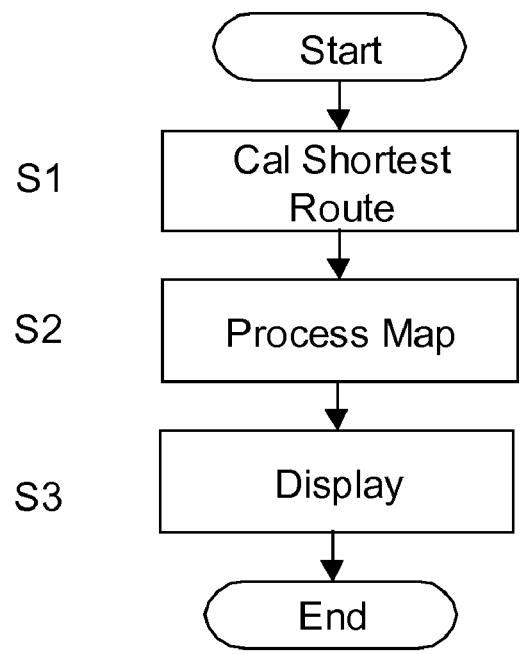
FIG. 70 is a flowchart illustrating an exemplary embodiment of the present invention.

FIG. 70 illustrates the sequence of displaying the shortest route from the current position to the destination. CPU 211 (FIG. 1) retrieves both the current position data and the destination data which are input by the method described in FIG. 67 through FIG. 69 from area 277 of RAM 206 (FIG. 1). By utilizing the location data of streets, bridges, traffic lights and other relevant data CPU 211 calculates the shortest route to the destination (S1). CPU 211 then retrieves the relevant two-dimensional map data which should be displayed on LCD 201 from area 275 of RAM 206 (S2). As another embodiment of the present invention by way of utilizing the location data stored in area 277 CPU 211 may produce a three-dimensional map by composing the three dimensional objects (by method so-called "texture mapping" as described above) which are stored in area 276 of RAM 206. The two-dimensional map and/or the three dimensional map are displayed on LCD 201 (FIG. 1) (S3). As another embodiment of the present invention the attribution data stored in area 295 of RAM 206 may be utilized. Namely if any road block, traffic accident, road construction, and/or traffic jam is included in the shortest route calculated by the method mentioned above, CPU 211 calculates the second shortest route to the destination. If the second shortest route still includes road block, traffic accident, road construction, and/or traffic jam CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of communication device 200 to easily recognize such route on LCD 201.

As another embodiment of the present invention an image which is similar to the one which is observed by the user in the real world may be displayed on LCD 201 (FIG. 1) by using the three-dimensional object data. In order to produce such image CPU 211 (FIG. 1) identifies the present location and retrieves the corresponding location data from area 277 of RAM 206 (FIG. 65). Then CPU 211 retrieves a plurality of object data which correspond to such location data from area 276 or RAM 206 (FIG. 65) and displays a plurality of objects on LCD 201 based on such object data in a manner the user of communication device 200 may observe from the current location.

Figure 71:
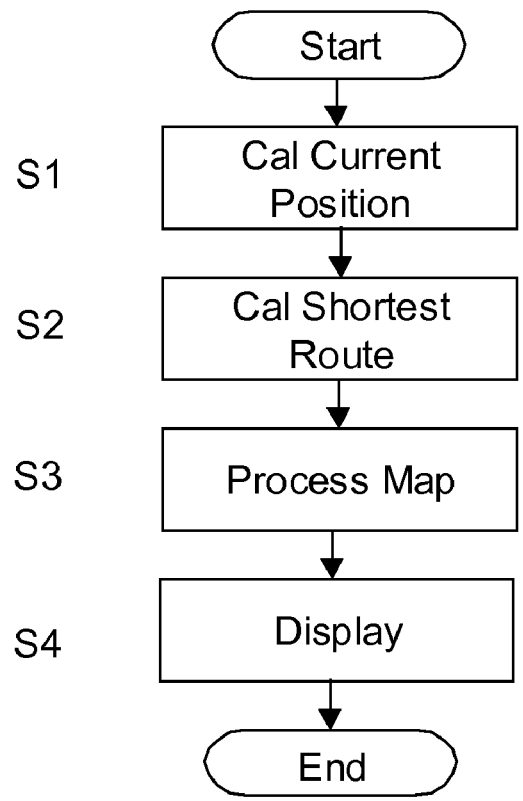
FIG. 71 is a flowchart illustrating an exemplary embodiment of the present invention.

FIG. 71 illustrates the sequence of updating the shortest route to the destination while communication device 200 is moving. By way of periodically and automatically inputting the current position by the method so-called "global positioning system" or "GPS" as described above the current position is continuously updated (S1). By utilizing the location data of streets and traffic lights and other relevant data CPU 211 recalculates the shortest route to the destination (S2). CPU 211 then retrieves the relevant two-dimensional map data which should be displayed on LCD 201 from area 275 of RAM 206 (FIG. 65) (S3). As another embodiment of the present invention by way of utilizing the location data stored in 277 CPU 211 may produce a three-dimensional map by composing the three dimensional objects by method so-called "texture mapping" which are stored in area 276 of RAM 206 (FIG. 65). The two-dimensional map and/or the three-dimensional map is displayed on LCD 201 (FIG. 1) (S4). The shortest route to the destination is re-highlighted by a significant color (such as red) to enable the user of communication device 200 to easily recognize the updated route on LCD 201.

Figure 72:
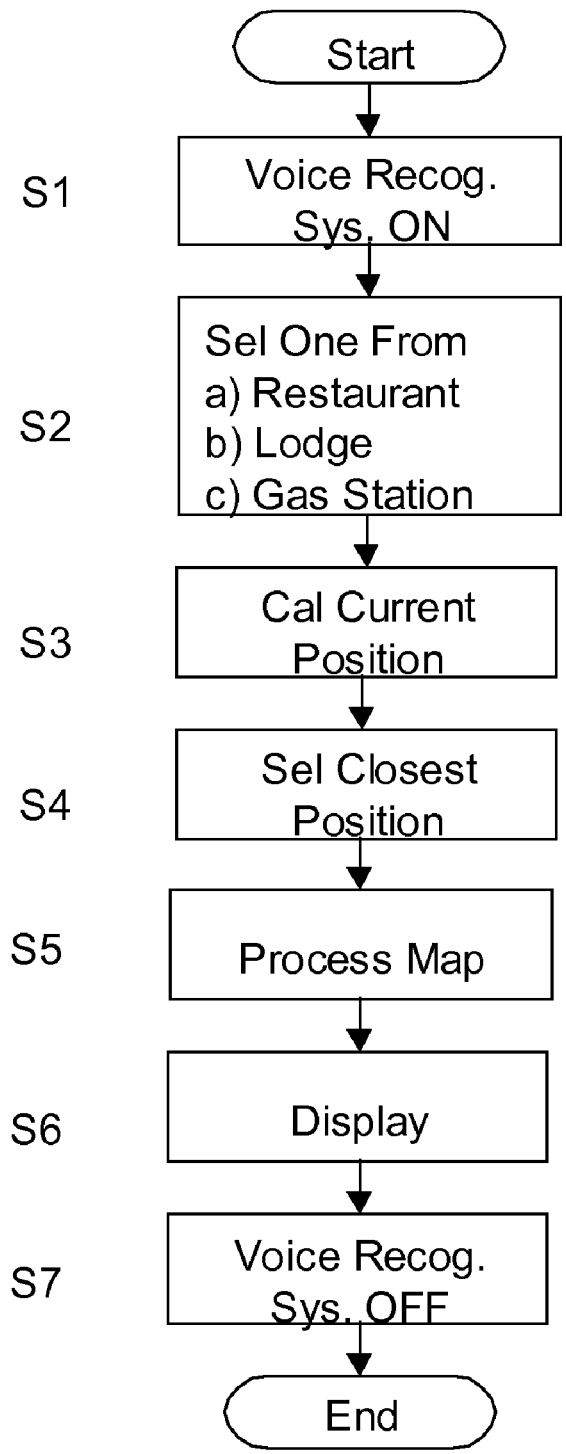
FIG. 72 is a flowchart illustrating an exemplary embodiment of the present invention.

FIG. 72 illustrates the method of finding the shortest location of the desired facility, such as restaurant, hotel, gas station, etc. The voice recognition system is activated in the manner described in FIG. 67 (S1). By way of utilizing the system a certain type of facility is selected from the options displayed on LCD 201 (FIG. 1). The prepared options can be a) restaurant, b) lodge, and c) gas station (S2). Once one of the options is selected CPU 211 (FIG. 1) calculates and inputs the current position by the method described in FIG. 68 and/or FIG. 71 (S3). From the data selected in S2 CPU 211 scans area 277 or RAM 206 (FIG. 65) and searches the location of the facilities of the selected category (such as restaurant) which is the closest to the current position (S4). CPU 211 then retrieves the relevant two-dimensional map data which should be displayed on LCD 201 from area 275 of RAM 206 (FIG. 65) (S5). As another embodiment of the present invention by way of utilizing the location data stored in 277 CPU 211 may produce a three-dimensional map by composing the three dimensional objects by method so-called "texture mapping" which are stored in area 276 of RAM 206 (FIG. 65). The two-dimensional map and/or the three dimensional map is displayed on LCD 201 (FIG. 1) (S6). The shortest route to the destination is re-highlighted by a significant color (such as red) to enable the user of communication device 200 to easily recognize the updated route on LCD 201. The voice recognition system is deactivated thereafter (S7).

FIG. 73 illustrates the method of displaying the time and distance to the destination. As illustrated in FIG. 73 CPU 211 (FIG. 1) calculates the current position where the source data can be input from the method described in FIG. 68 and/or FIG. 71 (S1). The distance is calculated from the method described in FIG. 70 (S2). The speed is calculated from the distance which communication device 200 has proceeded within specific duration of time (S3). The distance to the destination and the time left are displayed on LCD 201 (FIG. 1) (S4 and S5).

FIG. 74 illustrates the method of warning and giving instructions when the user of communication device 200 deviates from the correct route. By way of periodically and automatically inputting the current position by the method so-called "global positioning system" or "GPS" as described above the current position is continuously updated (S1). If the current position deviates from the correct route (S2) warnings are given from speaker 216 (FIG. 1) and/or LCD 201 (FIG. 1) (S3). The method described in FIG. 74 is repeated for certain period of time. If the deviation still exists after such period of time has passed CPU 211 (FIG. 1) initiates the sequence described in FIG. 70 and calculates the shortest route to the destination and display on LCD 201. The details of such sequence is as same as the one explained in FIG. 70.

Figure 74A:
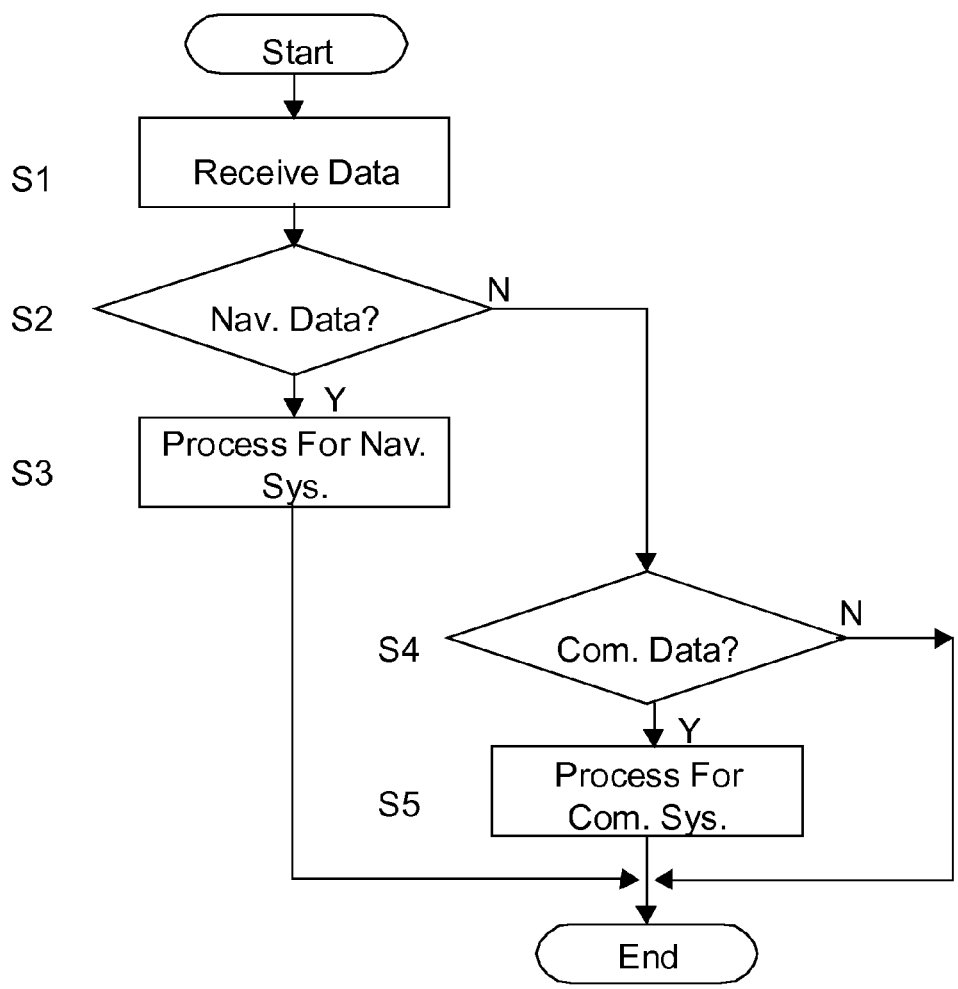
FIG. 74a is a flowchart illustrating an exemplary embodiment of the present invention.

FIG. 74a illustrates the overall operation of communication device 200 regarding the navigation system and the communication system. When communication device 200 receives data from antenna 218 (S1) CPU 211 (FIG. 1) determines whether the data is navigation data, i.e., data necessary to operate the navigation system (S2). If the data received is a navigation data the navigation system described in FIG. 67 through FIG. 74 is performed (S3). On the other hand, if the data received is a communication data (S4) the communication system, i.e., the system necessary for wireless communication which is mainly described in FIG. 1 is performed (S5).

Remote Controlling System

FIG. 75 through FIG. 83 illustrates the remote controlling system of communication device 200.

Figure 75:
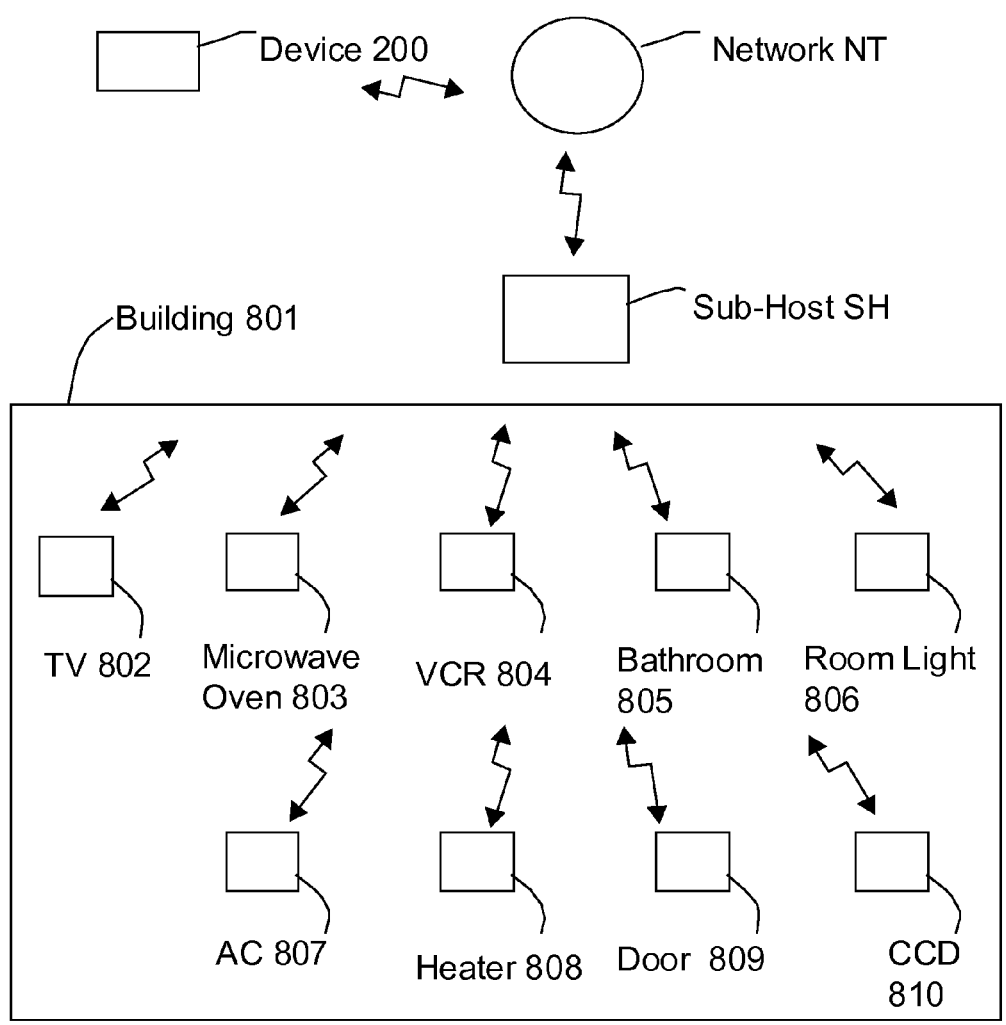
FIG. 75 is a simplified illustration illustrating an exemplary embodiment of the present invention.

As illustrated in FIG. 75 communication device 200 is connected to network NT. Network NT may be the internet or have the same or similar structure described in FIG. 2a, FIG. 2b and/or FIG. 2c except "device B" is substituted to "sub-host SH" in these drawings. Network NT is connected to sub-host SH in a wireless fashion. Sub-host SH administers various kinds of equipment installed in building 801, such as TV 802, microwave oven 803, VCR 804, bathroom 805, room light 806, AC 807, heater 808, door 809, and CCD camera 810. Communication device transfers a control signal to sub-host SH via network NT, and sub-host SH controls the selected equipment based on the control signal.

Figure 76:
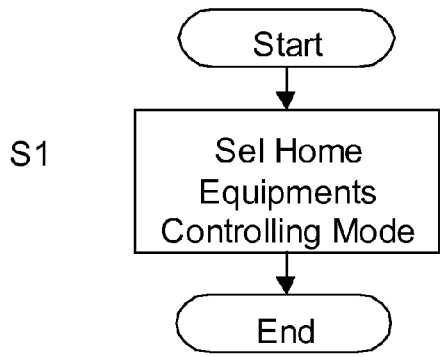
FIG. 76 is a flowchart illustrating an exemplary embodiment of the present invention.

As illustrated in FIG. 76 communication device 200 is enabled to perform the remote controlling system when the device is set to the home equipment controlling mode. Once communication device 200 is set to the home equipment controlling mode, LCD 201 (FIG. 1) displays all pieces of equipment which are remotely controllable by communication device 200. Each equipment can be controllable by the following method.

Figure 77:
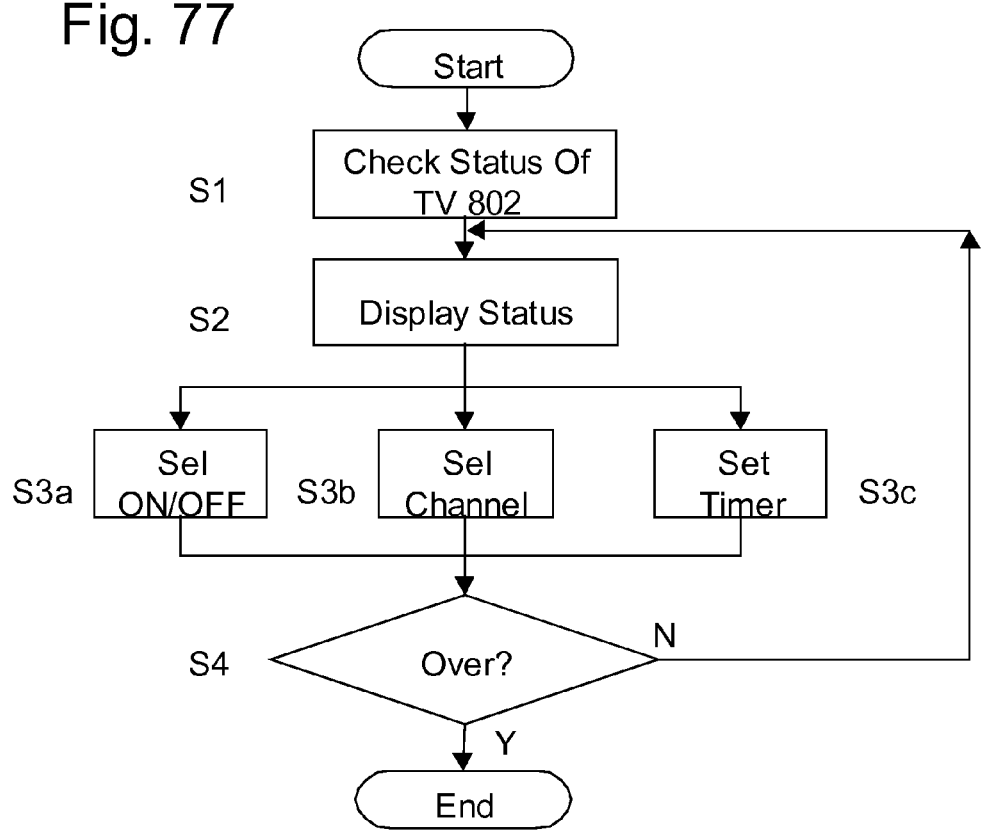
FIG. 77 is a flowchart illustrating an exemplary embodiment of the present invention.

FIG. 77 illustrates the method of remotely controlling TV 802. In order to check the status of TV 802 a specific signal is input from input device 210 (FIG. 1) and communication device 200 thereby sends a check request signal to sub-host SH via network NT. Sub-host SH, upon receiving the check request signal, checks the status of TV 802, i.e., the status of the power (ON/OFF), the channel, and the timer of TV 802 (S1), and returns the results to communication device 200 via network NT, which are displayed on LCD 201 (S2). Based on the control signal produced by communication device 200, which is transferred via network NT, sub-host SH turns the power on (or off) (S3a), selects the channel (S3b), and/or sets the timer of TV 802 (S3c). The sequence of S2 and S3 can be repeated (S4).

Figure 78:
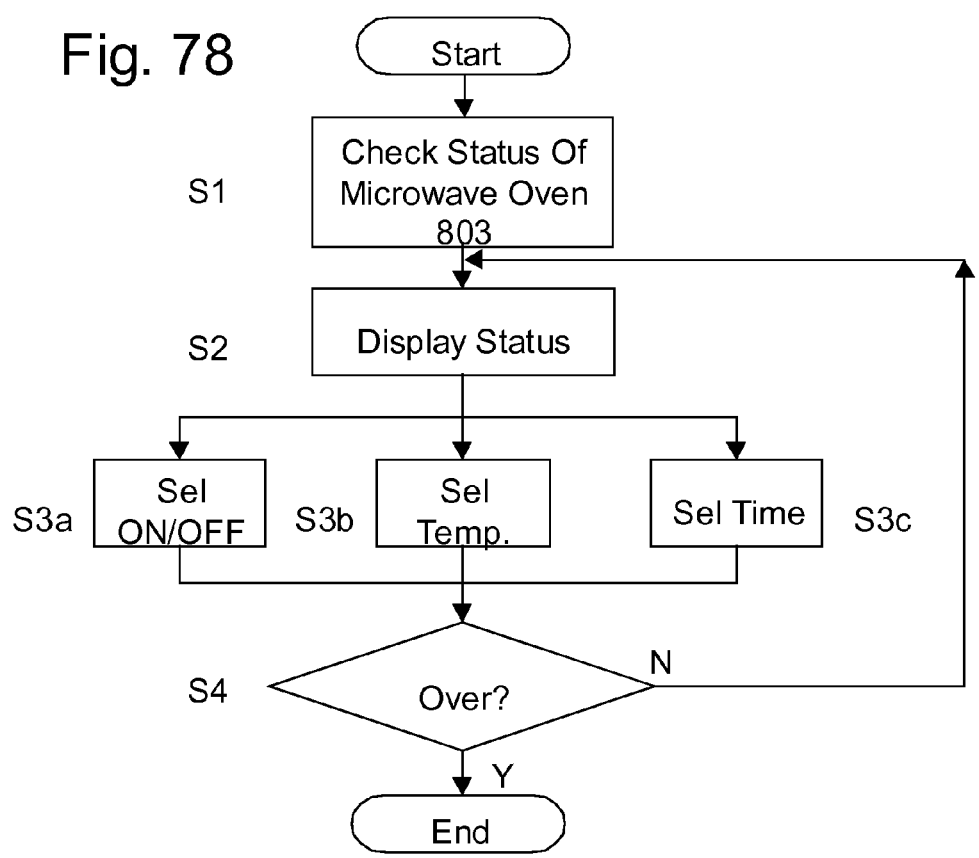
FIG. 78 is a flowchart illustrating an exemplary embodiment of the present invention.

FIG. 78 illustrates the method of remotely controlling microwave oven 803. In order to check the status of microwave oven 803 a specific signal is input from input device 210 (FIG. 1) and communication device 200 thereby sends a check request signal to sub-host SH via network NT. Sub-host SH, upon receiving the check request signal, checks the status of microwave oven 803, i.e., the status of the power (ON/OFF), the status of temperature, and the timer of microwave oven 803 (S1), and returns the results to communication device 200 via network NT, which are displayed on LCD 201 (S2). Based on the control signal produced by communication device 200, which is transferred via network NT, sub-host SH turns the power on (or off) (S3a), selects the temperature (S3b), and/or sets the timer of microwave oven 803 (S3c). The sequence of S2 and S3 can be repeated (S4).

Figure 79:
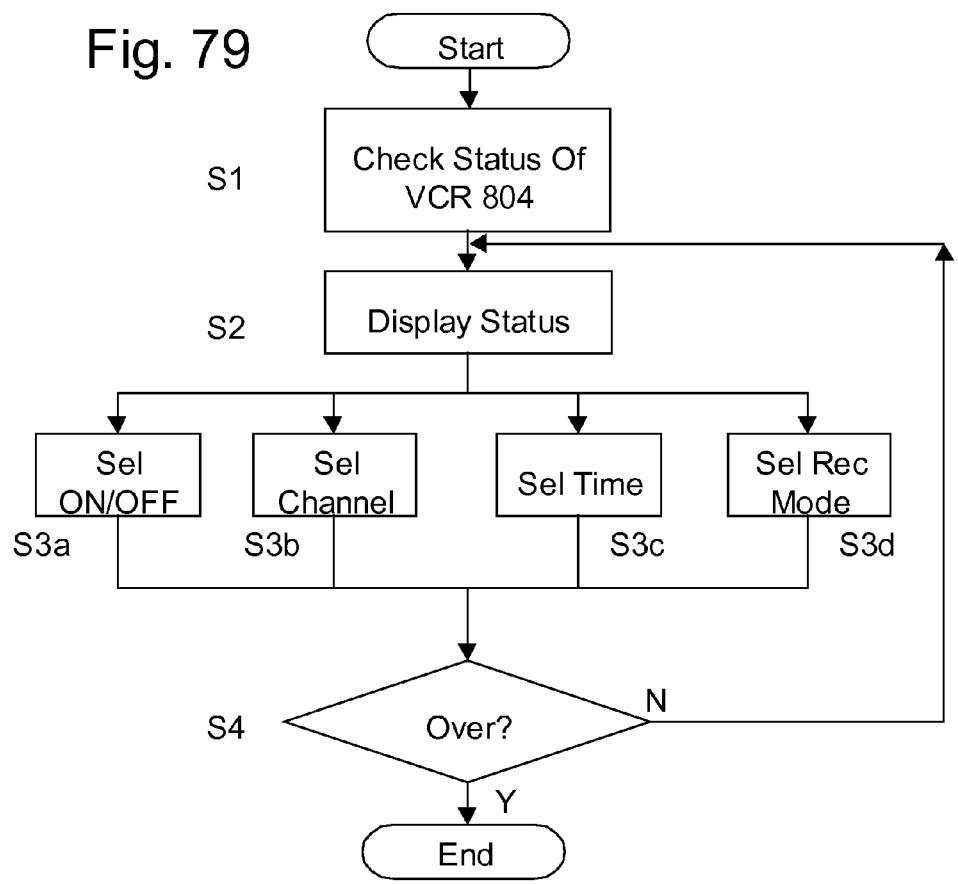
FIG. 79 is a flowchart illustrating an exemplary embodiment of the present invention.

FIG. 79 illustrates the method of remotely controlling VCR 804. In order to check the status of VCR 804 a specific signal is input from input device 210 (FIG. 1) and communication device 200 thereby sends a check request signal to sub-host SH via network NT. Sub-host SH, upon receiving the check request signal, checks the status of VCR 804, i.e., the status of the power (ON/OFF), the channel, the timer, and the status of the recording mode (e.g., one day, weekdays, or weekly) of VCR 804 (S1), and returns the results to communication device 200 via network NT, which are displayed on LCD 201 (S2). Based on the control signal produced by communication device 200, which is transferred via network NT, sub-host SH turns the power on (or off) (S3a), selects the channel (S3b), sets the timer (S3c), and/or selects the recording mode of VCR 804 (S3d). The sequence of S2 and S3 can be repeated (S4).

Figure 80:
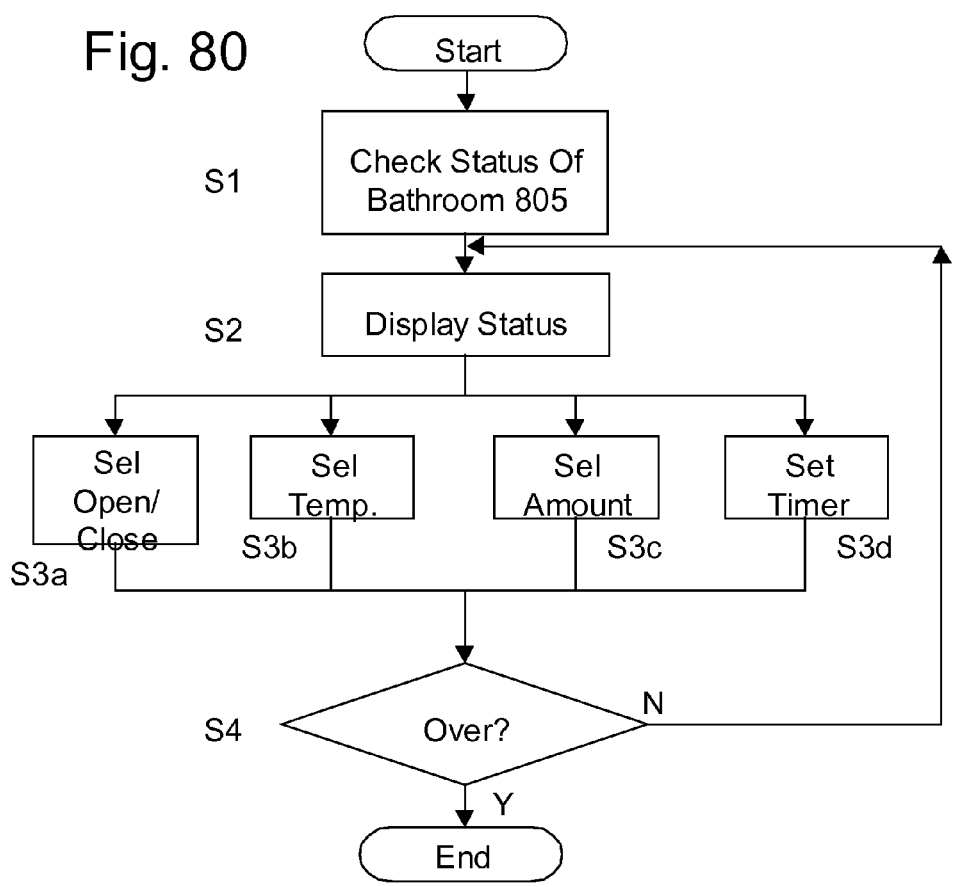
FIG. 80 is a flowchart illustrating an exemplary embodiment of the present invention.

FIG. 80 illustrates the method of remotely controlling bathroom 805. In order to check the status of bathroom 805 a specific signal is input from input device 210 (FIG. 1) and communication device 200 thereby sends a check request signal to sub-host SH via network NT. Sub-host SH, upon receiving the check request signal, checks the status of bathroom 805, i.e., the status of bath plug (or stopper for bathtub) (OPEN/CLOSE), the temperature, the amount of hot water, and the timer of bathroom 805 (S1), and returns the results to communication device 200 via network NT, which are displayed on LCD 201 (S2). Based on the control signal produced by communication device 200, which is transferred via network NT, sub-host SH opens (or closes) the bath plug (S3a), selects the temperature (S3b), selects the amount of hot water (S3c), and/or sets the timer of bathroom 805 (S3d). The sequence of S2 and S3 can be repeated (S4).

Figure 81:
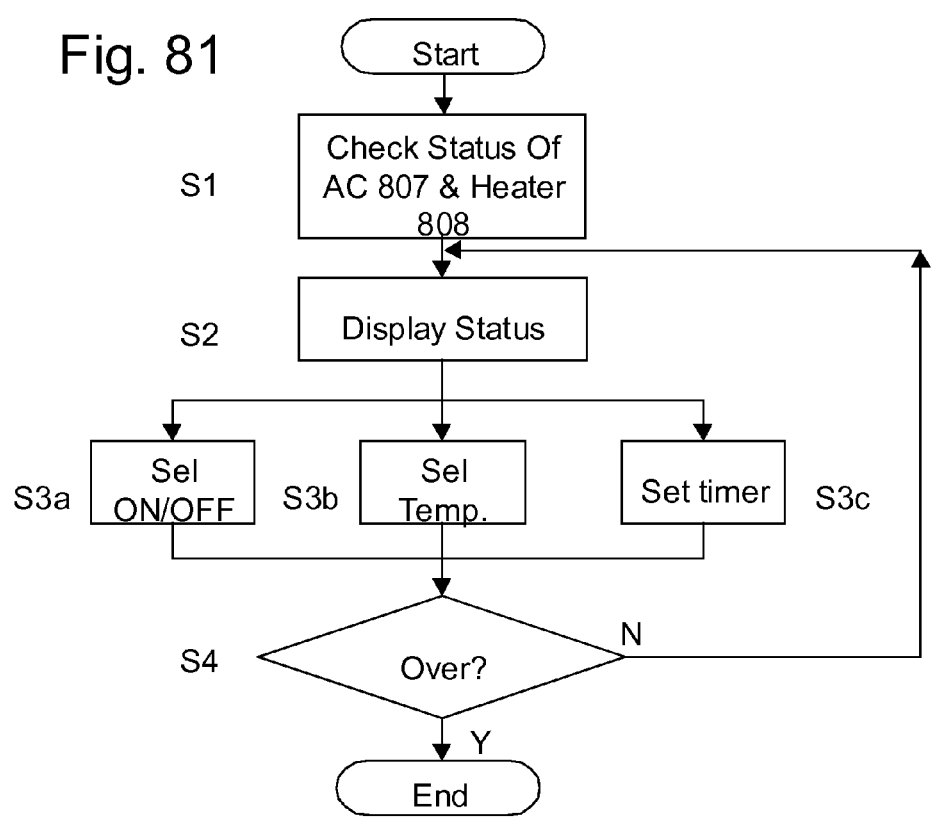
FIG. 81 is a flowchart illustrating an exemplary embodiment of the present invention.

FIG. 81 illustrates the method of remotely controlling AC 807 and heater 808. In order to check the status of AC 807 and/or heater 808 a specific signal is input from input device 210 (FIG. 1) and communication device 200 thereby sends a check request signal to sub-host SH via network NT. Sub-host SH, upon receiving the check request signal, checks the status of AC 807 and/or heater 808, i.e., the status of the power (ON/OFF), the status of temperature, and the timer of AC 807 and/or heater 808 (S1), and returns the results to communication device 200 via network NT, which are displayed on LCD 201 (S2). Based on the control signal produced by communication device 200, which is transferred via network NT, sub-host SH turns the power on (or off) (S3a), selects the temperature (S3b), and/or sets the timer of AC 807 and/or heater 808 (S3c). The sequence of S2 and S3 can be repeated (S4).

Figure 82:
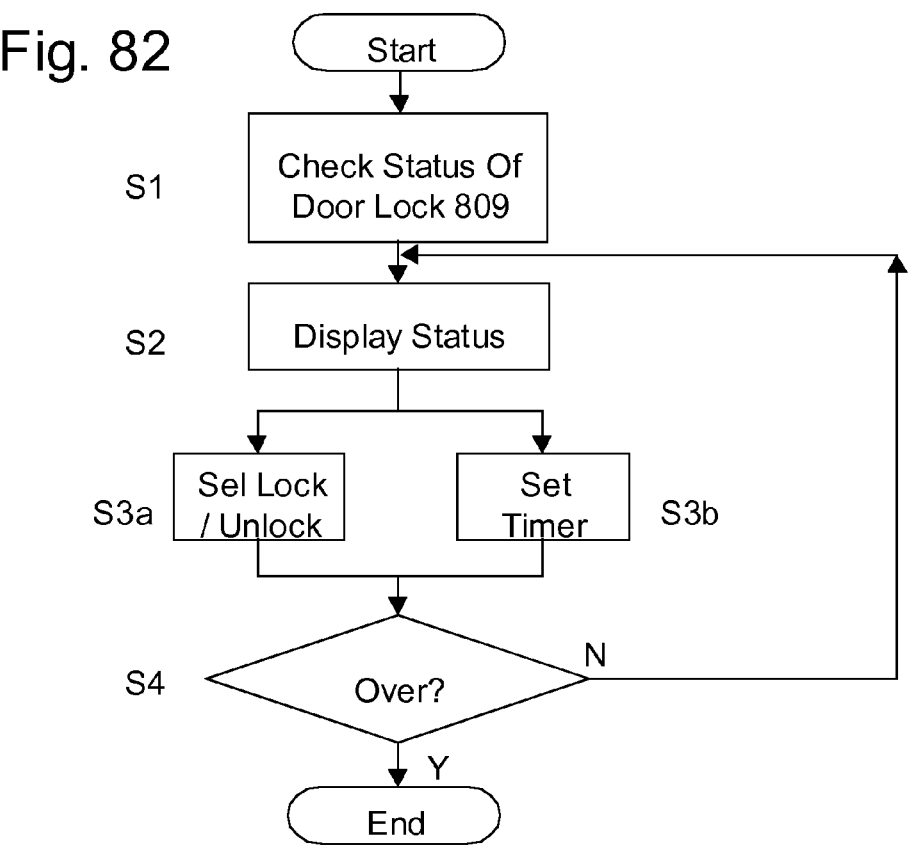
FIG. 82 is a flowchart illustrating an exemplary embodiment of the present invention.

FIG. 82 illustrates the method of remotely controlling door 809. In order to check the status of door 809 a specific signal is input from input device 210 (FIG. 1) and communication device 200 thereby sends a check request signal to sub-host SH via network NT. Sub-host SH, upon receiving the check request signal, checks the status of door 809, i.e., the status of the door lock (LOCKED/UNLOCKED), and the timer of door lock (S1), and returns the results to communication device 200 via network NT, which are displayed on LCD 201 (S2). Based on the control signal produced by communication device 200, which is transferred via network NT, sub-host SH locks (or unlocks) the door (S3a), and/or sets the timer of the door lock (S3b). The sequence of S2 and S3 can be repeated (S4).

Figure 83:
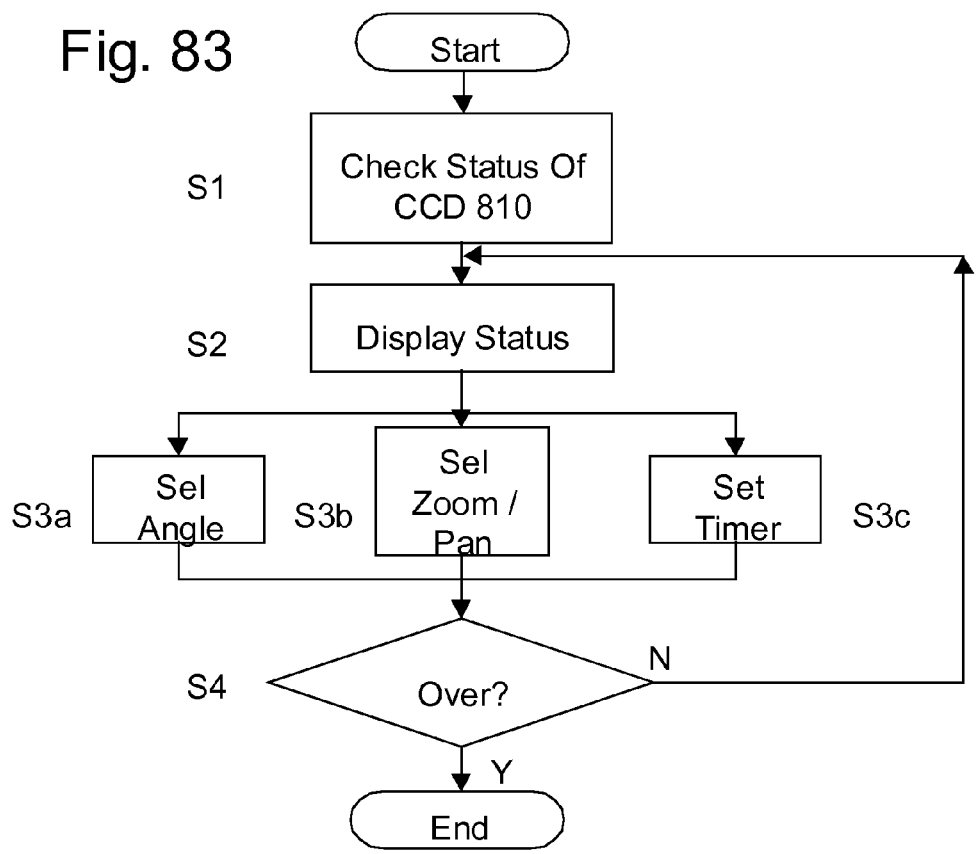
FIG. 83 is a flowchart illustrating an exemplary embodiment of the present invention.

FIG. 83 illustrates the method of CCD camera 810. In order to check the status of CCD camera 810 a specific signal is input from input device 210 (FIG. 1) and communication device 200 thereby sends a check request signal to sub-host SH via network NT. Sub-host SH, upon receiving the check request signal, checks the status of CCD camera 810, i.e., the status of the camera angle, zoom and pan, and the timer of CCD camera 810 (S1), and returns the results to communication device 200 via network NT, which are displayed on LCD 201 (S2). Based on the control signal produced by communication device 200, which is transferred via network NT, sub-host SH selects the camera angle (S3a), selects zoom or pan (S3b), and/or sets the timer of CCD camera 810 (S3c). The sequence of S2 and S3 can be repeated (S4).

Figure 84:
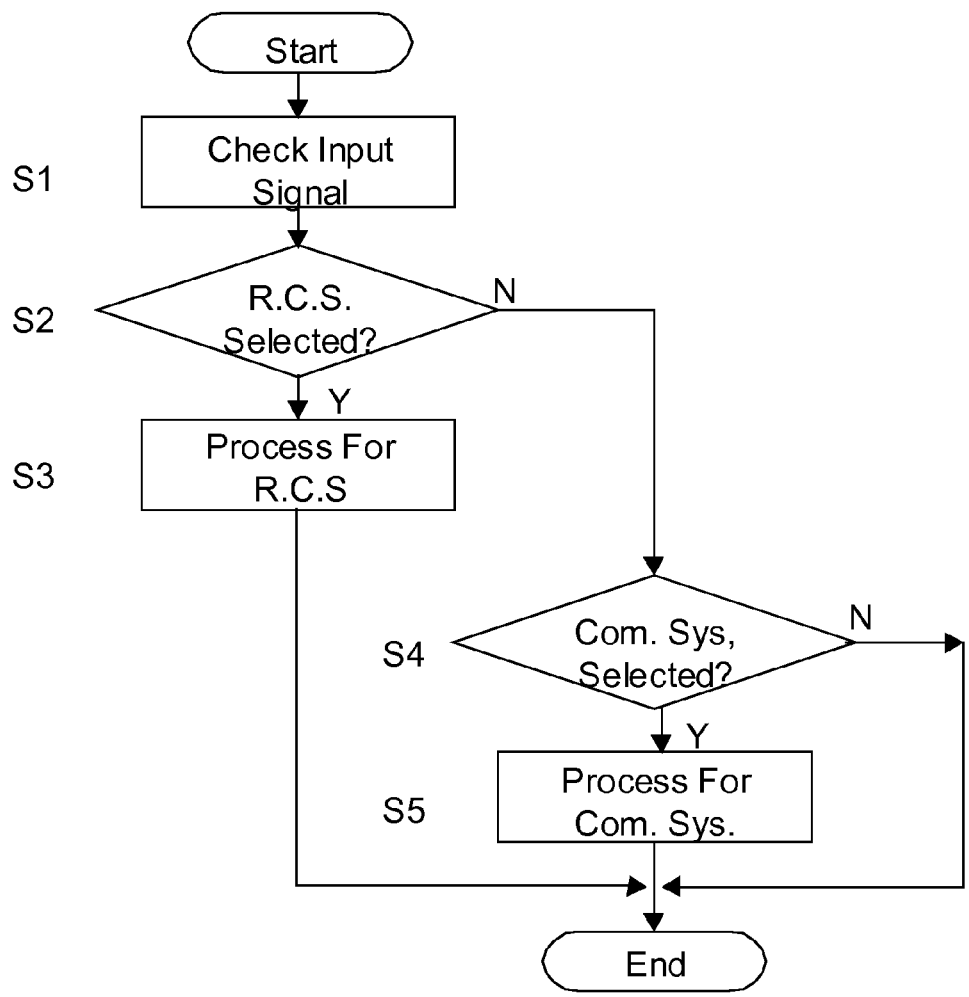
FIG. 84 is a flowchart illustrating an exemplary embodiment of the present invention.

FIG. 84 illustrates the overall operation of communication device 200 regarding the remote controlling system and communication system. CPU 211 (FIG. 1) periodically checks the input signal from input device 210 (FIG. 1). If the input signal indicates that the remote controlling system is selected (S2) CPU 211 initiates the process for the remote controlling system (S3). On the other hand, if the input signal indicates that the communication system is selected (S4) CPU 211 initiates the process for the communication system.

Figure 85:
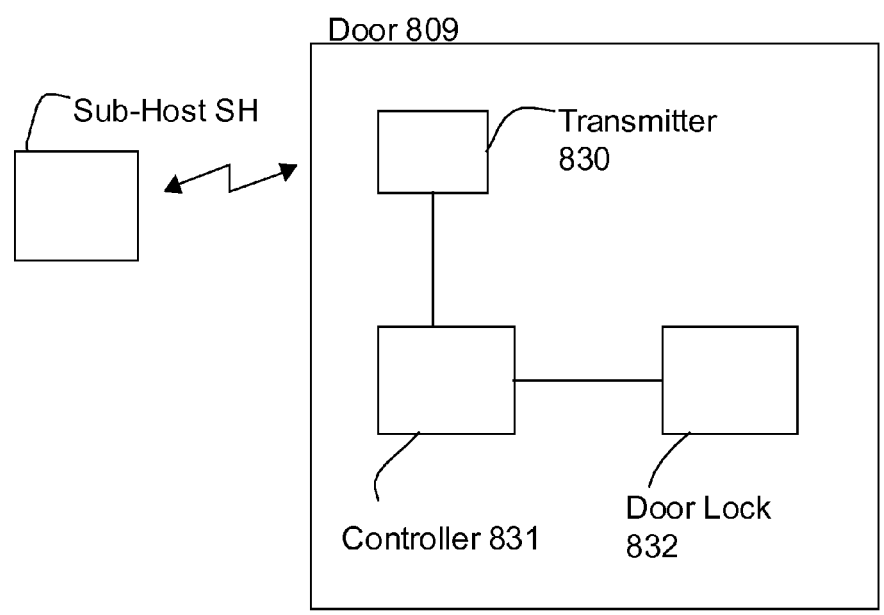
FIG. 85 is a block diagram illustrating an exemplary embodiment of the present invention.

FIG. 85 is a further description of the communication performed between sub-host SH and door 809 which is described in FIG. 82. When sub-host SH receives a check request signal as described in FIG. 82 sub-host SH sends a check status signal which is received by controller 831 via transmitter 830. Controller 831 checks the status of door lock 832 and sends back a response signal to sub-host SH via transmitter 830 indicating that door lock 832 is locked or unlocked. Upon receiving the response signal from controller 832 sub-host SH sends a result signal to communication device 200 as described in FIG. 82. When sub-host SH receives a control signal from communication device 200 as described in FIG. 82 it sends a door control signal which is received by controller 831 via transmitter 830. Controller 831 locks or unlocks door lock 832 in conformity with the door control signal. As another embodiment of the present invention controller 831 may owe the task of both sub-host SH and itself and communicate directly with communication device 200 via network NT.

As another embodiment of the present invention each equipment, i.e., TV 802, microwave oven 803, VCR 804, bathroom 805, room light 806, AC 807, heater 808, door lock 809, and CCD camera 810, may carry a computer which directly administers its own equipment and directly communicates with communication device 200 via network NT instead of sub-host SH administering all pieces of equipment and communicate with communication device 200.

The above-mentioned invention is also applicable to carriers in general, such as automobiles, airplanes, space shuttles, ships, motor cycles and trains.

Auto Emergency Calling System

Figure 86:
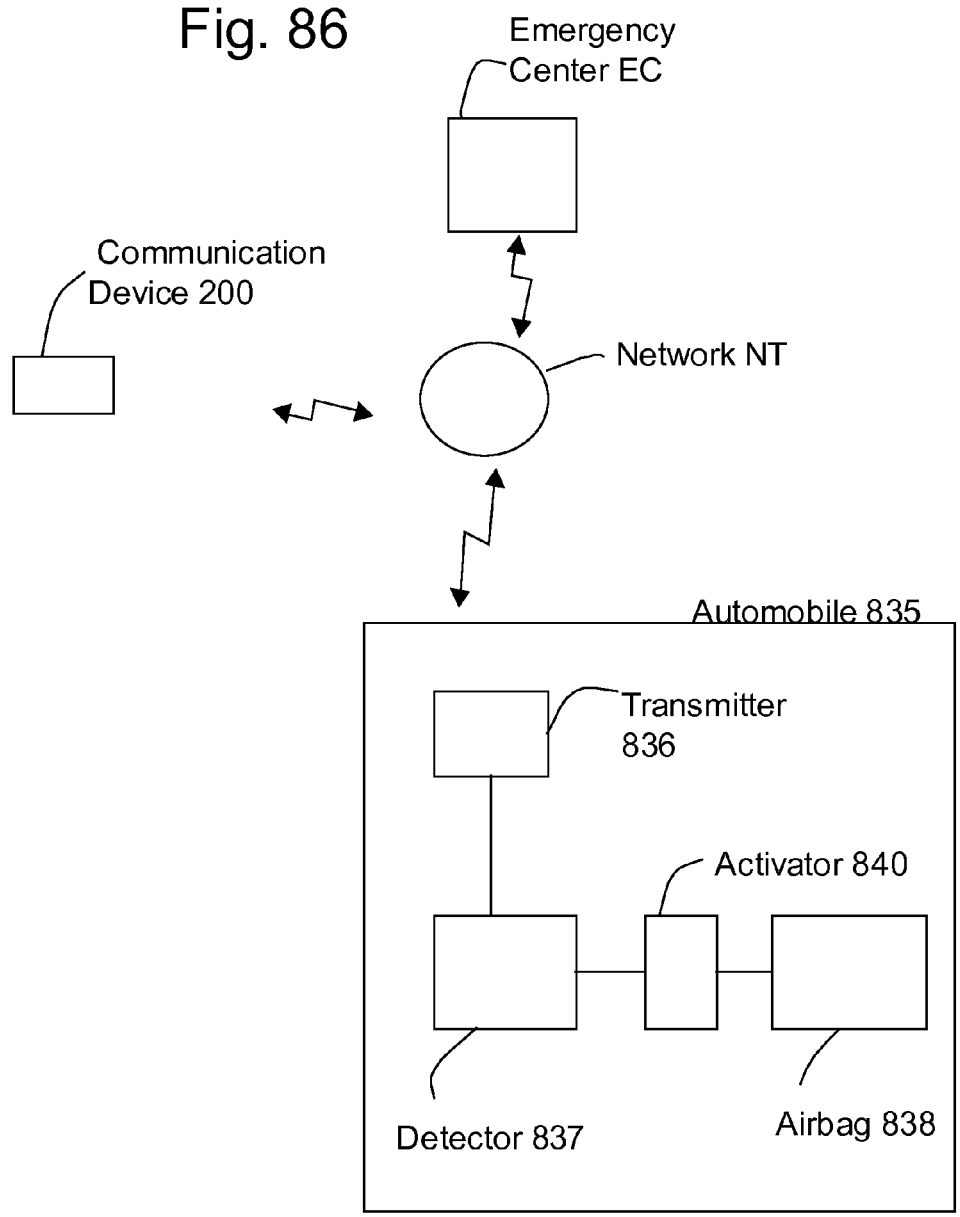
FIG. 86 is a simplified illustration illustrating an exemplary embodiment of the present invention.
Figure 87:
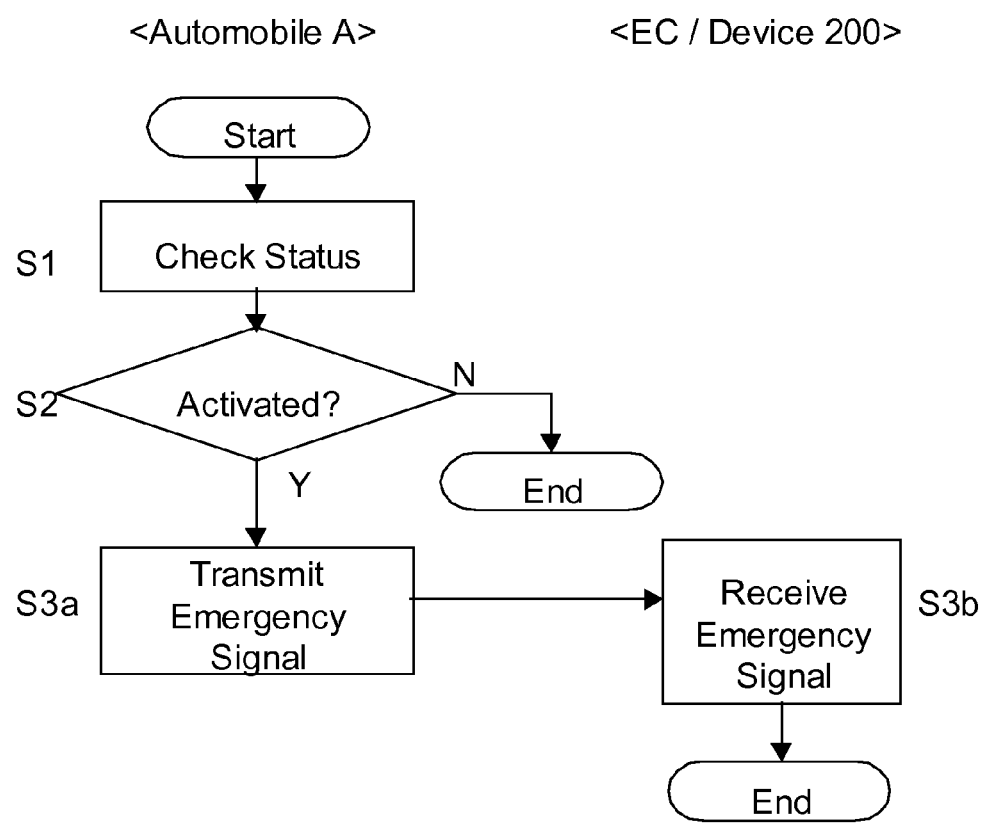
FIG. 87 is a flowchart illustrating an exemplary embodiment of the present invention.

FIG. 86 and FIG. 87 illustrate the automatic emergency calling system.

FIG. 86 illustrates the overall structure of the automatic emergency calling system. Communication device 200 is connected to network NT. Network NT may be the internet or have the same or similar structure described in FIG. 2a, FIG. 2b and/or FIG. 2c. Network NT is connected to automobile 835 thereby enabling automobile 835 to communicate with communication device 200 in a wireless fashion. Emergency center EC, a host computer, is also connected to automobile 835 in a wireless fashion via network NT. Airbag 838 which prevents persons in automobile 835 from being physically injured or minimizes such injury in case traffic accidents occur is connected to activator 840 which activates airbag 838 when it detects an impact of more than certain level. Detector 837 sends an emergency signal via transmitter 836 when activator 840 is activated. The activation signal is sent to both emergency center EC and communication device 200. In lieu of airbag 838 any equipment may be used so long as such equipment prevents from or minimizes physical injuries of the persons in automobile 835.

FIG. 87 illustrates the overall process of the automatic emergency calling system. Detector 837 periodically checks activator 840 (S1). If the activator 840 is activated (S2) detector 837 transmits an emergency signal via transmitter 836 (S3a). The emergency signal is transferred via network NT and received by emergency center EC and by communication device 200 (S3b).

As another embodiment of the present invention the power of detector 837 may be usually turned off, and activator 840 may turn on the power of detector 837 by the activation of activator 840 thereby enabling detector 837 to send the emergency signal to both emergency center EC and to communication device 200 as described above.

This invention is also applicable to any carriers including airplanes, space shuttles, ships, motor cycles and trains.

The invention claimed is:

1. A wireless communication device, which is a handheld device operable to implement voice communication, comprising:
   an input device to operate said wireless communication device;
   a microphone to input audio data to said wireless communication device;
   a speaker to output audio data from said wireless communication device;
   a video image generator to generate a plurality of images; and
   a display to display said plurality of images;
   wherein said wireless communication device is operable to implement said voice communication by utilizing said microphone and said speaker;
   wherein said wireless communication device is operable to implement a first function and a second function, when said first function is implemented, said video image generator generates a plurality of two-dimensional text images and said plurality of two-dimensional text images are displayed on said display, and when said second function is implemented, said video image generator generates a plurality of three-dimensional graphic images and said plurality of three-dimensional graphic images are displayed on said display; and
   wherein when said wireless communication device receives a phone call from a specific caller, said wireless communication device refrains from answering said phone call.

2. A wireless communication device, which is a handheld device operable to implement voice communication, comprising:
   an input device to operate said wireless communication device;
   a microphone to input audio data to said wireless communication device;
   a speaker to output audio data from said wireless communication device;
   a video image generator to generate a plurality of images; and
   a display to display said plurality of images;

wherein said wireless communication device is operable to implement said voice communication by utilizing said microphone and said speaker;

wherein said wireless communication device is operable to implement a first function and a second function, when a phone number is input to said wireless communication device by utilizing said input device, said first function is implemented and said video image generator generates a plurality of two-dimensional numeric images and said plurality of two-dimensional numeric images are displayed on said display, and when said second function is implemented, said video image generator generates a plurality of three-dimensional graphic images and said plurality of three-dimensional graphic images are displayed on said display; and wherein when said wireless communication device receives a phone call from a specific caller, said wireless communication device refrains from answering said phone call.

3. A wireless communication device, which is a handheld device operable to implement voice communication, comprising:

an input device to operate said wireless communication device;

a microphone to input audio data to said wireless communication device;

a speaker to output audio data from said wireless communication device;

a video image generator to generate a plurality of images; and a display to display said plurality of images;

wherein said wireless communication device is operable to implement said voice communication by utilizing said microphone and said speaker;

wherein said wireless communication device is operable to implement a first function and a second function, when a phone number is input to said wireless communication device by utilizing said input device, said first function is implemented and said video image generator generates a plurality of two-dimensional numeric images and said plurality of two-dimensional numeric images are displayed on said display, and when said second function is implemented, said video image generator generates a plurality of three-dimensional graphic images, which represent a plurality of three-dimensional objects existing in a computer-generated three-dimensional space, and said plurality of three-dimensional graphic images are displayed on said display; and wherein when said wireless communication device receives a phone call from a specific caller, said wireless communication device refrains from answering said phone call.

* * * * *